United States Patent
Gulick

(10) Patent No.: US 6,421,751 B1
(45) Date of Patent: Jul. 16, 2002

(54) DETECTING A NO-TAGS-FREE CONDITION IN A COMPUTER SYSTEM HAVING MULTIPLE OUTSTANDING TRANSACTIONS

(75) Inventor: Dale E. Gulick, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 09/330,637

(22) Filed: Jun. 11, 1999

Related U.S. Application Data

(60) Provisional application No. 60/109,589, filed on Nov. 23, 1998.

(51) Int. Cl.[7] ............................................. G06F 13/00
(52) U.S. Cl. .................... 710/107; 710/240; 710/260; 710/108; 710/200; 710/220; 710/112; 712/215; 712/217
(58) Field of Search ................... 710/107–125, 710/240–244, 260–269; 712/215, 217, 244

(56) References Cited

U.S. PATENT DOCUMENTS

| | | | | |
|---|---|---|---|---|
| 4,858,116 A | * | 8/1989 | Gillett, Jr. et al. | 711/155 |
| 4,941,083 A | * | 7/1990 | Gillett, Jr. et al. | 710/108 |
| 4,949,239 A | * | 8/1990 | Gillett, Jr. et al. | 710/108 |
| 4,992,938 A | * | 2/1991 | Cocke et al. | 712/218 H |
| 5,068,781 A | * | 11/1991 | Gillett, Jr. et al. | 710/108 |
| 5,450,411 A | | 9/1995 | Heil | 370/94.2 |
| 5,548,736 A | * | 8/1996 | Asakawa et al. | 712/244 |
| 5,621,898 A | | 4/1997 | Wooten | 395/297 |
| 5,640,392 A | | 6/1997 | Hayashi | 370/395 |
| 5,742,847 A | | 4/1998 | Knoll et al. | 395/866 |
| 5,761,430 A | | 6/1998 | Gross et al. | 395/200 |
| 5,948,080 A | | 9/1999 | Baker | 710/37 |

* cited by examiner

Primary Examiner—Rupal Dharia
(74) Attorney, Agent, or Firm—Zagorin, O'Brien & Graham, LLP

(57) ABSTRACT

A computer system includes a pipelined communication link on which pipelined transactions are identified by a tag. A finite number of tags are available. The computer system detects where all the available tags have been assigned to outstanding transactions, no tags are free and the condition has persisted for a predetermined amount of time.

19 Claims, 35 Drawing Sheets

| START | END | NAME | DESCRIPTION |
|---|---|---|---|
| FE 0200 0000 | FE FFFF FFFF | RESERVED | |
| FE 0100 0000 | FE 01FF FFFF | CONFIGURATION | 24-BIT CONFIGURATION SPACE |
| FE 0001 0000 | FE 00FF FFFF | RESERVED | |
| FE 0000 0000 | FE 0000 FFFF | x86 I/O | 16-BIT x86 I/O ADDRESS SPACE |
| 00 0000 0000 | FD FFFF FFFF | NORMAL MEMORY | DRAM ADDRESS SPACE |
| 00 0000 0000 | 00 FFFF FFFF | PCI MEMORY | 32-BIT PCI ADDRESS SPACE |

MEMORY WRITE PACKET:

| PIPE ID # (5) | PKT TYPE (6) | TAG (5) | BUF AVAIL (4) | RSRVD (4) | ADDR (40) | RSRVD (2) | SIZE (6) | DATA (1-64) |
|---|---|---|---|---|---|---|---|---|

FIG. 7A

SPECIAL CYCLE WRITE PACKET:

| PIPE ID # (5) | PKT TYPE (6) | TAG (5) | BUF AVAIL (4) | RSRVD (4) | ADDR (40) | RSRVD (2) | SIZE (6) | DATA (4) |
|---|---|---|---|---|---|---|---|---|

FIG. 7B

NON-ADDRESSED WRITE PACKET

| PIPE ID # (5) | PKT TYPE (6) | TAG (5) | BUF AVAIL (4) | RSRVD (4) | RSRVD (2) | SIZE (6) | DATA (1-64) |
|---|---|---|---|---|---|---|---|

FIG. 7C

WRITE ACK (OR NAK) PACKET

| PIPE ID # (5) | PKT TYPE (6) | TAG (5) | BUF AVAIL (4) | RSRVD (4) |
|---|---|---|---|---|

FIG. 7D

FLUSH PACKET

| PIPE ID # (5) | PKT TYPE (6) | RSRVD (5) | BUF AVAIL (4) | RSRVD (4) |
|---|---|---|---|---|

FIG. 7E

FENCE PACKET

| PIPE ID # (5) | PKT TYPE (6) | RSRVD (5) | BUF AVAIL (4) | RSRVD (4) |
|---|---|---|---|---|

FIG. 7F

MEMORY READ REQUEST PACKET

| PIPE ID # (5) | PKT TYPE (6) | TAG (5) | BUF AVAIL (4) | RSRVD (4) | ADDR (40) | RSRVD (2) | SIZE (6) |
|---|---|---|---|---|---|---|---|

FIG. 7G

NON-ADDRESSED READ REQUEST PACKET

| PIPE ID # (5) | PKT TYPE (6) | RSRVD (1) | BUF AVAIL (4) | RSRVD (2) | SIZE (6) |
|---|---|---|---|---|---|

FIG. 7H

READ RESPONSE PACKET

| PIPE ID # (5) | PKT TYPE (6) | TAG (5) | BUF AVAIL (4) | RSRVD (4) | RSRVD (2) | SIZE (6) | DATA (1-64) |
|---|---|---|---|---|---|---|---|

FIG. 7I

NON-ADDRESSED READ RESPONSE PACKET

| PIPE ID # (5) | PKT TYPE (6) | RSRVD (1) | BUF AVAIL (4) | RSRVD (2) | SIZE (6) | DATA (1-64) |
|---|---|---|---|---|---|---|

FIG. 7J

READ REJECT PACKET

| PIPE ID # (5) | PKT TYPE (6) | TAG (5) | BUF AVAIL (4) | RSRVD (4) |
|---|---|---|---|---|

FIG. 7K

NOP PACKET

| PIPE ID # (5) | PKT TYPE (6) | RSRVD (5) | BUF AVAIL (4) | RSRVD (4) |
|---|---|---|---|---|

FIG. 7L

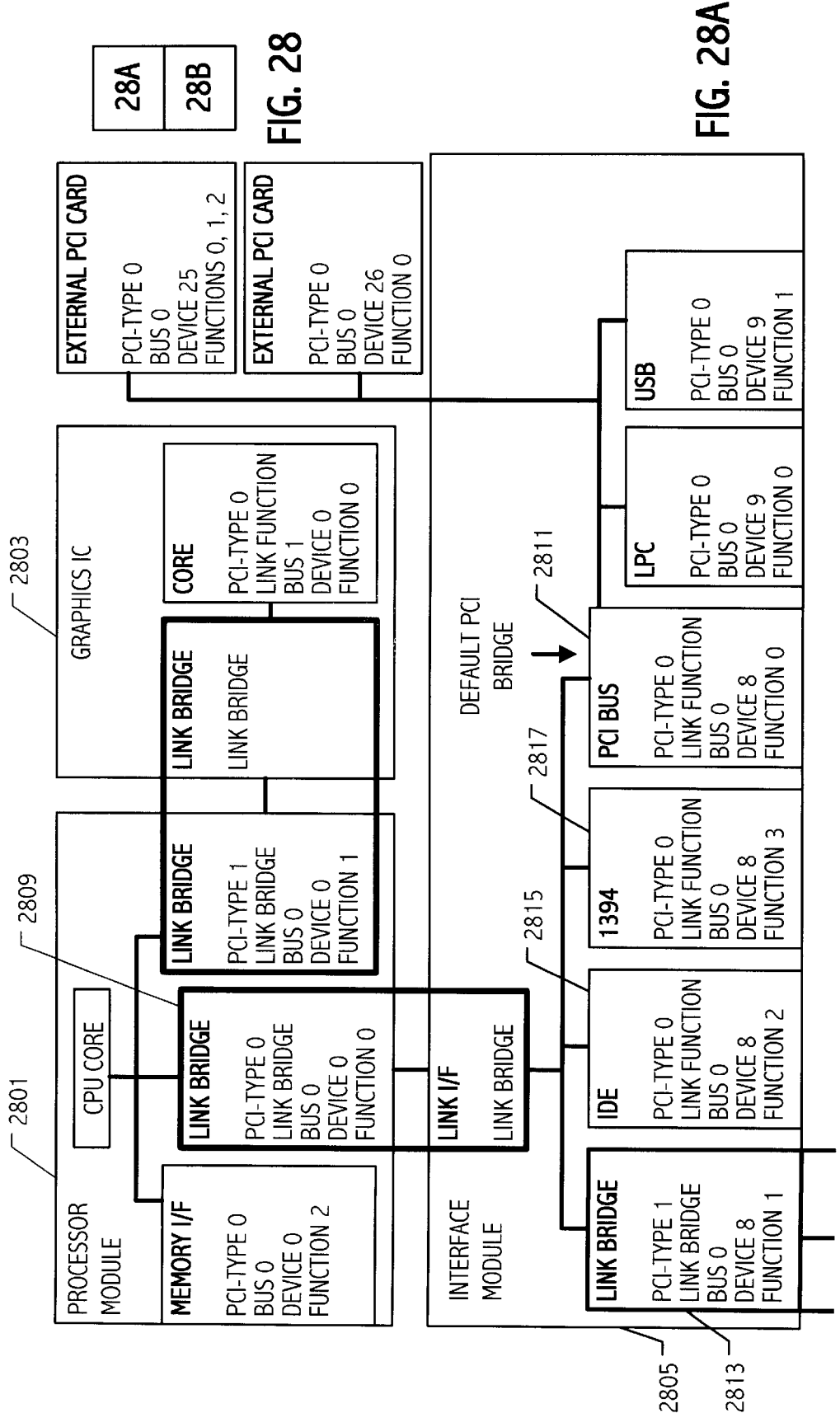

TYPE 1

| DEVICE ID | | VENDOR ID | | 00h |
|---|---|---|---|---|
| STATUS | | COMMAND | | 04h |
| CLASS CODE | | | REVISION ID | 08h |
| BIST | HEADER TYPE | LATENCY TIMER | CACHE LINE SIZE | 0Ch |
| BASE ADDRESS REGISTERS | | | | 10h |
| | | | | 14h |
| SECONDARY LATENCY TIMER | SUBORDINATE BUS NUMBER | SECONDARY BUS NUMBER | PRIMARY BUS NUMBER | 18h |
| SECONDARY STATUS | | I/O LIMIT | I/O BASE | 1Ch |
| MEMORY LIMIT | | MEMORY BASE | | 20h |
| PREFETCHABLE MEMORY LIMIT | | PREFETCHABLE MEMORY BASE | | 24h |
| PREFETCHABLE BASE UPPER 32 BITS | | | | 28h |
| PREFETCHABLE LIMIT UPPER 32 BITS | | | | 2Ch |
| I/O LIMIT UPPER 16 BITS | | I/O BASE UPPER 16 BITS | | 30h |
| RESERVED | | | CAPABILITIES POINTER | 34h |
| RESERVED | | | | 34h |
| EXPANSION ROM BASE ADDRESS | | | | 38h |
| BRIDGE CONTROL | | INTERRUPT PIN | INTERRUPT LINE | 3Ch |

FIG. 29

PCI TYPE 0

| DEVICE ID | | VENDOR ID | | 00h |
|---|---|---|---|---|
| STATUS | | COMMAND | | 04h |
| CLASS CODE | | | REVISION ID | 08h |
| BIST | HEADER TYPE | LATENCY TIMER | CACHE LINE SIZE | 0Ch |
| | | | | 10h |
| BASE ADDRESS REGISTERS | | | | 14h |
| | | | | 18h |
| | | | | 1Ch |
| | | | | 20h |
| | | | | 24h |
| CARDBUS CIS POINTER | | | | 28h |
| SUBSYSTEM ID | | SUBSYSTEM VENDOR ID | | 2Ch |
| EXPANSION ROM BASE ADDRESS | | | | 30h |
| RESERVED | | | CAPABILITIES POINTER | 34h |
| RESERVED | | | | 38h |
| Max_Lat | Min_Gnt | INTERRUPT PIN | INTERRUPT LINE | 3Ch |

FIG. 30

| UPSTREAM SIDE LINK BRIDGE REGISTERS | | | |
|---|---|---|---|
| RESERVED | NEXT CAPABILITIES POINTER | CAPABILITIES HEADER ID | N+'h00 |
| ASYNCHRONOUS 256-BYTE COUNTER | | | N+'h04 |
| ISOCHRONOUS 256-BYTE COUNTER | | | N+'h08 |
| IPM FRAME COUNTER | | | N+'h0C |
| ISOCHRONOUS BYTE COUNTER RELOAD | | MAX DETECTED ISOCHRONOUS BYTE COUNT | N+'h10 |
| CLOCK FREQUENCY | MAX CLOCK FREQUENCY | ELAPSED FRAME COUNTER RELOAD | N+'h14 |
| LINK WIDTH | | LINK BRIDGE CONTROL | N+'h18 |
| RESERVED | | | N+'h1C |
| DOWNSTREAM SIDE LINK BRIDGE REGISTERS | | | |
| RESERVED | | | N+'h20 |
| ASYNCHRONOUS 256-BYTE COUNTER | | | N+'h24 |
| ISOCHRONOUS 256-BYTE COUNTER | | | N+'h28 |
| IPM FRAME COUNTER | | | N+'h2C |
| ISOCHRONOUS BYTE COUNTER RELOAD | | MAX DETECTED ISOCHRONOUS BYTE COUNT | N+'h30 |
| CLOCK FREQUENCY | MAX CLOCK FREQUENCY | ELAPSED FRAME COUNTER RELOAD | N+'h34 |
| LINK WIDTH | | LINK BRIDGE CONTROL | N+'h38 |
| RESERVED | | | N+'h3C |

FIG. 31

DETECTING A NO-TAGS-FREE CONDITION IN A COMPUTER SYSTEM HAVING MULTIPLE OUTSTANDING TRANSACTIONS

RELATED APPLICATIONS RELATED APPLICATIONS

This application claims benefit of provisional application No. 60/109,589, filed Nov. 23, 1998, entitled COMPUTER COMMUNICATION LINK, which plication is incorporated herein by reference.

BACKGROUND OF THE INVENTION

1. Field of the Invention

The invention relates to computer systems and more particularly to a computer system having a high speed communication link having multiple pipes operating on the communication link.

2. Description of the Related Art

Traditional personal computer architectures partition the computer system into the various blocks shown in the exemplary prior art system illustrated in FIG. 1. One central feature of this prior art architecture is the use of the Peripheral Component Interface (PCI) bus 101 as the connection between the "north bridge" integrated circuit 103 and the "south bridge" integrated circuit 105. The north bridge functions generally as a switch connecting CPU 107, a graphics bus 109 such as the Advanced Graphics Port (AGP) bus, the PCI bus and main memory 111. The north bridge also contains the memory controller function.

The south bridge generally provides the interface to the input/output (I/O) portion of the system with the possible exception of video output as illustrated in FIG. 1. Specifically, the south bridge 105 provides a bridge between the PCI bus and legacy PC-AT (Advanced Technology) logic. The south bridge also provides a bridge to the legacy ISA bus 115, the Integrated Device Electronics (IDE) disk interface 117 and the Universal Serial Bus (USB) 119. In the illustrated prior art architecture, PCI bus 101 also functions as the major input/output bus for add-in functions such as network connection 121. The various busses and devices shown in FIG. 1 are conventional in the personal computer industry and are not described further herein unless necessary for an understanding of the present invention.

In current and future personal computer systems, two basic types of data are transferred between integrated circuits: isochronous data and asynchronous data. Isochronous data refers to data used in real-time data streams such as audio data or motion-picture video data. Asynchronous data is used for all other transfers, such as central processing unit (CPU) accesses to memory and peripherals or bulk data transmissions from a hard drive into system memory.

The PCI bus causes a lack of determinism in the system because any function on the PCI bus can become master of the bus and tie up the bus. Thus, the throughput available on the PCI bus for a particular transfer and the latency that is involved for that transfer is unknown. PCI bus load fluctuations can result in uncertain and irregular quality of service. Therefore, having a PCI bus as the major input/output bus means that the major input/output bus of present day computer systems does not provide proper support for both isochronous and asynchronous data. If a computer system gives asynchronous data priority or treats isochronous data as asynchronous data, then those functions relying on real time data, such as motion-picture video, may not function satisfactorily. Alternatively, if a computer system prioritizes isochronous data, then the performance of the computer system can suffer since the latency of asynchronous data may become unacceptably long. As computer systems are called on to perform more and more real time activity, such as real time video, it becomes more critical that asynchronous and isochronous data be treated in a manner that prevents problems from occurring in the real time tasks without adversely effecting other aspects of computer performance.

In addition, as the number of functions integrated onto the integrated circuits of computer systems increases, the need for additional integrated circuit package pins also increases. Supporting the host bus, the memory interface, the PCI bus and a graphics interface results in a north bridge integrated circuit having a relatively large number of pins that is relatively unpopulated in terms of the number of transistors on the integrated circuit. The large number of pins requires the integrated circuit to be larger than would otherwise be necessary and therefore increases costs.

It would be desirable therefore, to have a deterministic high speed major interconnect bus providing improved quality of service for both isochronous and asynchronous traffic classes. It would also be desirable to reduce the pressure for additional pins on the integrated circuits making up the computer system.

SUMMARY OF THE INVENTION

A computer system includes a pipelined communication link. Pipelined transactions on the bus are identified by a tag. A finite number of tags are available. Therefore, it is possible for the condition to exist in which no tags are free. That condition might indicate a problem with the system if the condition persists. Accordingly, in one embodiment of the invention, a method is provided for detecting the existence of a no tags free condition in a computer system having a pipelined interconnection bus on which multiple outstanding transactions occur. The method includes assigning one of a plurality of tags to each respective transaction to identify the transaction. The no tags free condition is detected when it occurs, the no tags free condition indicating that all of the tags have been assigned to respective outstanding transactions. When the no tags free condition has existed for a predetermined amount of time, an indication thereof is provided.

In another embodiment of the invention, an integrated circuit is provided that includes a tag reservoir circuit for supplying tags. Each of the supplied tags is associated with a transaction issued on a bus. The tag reservoir circuit marks a tag as unavailable when it has been issued to an outstanding transaction, and marks a tag as available when a tag is retired upon completion of a transaction. A first detecting circuit is coupled to the reservoir circuit and asserts a signal indicating a no tags free condition in the reservoir circuit and deasserts the signal when tags are available in the reservoir circuit. A first counter circuit, responsive to the no tags free condition provides an indication when the no tags free condition has existed for a predetermined time period.

BRIEF DESCRIPTION OF THE DRAWINGS

The present invention may be better understood, and its numerous objects, features, and advantages made apparent to those skilled in the art by referencing the accompanying drawings, wherein, the use of the same reference signals in different drawings indicate similar or identical items.

FIGS. 7A–7L show exemplary packets used in various link transactions.

FIGS. 28A and 28B illustrate the basic configuration structure and register addressing strategy of a typical system according to one embodiment of the present invention.

FIG. 29 illustrates a type 1 (bridge) header.

FIG. 30 illustrates a type 0 (function) header.

FIG. 31 illustrates the upstream and downstream link registers used for link bridges.

DESCRIPTION OF THE PREFERRED EMBODIMENT(S)

Figure 1:
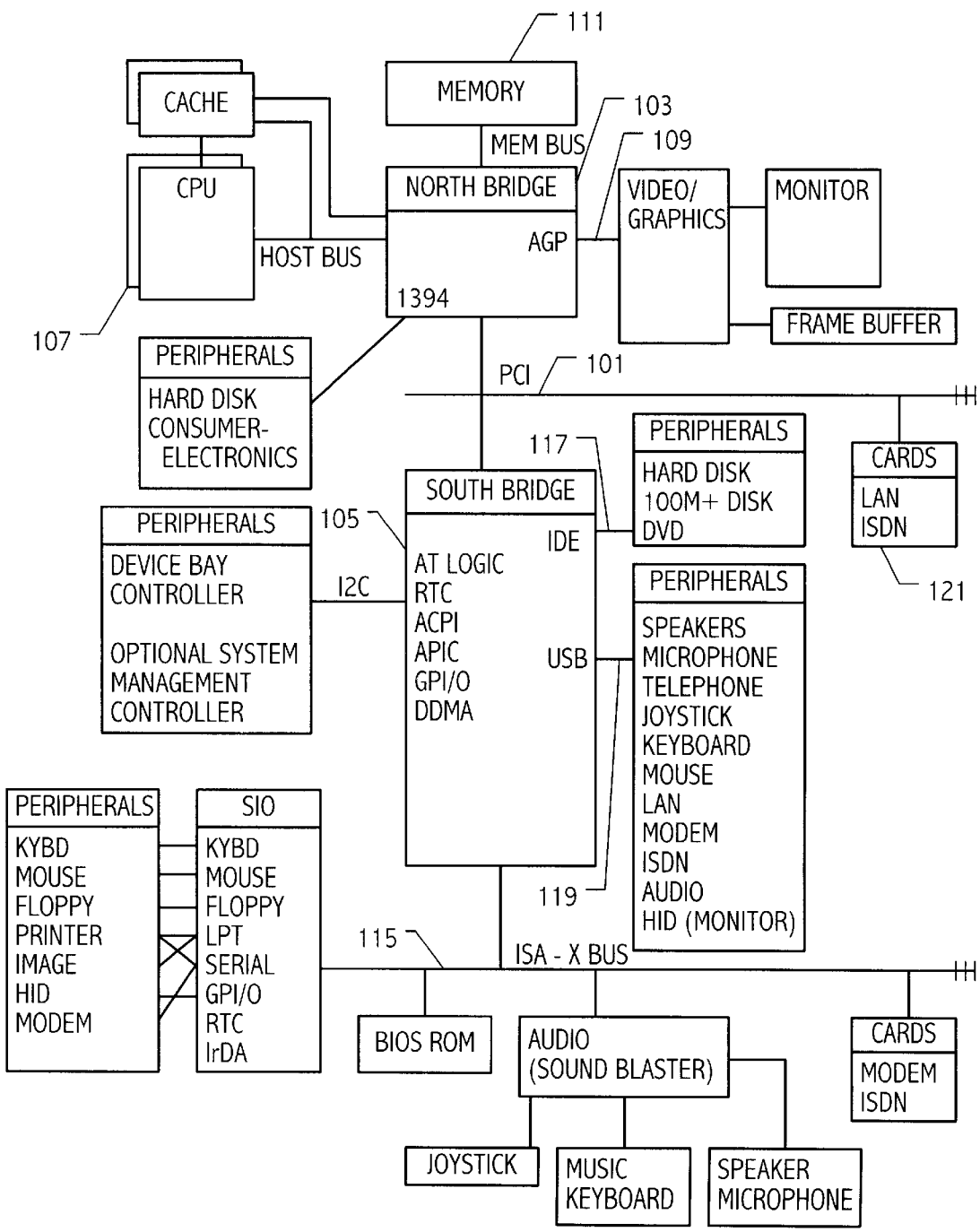
FIG. 1 shows an exemplary prior art personal computer system.
Figure 2:
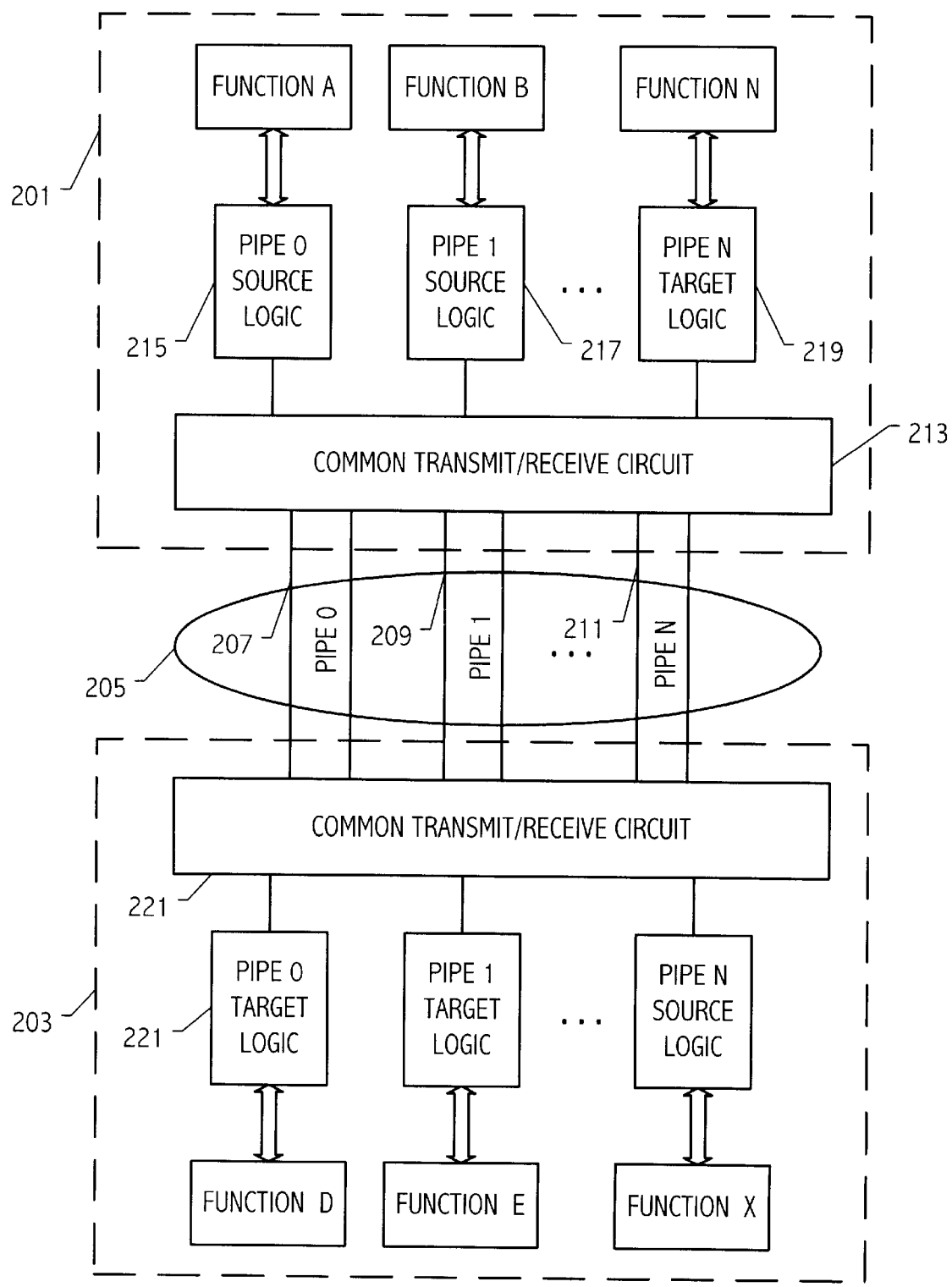
FIG. 2 shows a block diagram illustrating the pipe structure according to one embodiment of the present invention.

FIG. 2, illustrates a generic system according to one embodiment of the present invention. The system includes module 201 and module 203 coupled by high speed link 205. High speed link 205 is in one embodiment a low pin count high speed point to point bus (generally referred to herein as a "link" to distinguish the point to point interconnect bus from a multi-drop bus). The term "interconnect bus" is also used herein interchangeably with "link" to avoid confusion when discussing the "link layer" of the communication link. Examples of such a link are described in the following co-pending applications: application Ser. No. 09/098,874, entitled BUS OPTIMIZED FOR PERSONAL COMPUTER TRAFFIC; application Ser. No. 09/099,227, filed Jun. 17, 1998, entitled METHOD OF MODE CONTROL IN A BUS OPTIMIZED FOR PERSONAL COMPUTER TRAFFIC; application Ser. No. 09/098,874, filed Jun. 17, 1998, entitled BUS OPTIMIZED FOR PERSONAL COMPUTER TRAFFIC; application Ser. No. 09/098,360 filed Jun. 17, 1998, entitled COMPUTER WITH HIGH VELOCITY-LOW PIN COUNT NORTH BRIDGE SOUTH BRIDGE LINK, co-pending application Ser. No. 09/098,228 filed Jun. 17, 1998, entitled CPU-NORTH BRIDGE INTEGRATION UTILIZING AN INTERCONNECTION BUS PROVIDING A HIGH SPEED-LOW PIN COUNT LINK; and application Ser. No. 09/098,876 filed Jun. 17, 1998, entitled WRITE ONLY BUS WITH WHOLE AND HALF BUS MODE OPERATION; which applications are incorporated herein by reference in their entirety.

Link 205 has a plurality of pipes 207–211. Each pipe (or channel), couples a function in module 201 to a function in module 203. Each pipe has a source end and a target end. For example, source end 215 of pipe 207 couples function A on module 201 to the target end 221 of pipe 0. The target end 221 of pipe 0 is in turn coupled to function D on module 203, thereby providing a path between function A and function D.

A function is a circuit that provides a specific function in the computer system. For example, a CPU and memory controller on a processor module are examples of functions. A PCI bridge and 1394 host controller are further examples of functions on an interface module. A function can have any combination of target and source pipes. For example, in an exemplary system, the memory controller may only have targets, the CPU may only have sources, and the PCI bridge may have both targets and sources as discussed further herein.

Each pipe source and pipe target communicate over bus 205 on a packet multiplexed basis using packets uniquely associated with the respective pipe. Before various aspects of the pipe architecture are examined in greater detail, certain details of exemplary bus 205 will be discussed to provide the appropriate context for use of the pipes.

THE LINK

One way to achieve high speed is to utilize a point-to-point bus in which only two devices are present on the bus. A point-to-point bus can inherently run at higher speeds than a multi-drop bus such as the PCI bus since a point-to-point link has reduced electrical loading and reduced noise caused by reflections at tap points such as connectors. It is possible to provide a point to point link that operates at, e.g., 25 times the speed of the PCI bus. Given this, a 32-bit wide PCI bus can be replaced by a 16-bit (or even an 8-bit link) while still adding significant transfer bandwidth.

Figure 3:
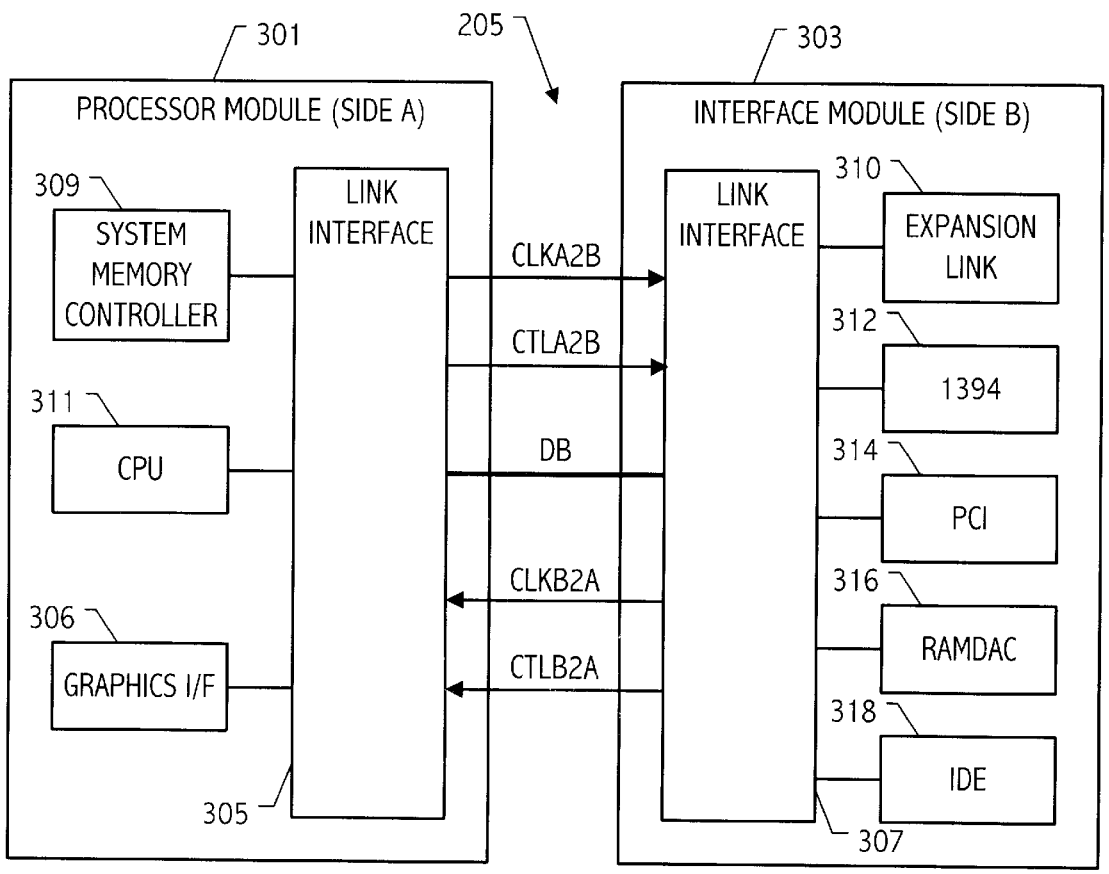
FIG. 3 is a high level block diagram of a portion of a personal computer system that utilizes an exemplary communication link described herein.

Referring to FIG. 3, a portion of a typical personal computer system is shown which utilizes link 205 to communicate between two integrated circuits 301 and 303. The computer system includes processor module 301 and interface module 303. Processor module 301 includes link interface 305 which is coupled to link interface 307 in interface module 303. Bus 205 provides guaranteed bandwidth and latency to each isochronous stream such as RAMDAC data, audio data, and 1394 isochronous streams while also attempting to minimize latency to asynchronous accesses such as CPU-initiated accesses and PCI-initiated accesses.

One feature of the architecture shown in FIG. 3 is that the PCI bus no longer functions as the primary interface between the processor/memory controller 301 input/output functions. Link 205 has replaced the PCI bus as the primary interface and also carries both isochronous and asynchronous data.

The exemplary processor module 301 provides the major processing function in the computer system and includes system memory controller 309, a central processing unit (CPU) (such as the x86 processor AMD K6™) and graphics interface 306. Interface module 303 provides an interface between various input/output devices such as video monitors, hard drives, scanners, printers, network connections, modems, and the processor module. The exemplary interface module 307 includes interface 310 providing an interface to the industry standard architecture (ISA) bus, IEEE 1394 interface 312, peripheral component interface (PCI) 314, RAMDAC 316 and Intelligent Drive Electronics (IDE) controller 318.

Exemplary link 205 connecting processor module (PM) 301 and the interface module (IM) 303 includes data portion DB. Data bus DB includes two data portions. In one embodiment, each data portion contains one byte (8 bits) of data. However, the number of bits on the data bus may be of size $(2^n-1:0)$, where n is an integer>0. Thus, a minimum implementation has one data bit in each direction. In the illustrated embodiment, n equals 4, with each data portion having one byte.

The exemplary system is divided into two sides with processor module 301 arbitrarily designated side A and interface module 303 designated as side B. Link 205 also includes a unidirectional clock line CLKB2A and a unidirectional control line CTLB2A provided by link interface 307 to link interface 305. The "B2A" designation indicates that the signal is an output of side B and an input to side A. Link 205 also includes a second unidirectional clock line CLKA2B and a second unidirectional control line CTLA2B, which are provided by processor module 301 to interface module 303. The "A2B" designation indicates that the signal is an output of side A and an input to side B. The protocol uses clock-forwarding technology to reliably synchronize source data to a clock. CLKA2B and CLKB2A are preferably derived from the same source such that they are the same frequency and they do not drift.

Figure 4:
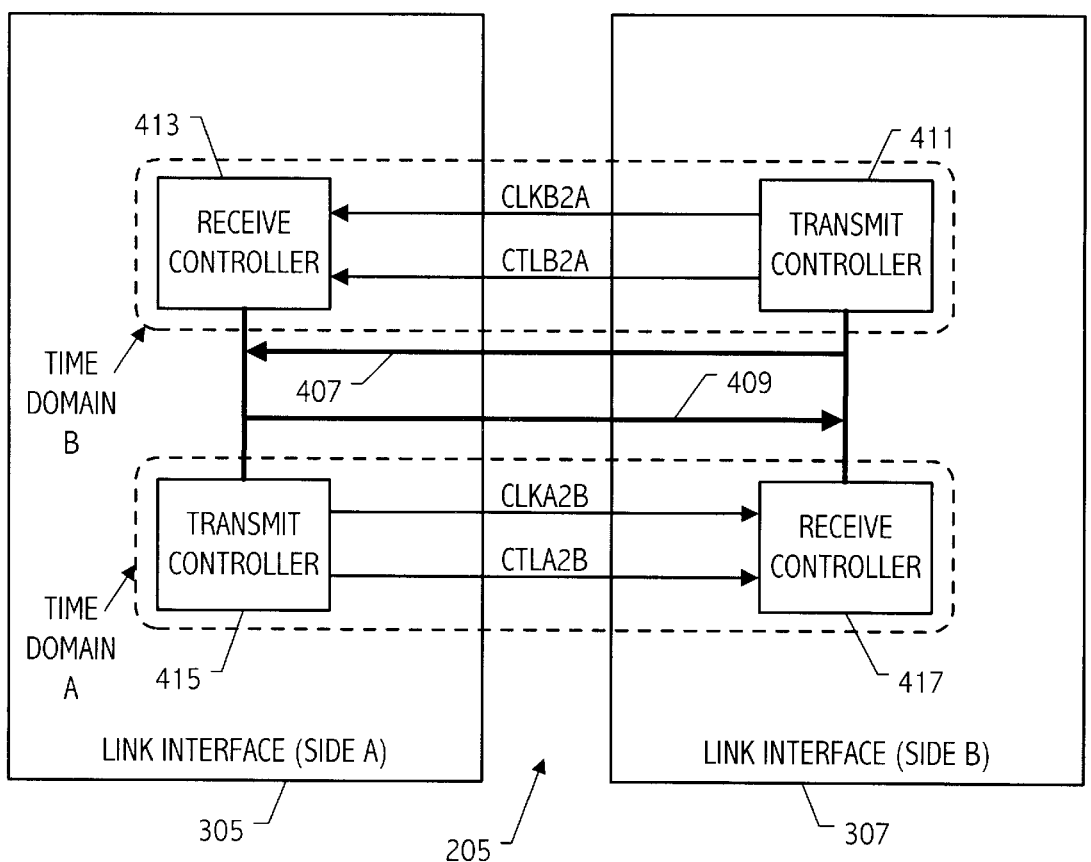
FIG. 4 shows a data bus and the interfaces of an exemplary communication link in greater detail.

Referring to FIG. 4, the data bus DB and the link interfaces are shown in greater detail. Each side includes a transmit controller and a receive controller. Data always flows from the transmit controller on one side to the receive controller on the other side. Thus, side A link interface 305 includes transmit controller 415 and a receive controller 413. Side B link interface includes transmit controller 411 and receive controller 417. The two portions 407 and 409 of data bus portion DB are shown with arrows indicating their direction of transfer. Data bus portion 407 transmits data from transmit controller 411 to receive controller 413 (from side B to side A) synchronous with CLKB2A. Data portion 409 of the data bus transmits data from transmit controller 415 to receive controller 417 (side A to side B), synchronously with CLKA2B.

One feature of bus 205 is that bus 205 provides a guaranteed minimum bandwidth and a maximum latency to data transferred over the bus. That is accomplished in one embodiment, as described in greater detail in application Ser. No. 09/098,874 (BUS OPTIMIZED FOR PERSONAL COMPUTER TRAFFIC), by transferring data over the high speed link in frames, with each frame guaranteeing a portion of the frame for isochronous data and a portion of the frame for asynchronous data. Guaranteeing maximum latency for various channels (or pipes) carried over the communication link is becoming more important as isochronous data streams are being conveyed between the south bridge and main memory. One source of such isochronous data is the IEEE 1394 bus. In order to provide the necessary isochronous bandwidth on the bus for isochronous streams, the isochronous streams are guaranteed a specified amount of bandwidth during each frame on the link.

Maximum bandwidth requirements are specified for each isochronous stream in terms of bytes per frame. The sum of the isochronous-stream maximum-bandwidth requirements should be less than the theoretical total bandwidth. However, as a matter of practicality, the higher the percentage bandwidth of isochronous streams, the greater the probability that asynchronous traffic will incur additional latency. In the design of a balanced system, one expects the sum of typical asynchronous bandwidth and maximum isochronous bandwidth to be less than about 60 to 80 percent of the theoretical maximum bandwidth. If that is done, then average latency for asynchronous cycles will be minimized.

Isochronous requesters should not send more bytes across the link, during a frame, than the programmed maximum bandwidth for that requester. Hardware may be implemented in the link layer to ensure that isochronous requesters comply with that requirement.

The side A transmit controller delivers clock CLKA2B to the side B receive controller, and the side B transmit controller delivers clock CLKB2A to the side A receive controller. Thus, the side A transmit controller and side B receive controller are included in the same time domain, called time domain A, and the side B transmit controller and the side A receive controller are included in the same time domain, called time domain B.

In the illustrated embodiment, both side A and side B may initialize to a mode of 16 bits wide and have an 800 megahertz data rate. The data rate may be twice the clock rate and thus a clock (CLK) (meaning CLKA2B and CLKB2A) rate of 400 megahertz means a data rate of 800 million edges per second. In the illustrated embodiment, frames are several microseconds in length, e.g. five microseconds.

Two kinds of traffic occur over exemplary bus 205: bus cycles and instant messages. The greatest amount of bandwidth is used by bus cycles or transactions, which are transfers of blocks of addressing information or addressing information and associated data sent from one link layer to the link layer on the other side. The addressing information determines where in the integrated circuit a particular access is targeted. The second type of bus traffic is messages, which are used to send protocol information across the link. In one embodiment, messages are aligned to the rising edge of CLK and consume one CLK cycle and can occur at any time, including in the middle of bus cycles.

Link 205 is very useful in situations where high-bandwidth asynchronous traffic must be mixed with isochronous traffic. The bus protocol assumes (1) that system performance is adversely affected by the latency of asynchronous traffic, (2) asynchronous traffic can be delayed indefinitely without adversely affecting real-time data streams, (3) isochronous traffic should be guaranteed a specified amount of bandwidth and worst-case latency, and (4) as long as the bandwidth and latency requirements for isochronous traffic are met, then the latency between their requests and the transfer of the data has no adverse affect on system performance.

The hardware on each side of the link includes a physical layer, a protocol layer, and a link layer. The protocol layers for both sides of the bus include the same hardware elements. In this way, the bus is symmetrical with no centralized resources (as opposed to, for example, the PCI bus arbiter which in prior art systems was typically located in the north bridge of the PCI bus and arbitrates for all masters).

Figures 5, 6:
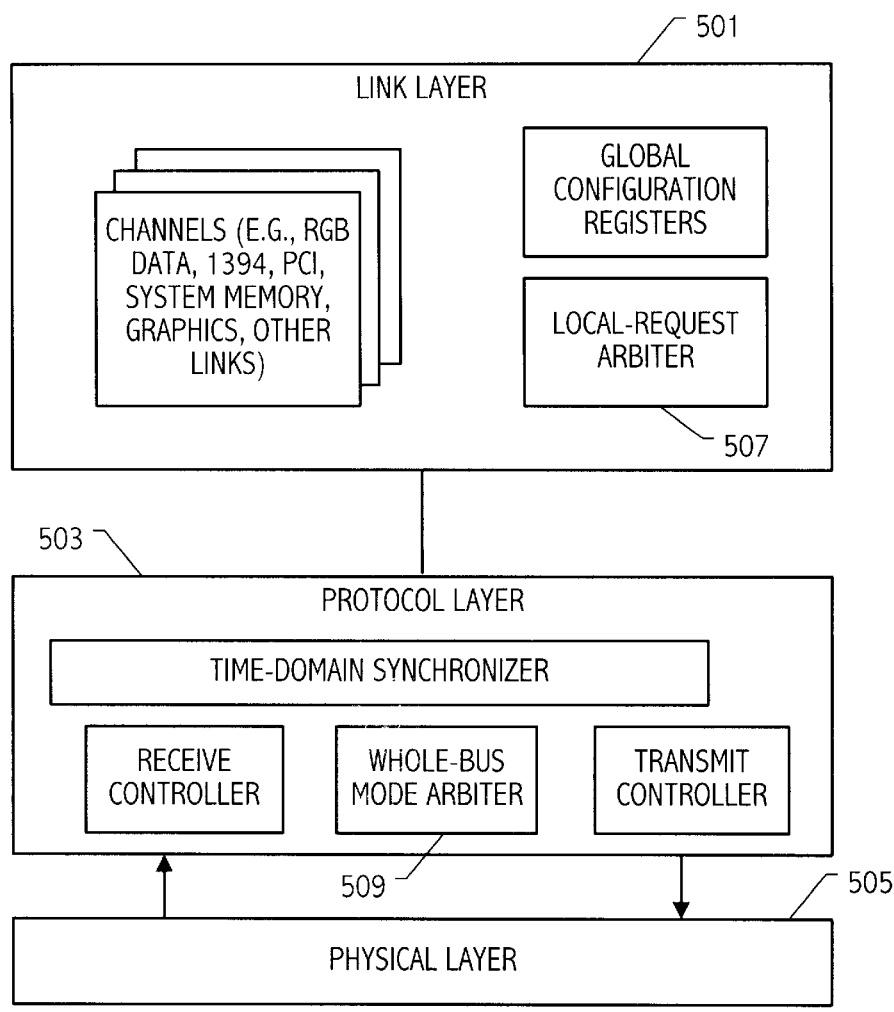
FIG. 5 illustrates the link layer, protocol layer and physical layer of the communication link.
FIG. 6 shows an exemplary address map for the processor module-interface module for an 'x86 environment utilizing an embodiment of the present invention.

Referring to FIG. 5, interconnect bus (or link) 205 includes link layer 501, protocol layer 503, and physical layer 505. The specific implementation of the physical layer depends on such factors as the frequency of the bus, the number of devices on the bus, the length of the bus, as is known to those of skill in the art. The specification for the physical layer and the protocol layer is generally device independent, except for variations of the bus width and frequency.

In the illustrated embodiment, each pipe is associated with one or more functions coupled through bus 205. For example, referring again to FIG. 3, processor module 301 may include separate pipes for the function CPU 311 and for the function system memory controller 309. One or more pipes may be provided for the various functions on the interface module 303 including 1394 host controller 312, the PCI bridge 314, RAMDAC 316 and IDE controller 318. The link layer also includes an arbiter 507 to determine the source of the next locally-generated bus cycle since there are typically multiple asynchronous and isochronous sources. The arbiters guarantee bandwidth to isochronous streams (within a maximum latency) while minimizing latency to asynchronous accesses.

Bus traffic is grouped into frames. In an exemplary system, two counters associated with frames are used in the local request arbitration logic (507 in FIG. 5). They are the elapsed frame counter, which is used to specify how much bandwidth remains in the frame, and the isochronous byte counter, which is used to specify how much isochronous bandwidth remains to be transferred in the frame.

The elapsed frame counter starts, at the beginning of each frame, at a value equal to the number of bytes that can be transferred across the frame (product of the width of the bus in bytes and the number of clock edges in the frame). For example, in a 16-bit, 800 megahertz implementation (data rate), with a two microsecond frame, the value of the counter would start out at (1600 bytes per microsecond)×(2 microseconds per frame)=3200. It counts down to zero over the course of the frame, reloads, counts down again, and so forth. When the elapsed-frame counter reaches zero, a new frame is defined to be started. This is true for both sides of the link. When the elapsed frame counter reaches zero, in certain embodiments a new frame (NewFrame) message is sent across the link to side B, which causes B's elapsed-frame counter to reset.

The isochronous byte counter starts, at the beginning of each frame, at a value equal to the number of isochronous bytes that should be guaranteed to be transferred during the frame. It decrements with each isochronous byte transferred. It is programmed to be slightly higher than the actual maximum isochronous bandwidth of a frame. Shortly after the beginning of each frame, all the isochronous streams make their requests to send data across the bus during the next frame. The requests may be made in the illustrated embodiment within a predetermined time period after the frame starts.

In one implementation, initially during a frame, asynchronous transfers are granted priority over isochronous transfers (to minimize the latency of the asynchronous transfers), (asynchronous priority mode). However, counter(s) track of how much isochronous traffic passes during the frame and if the isochronous streams are in danger of running out of the required bandwidth for the frame, arbitration priority switches to the isochronous traffic, (isochronous-priority mode). In that way, a minimum amount of isochronous bandwidth can be guaranteed while minimizing latencies for asynchronous transfer requests. After all the isochronous bus cycles for the frame are complete (which occurs before the end of the frame), the priority switches back to the asynchronous traffic. Other approaches to providing isochronous transfers are of course possible.

The local request arbiter operates as follows. At the beginning of each frame, all isochronous streams that will require bandwidth during the frame request the link from the local-request arbiter. They continue to request the link until they have completed all of their bus cycles for the frame.

Typically, the total requested bandwidth for the vast majority of frames will be well under 100%. Generally, asynchronous transfers will be granted highest priority for the entire frame because of generally low rates of isochronous traffic relative to the available bandwidth on the link. Thus, as described above, asynchronous CPU accesses will most often be granted higher priority than isochronous transfers and therefore incur reduced average latency. In situations where large blocks of bulk asynchronous data are being transferred across the link (for example, from the PCI bus), then the isochronous transfers will tend to come at the end of the frame, after the priority has switched to isochronous bus cycles. In this case, CPU latency will tend to increase as the CPU loses priority to the isochronous bus cycles and contends with the bulk asynchronous transfers.

For each frame, the link either stays in asynchronous priority mode for the entire frame or (1) starts in asynchronous priority mode, (2) transitions to isochronous priority mode during the frame, and (3) then transitions again to asynchronous priority mode before the end of the frame.

In one implementation, the rules for the local-request arbiter are: asynchronous requesters are higher priority than isochronous requesters during asynchronous-priority mode and only isochronous requesters are granted bus cycles during isochronous-priority mode. The arbitration method for the group of asynchronous requesters is not limited other than it is required to be fair and to not cause deadlock situations. The arbitration scheme for the group of isochronous requesters may utilize a fixed priority scheme.

COMMANDS AND RESPONSES

Detailed implementation of one embodiment of transmit and receive circuits in the protocol layer is described further herein. However, first the utilization of the high speed link will be examined in greater detail beginning with the transaction protocol. As described with relation to FIG. 2, the link includes a plurality of pipes, each pipe sharing the bus in a time division multiplexing scheme. The basic function of pipes is to carry transactions. The transactions can be reads, writes, or both. In one embodiment, reads and writes are carried across the link as memory-mapped transactions to a 40-bit address space.

Each transaction includes a command and response packet. There are multiple types of command and response packets. A packet type field within each packet identifies the type of packet. It is advantageous if the first byte of the packet identifies a destination queue. That provides a particular advantage when the link is only 8-bits wide since the first byte contains necessary routing information. Otherwise, in an 8-bit link implementation, the target would have to wait for the second byte to determine the appropriate destination.

Thus, in one embodiment, the first 8-bits of the packet include a 5-bit Pipe Identification (ID) field and the first 3-bits of a 6-bit Packet Type field. The Pipe ID field, which identifies the pipe on which the transaction is being carried, is used to route the packet to the correct pipe hardware and the first 2-bits of the Packet Type field identify the correct queue within the pipe hardware. The pipe hardware includes Command, Response, Write Data, and Read Data queues. The first bit (bit 0) of the packet type field specifies whether the packet is a Command (0) from the source or Response (1) from the target. The second most significant bit (bit 1) specifies whether the operation is a Read (0) or Write (1) operation. Exemplary packet types for the command packets sent from the source to the target are shown in Table 1.

TABLE 1

| Packet Type Code | Command |
| --- | --- |
| 000000 | NOP (contains buffer available status) |
| 000001 | Memory read request |
| 000010 | Non-addressed read request |
| 000011–001111 | Reserved |
| 010000 | Memory write |
| 010001 | Special cycle write |
| 010010 | Non-addressed write |
| 010110–010011 | Reserved |
| 010111 | Flush command |
| 010101 | Fence command |
| 011111–010111 | Reserved |

Exemplary response packets sent from a source to a target in response to a command are shown in Table 2. The exact packet types may vary according to the requirements of particular implementation.

TABLE 2

| Packet Type Code | Command |
| --- | --- |
| 100000 | Read response |
| 100001 | Non-Addressed read response |
| 100010 | Read reject |
| 101111–100011 | Reserved |
| 110000 | Write Acknowledge |
| 110001 | Write Negative Acknowledge |
| 111111–111010 | Reserved |

Transactions across the bus may be pipelined. The pipeline structures may support two different kinds of pipelining, "in order" and "out of order" transactions. In order pipelining means that multiple transaction can be outstanding, but they are strictly ordered, i. e., they are responded to by the target in the exact order that they were issued by the source. For example, if three write commands are issued from a source to a target, performs the write to the addressed function and provides the acknowledgements (ACKs), once the writes are complete, in the order the write commands were received from the source. In one implementation, there need be no explicit configuration programming to specify the depth of in order pipelining as this can be handled as a consequence of flow control which is described further herein.

Out of order transactions can be supported on a pipe by pipe basis. On pipes that support out of order pipelining, a tag number is assigned to each transaction. This tag uniquely identifies the transaction. Both the command packets and the response packets, e.g., the read request and the read response packets, include the tag. The source has the responsibility to assign and retire the tag. Thus, the source maintains a pool of tags from which to draw for the next transactions. Once a tag is assigned to a transaction, it is unavailable for any further transactions until the response arrives at that source with the tag. At that time, the tag is retired and becomes available again for the tag. The value of the tag, in one embodiment, does need to indicate any order or sequence of the transaction.

The depth of the pipeline may be defined by the length of the tag field and may be programmable. At configuration time, for example, each pipe may be specified to be 0, 8, 16, or 32 transactions deep. Programming a tag field to have a predetermined length, e.g., zero, may be used to indicate that only in order transactions are allowed. The number of tag bits in a packet is typically fixed, so setting the length to a particular value effects which bits are don't cares and which bits are used. In one embodiment, the processor module-interface module link includes a CPU source pipe (with the source on the processor module) which does not support out of order transactions. The processor module may also include a memory controller target concentrator which is discussed further herein. Pipes going to the memory controller target concentrator should support out of order transactions at the processor module side. It is optional on a pipe by pipe basis at the interface module side.

Tags are assigned by the source end and retired when the transaction completes. If out of order operation is disabled by setting the pipe depth field to e.g., zero, that does not imply that pipelining is disabled, in-order pipelining would still be allowed.

For those pipes that allow out of order transactions, within the command queue of a source pipe, packets are ordered by the source function and transmitted in that order. At the target end of pipes that support out of order transactions, responses and acknowledgements are sent in the order that they are available. However, problems may arise when transactions are out of order. Specifically problems can arise when (1) reads pass reads (2) reads pass writes (3) writes pass writes or (4) writes pass reads.

It is the responsibility of the source end function to correctly order reads and writes with respect to each other as they are presented to the link layer arbiter for transport scheduling. Problems arise at the target end where transactions may or may not be processed in the order that they arrive. Similarly, because some target functions (e.g., the memory controller on the processor module), have read and write queues, synchronization can be lost–especially in the case of interrupts. One solution to these problems is to use fence and flush commands as discussed further herein.

The NOP command provides an opportunity for the buffer available status, which is described further herein, to be provided from the target to the source.

READ TRANSACTIONS

Reads take place as a series of split requests and responses. Read requests are sent from source to target, while read data flows back from the target to the source.

For applications where a unique I/O space is defined, such as in an x86 processor environment, access to I/O space and configuration space are mapped into dedicated space (e.g., FE 0000 FFFF–FE 0000 0000) within a 40-bit memory address range. In one x86 embodiment, an exemplary address map for the processor module-interface module is shown in FIG. 6 (other address maps are of course possible):

One kind of read transaction is configuration reads. Current x86 based personal computers (PCs) create a unique configuration space by creating a 32-bit address port at I/O addresses 0CF8h–0CFBh and a 32-bit data port at I/O addresses 0CFCh–0FCFFh. The link simply carries the I/O accesses across the link. Each termination of a CPU source pipe, such as the CPU pipe target distributor in the interface module (IM) as described further herein, is responsible for building the configuration space for the functions residing behind the end point.

Pipes can be designed to allow reads to be rejected by the target. That is done by returning a read reject packet. Support for read rejection may be optional on a pipe-by-pipe basis.

Special read transactions may be supported by pipes to provide additional capability. Two such special read transactions are described below and may be supported on a pipe-by-pipe basis. The first special read transaction is a "non-addressed read." Such a non-addressed read is a special transaction over a dedicated pipe where the target is non-addressed. For example, the target may be a FIFO. In order to simplify hardware, pipes may restrict this type of transaction such that a "non-addressed read" cannot coexist on the same pipe with addressed transactions. Alternatively, pipes may support both addressed and non-addressed read transactions returning a specific location (e.g. a FIFO) for non addressed reads. That implies that the non-addressed read command provides an additional address decode. Additionally, pipelining of "non-addressed reads", in the sense of having multiple outstanding non-addressed read transactions, may not be supported due to added hardware complexity. A non-addressed read transaction type reduces overhead on the link. In certain implementations the non-addressed read is implemented as a normal transaction where the address field is simply ignored by receive hardware as described further herein.

A second special read transaction is the "read all" transaction. A source responds to the read all transactions by indicating in the response packet how many data bytes are being returned via its size field. One implementation of the read all transaction uses standard read requests with the data size set to maximum. Only hardware specifically designed to operate in a read all fashion needs to support this operation.

The read all mechanism is another special transaction that allows reading a without the reader needing to know the exact number of bytes to be read. For example, assume that a FIFO is being filled with audio data from a codec. The FIFO generates an indication when it is half full. At a non-determinant time latter, the FIFO is read. In this case, the amount of data in the FIFO is probably not equal to half the FIFO depth. A "read all" transaction returns the entire contents of the FIFO (up to the maximum packet size) along with a byte count. In the case that the reading entity is not the host CPU, this simplifies the hardware because it does not need to read some FIFO status register to determine availability and amount of data in the FIFO. Read all transactions can be implemented on both addressed and non-addressed pipes. A read all transaction to an empty FIFO may return a read reject response packet to indicate that no data is available. For pipe hardware that supports read all operation, a read request with the size field set to maximum is interpreted as "send me as many bytes as you have (up to the maximum)." In the read response packet, the size field indicates the number of bytes returned.

WRITE TRANSACTIONS

The second major type of transaction across a pipe is a write transaction. Write transactions take place as a series of split write data packets and acknowledgements (ACK or NAK). Write data is sent from source to target, and acknowledgements are returned from target to source. On pipes that support out of order pipelining, a tag number is assigned to each transaction.

When a write transaction is sent from a non-coherent portion of the system (such as the interface module) to a coherent region (such as the processor module), the target should return an acknowledgement when the write data enters the coherent region of the system. The coherent region implies that data is being written to a region of main memory that may be cached and it is necessary to maintain coherency between cache memory and main memory as is known in the art. Waiting until data enters the coherent region of the system helps ensure that subsequent reads do not pass by the write data before it reaches a point where it can be snooped–which could return invalid data from memory before it can be updated.

Special write cycles provide a way to broadcast messages and are typically used for sending system management messages. Broadcast capability may be provided to broadcast to all pipes on the link, all devices or functions coupled to a pipe or other broadcast variations as described further herein with relation to the special cycle mechanism.

Additional write transactions provide enhanced capabilities which may be supported only by certain pipes. A "non-addressed write" is a special transaction over a dedicated pipe where the target is non-addressed, e.g., a FIFO. The transaction is analogous to a non-addressed read. The non-addressed write transaction may be precluded from coexisting on the same pipe with addressed transactions in order to reduce hardware complexity. In addition pipelining may not be supported for non-addressed writes. The non-addressed write transactions reduces overhead on the link. The non addressed write transactions may also be implemented using a normal transaction in which the address field is ignored. That mean that the non addressed write command does not need to be used. The target ignores the address field and writes received data into a predetermined location.

The "fence" command builds a wall at the target end that requires all transactions received prior to the receipt of the fence command to be executed prior to processing any transactions received after the receipt of the fence. The fence command is sent on the write pipe, but effects both reads and writes. Fence commands are neither tagged nor acknowledged.

Because there is a need for synchronization, especially in the event of interrupts, it is necessary to instruct a target function to complete all outstanding reads and writes and know when they have been completed. That is done with a "Flush" command. The Flush command packet (sent on the write pipe) commands the receiving side to complete all previous reads and writes immediately and return an acknowledge packet when done.

As described, the pipes carry transactions over the link in packets. The packets are independent of the width of the link. A wider bus just transfers more bytes of the packet in a particular time frame. Not all pipes need to support all types of transactions. Error detection bits, e.g., parity bits, are not shown.

PACKET STRUCTURE

The various packets are shown in FIGS. 7A–7L. The memory write packet is shown in FIG. 7A. The 5-bit pipe ID field serves as both the source and target address, and uniquely identifies each pipe. The target side packet router uses the Pipe ID as the internal destination address. The target then uses this same Pipe ID number as the return address for the response packet. Pipe IDs may be statically assigned or programmable. For example, pipe ID numbers may be statically assigned in the interface module. In the processor module, the CPU source ID may be statically assigned while other processor module pipe IDs may be programmed at configuration time.

The 6-bit Packet Type field identifies the command or response as previously described in Tables 1 and 2.

The 5-bit tag field uniquely identifies transactions on pipes where out of order transactions are allowed. The combination of the Pipe ID and the tag form a transaction ID that is unique across all the pipes carrying transactions on the link. As previously stated, tags do not necessarily imply the order in which transactions are generated. For example, a write transaction's tag simply links it to a specific write response (which will have the same tag number). The same is true for reads; the tag only ties the returned data to the read request that had the same number.

The four bit buffer available field provides flow control information. As transactions flow across the link, they deplete and fill various queues (e.g. command, read data, response, etc.) in the pipe targets and sources. Flow control prevents queues in the targets and sources from being over filled utilizing the Buffer Available field provided in all response packets. An "implicit coupon" system is used, whereby the sending side of the link maintains a count of available receive buffers, transmitting only if the count is above zero. The receive side of the link updates the send side every time it frees up a buffer location, causing the send side to increment its counter. The send side decrements its counter whenever it sends a packet.

Note that since transactions flow from source to target, and sources know the status of their own queues, the only buffer status information that needs to be passed is from target to source. The target can assume that the source has the necessary empty buffers or it would not have initiated the transaction. Note also that the Read Data and Response queue statuses are not essential if the command buffer depth is equal to or shallower than the Read Data and Response transmit queues.

Flow control may be implemented as follows. Each bit in the 4-bit Buffer Available field specifies the availability (or not) of an additional location, as follows.

| Bit 3 | Bit 2 | Bit 1 | Bit 0 |
|---|---|---|---|
| Read Data | Write data | Response | Command |

Keep in mind that a bit set to 1 indicates that the sending side has an additional empty receive buffer.

A problem arises when flow control is used on pipes that feed a target concentrators (discussed further herein), such as at the interface of the link to the memory controller. It is possible to have separate queues for each pipe (each with its own flow control), but this is often wasteful. In the case of the memory controller concentrator, a shared pair of isochronous and asynchronous buffers is a reasonable configuration. The coupons indicating available target resources need to get allocated among the multiple pipes feeding a shared set of queues. The following rules may be used. First, all pipes that feed the same set of queues share a single set of free buffer counts. Secondly, buffer status is sent only on the lowest numbered pipe (pipe ID) for all pipes that share a common set of queues.

There are various ways to distribute coupons among the pipes at the source side of the link. One safe mechanism to distribute coupons is to centralize the free buffer counters at the link layer arbitration point. In this way, coupons can be allocated using the same priority that the arbiter uses to allocate bandwidth.

Referring still to FIG. 7A, the six bit size field specifies the number of data bytes being sent ($2^n$+1). The 6-bit field specifies the length of the data field. The size field specifies number of data bytes in the packet (not the total length of the packet).

The 40 bit address field (Addr), when present, provides a physical address. The link layer typically has no direct involvement with the address field; it simply passes the address to the function owning the pipe. One subtle exception to this rule when the link layer hardware extracts and builds the configuration space out of the address field as discussed further herein.

The data field provides up to 64 bytes of data. The link layer transports but typically does not interpret or otherwise act on the content of the data field, it is simply provided by or passed on to the function owning the pipe The structure of other packets used for various link transactions are shown in FIGS. 7B–7L. For special cycle writes, which are identified by a unique packet type code, the tag and address fields are don't cares and the size (in one implementation) is 00011b (4 bytes).

In implementations in which data is clocked on both edges of a clock, it may be advantageous to have packets be an even number of bit times so that packets can always start on the same edge of a clock. In such an implementation, the NOP packet shown in FIG. 7L would have an extra 8 bits reserved to provide an even number of bit times.

Note that the packet structures shown in FIGS. 7A–7L are exemplary. The lengths of the fields may vary in certain implementations. Additionally, some fields may not be used and other fields used instead.

As discussed, out of order operation and pipeline depth can be programmable and may be specified in the function configuration register block on a pipe by pipe basis. Assuming that out of order operation is configured for at least some pipes, then tags are available for pipelining of out of order transactions.

However, there may be a condition in which no tags are available for a particular pipe for an extended period of time. That condition may indicate a system failure. Therefore, in order to detect such a system failure, a no-tags-free timer may be provided that is programmed at configuration time with the timer value either on a pipe by pipe basis or as whole. The no-tags-free time alerts the system to deadlocks where a no free tags condition persists for more than a programmable number of frames or any other time increment determined to be appropriate for the alert. An interrupt is generated if the timer expires.

Figure 8:
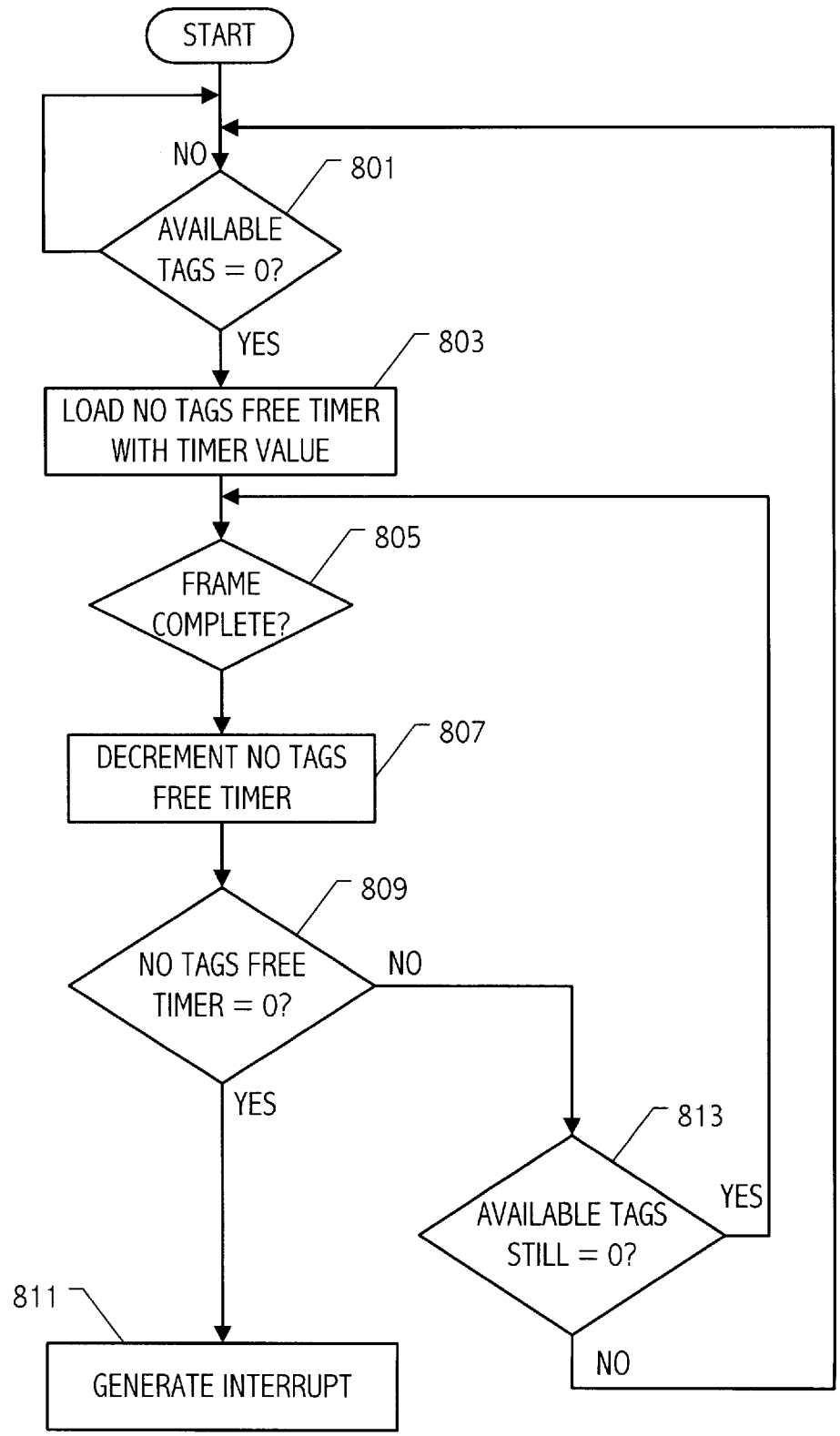
FIG. 8 shows a flow diagram for determining a no tags free error condition.

Referring to FIG. 8, the no tags free condition is checked in 801. The no tags free condition can be determined by checking if the number of available tags is zero, or equivalently, when the number of issued tags is the maximum number available. If the no tags free condition is true, the no tags free timer is loaded with the time value in 803, the timer value being set at configuration time. For each frame that completes in 805 the no tags free timer is decremented in 807. If the no tags free timer has expired in 809, then an interrupt is generated in 811. If the no tags free timer is not expired yet, then the system determines if the no tags free condition continues in 813 and if so, waits for the frame to complete in 805. If the no tags fee condition no longer exists then the system returns to 801 waiting for the condition to reappear. If the interrupt is generated in 811, the processor processes the error condition.

Note it is also possible to assign tags for in order transactions as well. That may provide the advantage of simple implementation for assuring in order transactions are maintained in order. In such embodiments, the no tags free condition can also be used to indicate a pipe stalled condition exists on the pipe even though only in order transactions are allowed on the pipe.

Figure 9:
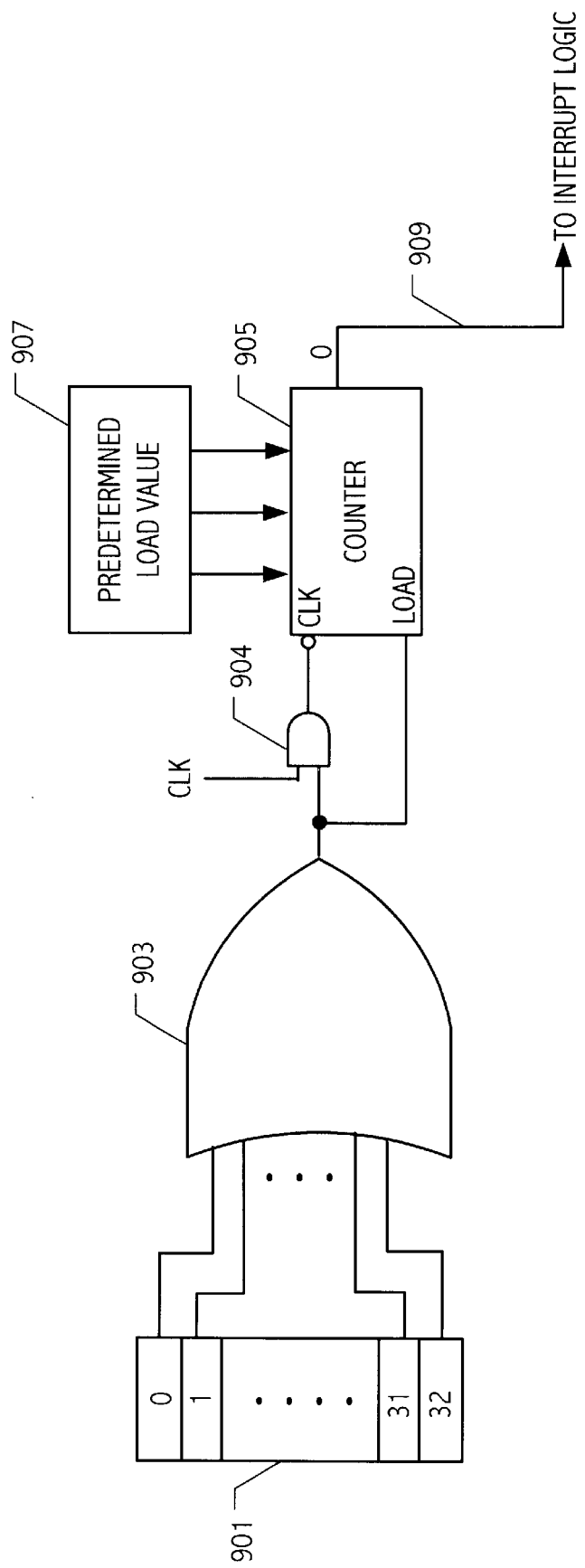
FIG. 9 shows one implementation of a circuit to detect the no tags free error condition.

A number of circuits may be used to track available tags. For instance, if the number of tags is 32, then one implementation provides a 32 bit register that may be used to indicate which tag is available and which tags have been issued. Referring to FIG. 9, each bit of register 901 corresponds to the corresponding tag number and is set if the tag is available and cleared if the tag has been issued. When a tag is retired, the bit is set again. An OR gate 903 logically combines the outputs from register 901 and provides a signal to AND gate 904. AND gate 904 combines the output from OR gate 903 and a CLK signal indicating a frame boundary and provides a signal to down counter 903 that enables the counter to count down when the signal from the OR gate is 0 (all tags have been issued). When the signal from the OR gate is non-zero, i.e., tags are available, the signal causes the counter to be loaded with a predetermined value 907. If counter 905 counts down to zero, a zero indication 909 is provided to interrupt logic.

If the no tags free condition exists on a pipe that goes to the processor module, the processor may be able to read a register directly to determine the cause of the interrupt and the particular pipe that failed. However, if the failure occurs on a subordinate bus structure, which is described further herein, the failure would result in an instant message being sent back to the processor over the link indicating the error condition existed and causing an interrupt to be generated. Note that there may be timers for each pipe. Those timers may be restricted to those pipes that support out of order transactions. Interrupt logic may collate the timers on the pipes to provide an interrupt to the system.

Another capability that enhances the ability of the CPU to monitor system conditions is to see how many reads and writes are outstanding. In order to provide this capability the source end of a pipe maintains a tag status register that indicates how many outstanding reads and writes exist on the pipe (i.e. the number of tags used). Thus, the CPU can read registers in source ends to determine how many outstanding reads and writes exist. That may be done by the CPU issuing a configuration status read request to a tag status register within the desired pipe source. The pipe source, in response provides the contents of the tag status register. In one embodiment, the logic to provide this information is implemented with an incrementer/decrementer in which a register initially containing the tag depth (e.g., 8, 16, or 32) is decremented whenever a tag is issued by the source. The register value is incremented whenever a tag is retired. In that way a current count of outstanding transactions can be maintained. If the tag depth is programmed to be zero (no out of order transactions allowed), then the tag status register should never be incremented (or decremented).

PIPE STRUCTURES

In order to carry the transactions described herein, the link includes various configurations of pipes to couple a function on one side of the link to a function on another side of the link. With a pipe identification field of 5 bits, the link supports up to 32 pipes. A larger pipe identification field would support more pipes. Pipes carry either isochronous data or asynchronous data, but not both. Isochronous pipes carry data that requires guaranteed bandwidth and deterministic latency. By definition, these are not status register reads or writes. Typically, this is data movement into and out of a FIFO buffer. Isochronous pipes are generally associated with DMA mechanisms. Isochronous pipes can be pipelined or not as specified in the configuration register.

Asynchronous pipes are used when latency should be minimized and bandwidth need not be guaranteed. There are three basic uses for asynchronous pipes: 1) register accesses; 2) DMA data transport; and 3) configuration accesses. Note that "register accesses" also includes writing and reading data to/from memory, i.e., non-DMA accesses to memory. Register accesses tend to be random and short—e.g., read a 32-bit register or write data to a memory-resident mailbox. DMA operations tend to be bulk data moves such as reading a page of data from disk. Asynchronous pipes may or may not be pipelined. That can be specified in the configuration register.

Figure 10:
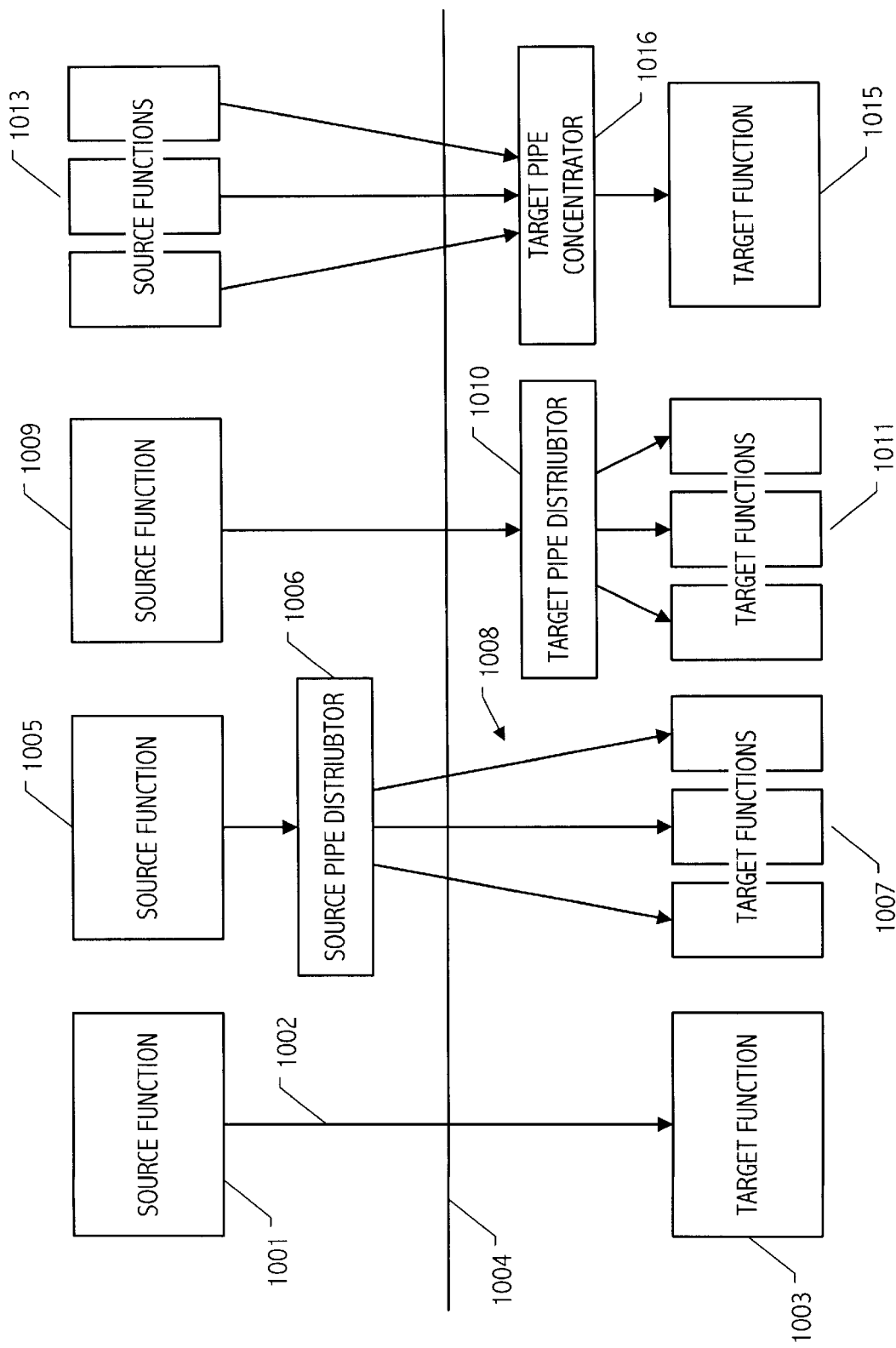
FIG. 10 shows common pipe configurations used in various embodiments of the present invention.

As stated, pipes can have various end point configurations. In their simplest configuration, pipes are point-to-point mechanisms. With the addition of concentrators and distributors, which are described further herein, at either the source or the target, pipes can connect functions in a number of configurations. A number of the most common pipe configuration are shown in FIG. 10. The simplest is a point to point configuration in which one function 1001 is connected to another function 1003 via pipe 1002 over link 1004. A second configuration is shown as a point-to-multi-point configuration in which a source function 1005 is coupled to multiple target functions 1007 through a source pipe distributor 1006. Note that multiple pipes 1008 are used to connect the source pipe distributor to the target functions.

A second point to multi-point configuration is shown as source function 1009 coupled to multiple functions on the target side through target pipe distributor 1010. Finally a multi-point to point configuration is shown as multiple source functions 1013 couple to a single target function 1015 through target pipe concentrator 1016. Other configurations (not shown) include the source concentrator in which multiple functions connect through a source concentrator over a single pipe to a target. Another configuration not shown is the multi-point to multi-point configuration.

Distributors and concentrators provide the mechanism to provide the various point to multi-point and multi-point to point configurations discussed. Distributors connect a single function to multiple functions. The distributor can either be in the source (1006) or the target (1010). Concentrators such as target concentrator 1016 connect multiple pipes to a single function and can also exist at either the source or the target end.

In practice, most pipes will not be point-to-point, but there may be cases where such pipes are useful for coupling two functions—just as if they were connected by dedicated wires.

Figure 11:
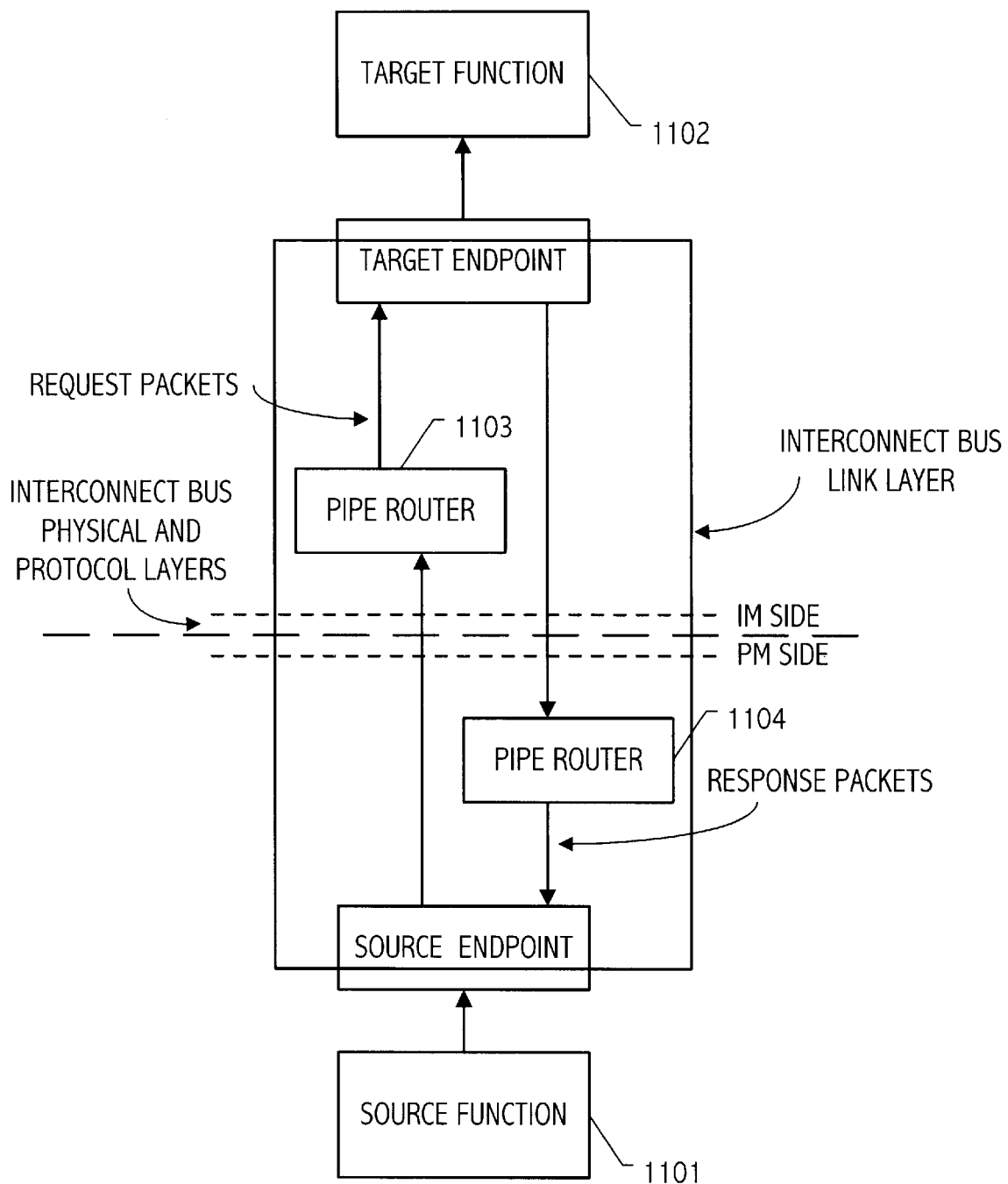
FIG. 11 illustrates a point to point pipe configuration.

An analysis of the point-to-point mechanism provides a good introduction to link layer operation. Referring to FIG. 11, assume a source function 1101 on one end of the link, and a target function 1102 on the other end of the link. Each function connects to the link via interface hardware that terminates the link protocol link layer transactions. That hardware is referred to as an end point (designated target-end and source-end). In general, functions do not know anything about the link. In a personal computer utilizing the link, to change that fact would require modifying standard and existing functions to talk over the link. That would also likely require changing driver software for the functions rendering such an approach incompatible with a wide array of existing computer products, an obvious disadvantage.

Accordingly, in such applications as personal computers, the existence of the link at the protocol and link layer is preferably transparent to the functions.

Sources generate transactions. Targets receive transactions and fulfill them. Thus for example, for read transactions, the target receives the read address (of a location in the function) and a read size. The transaction is fulfilled by the target by returning the data. For writes, the data sent by the source is written into the target function and an acknowledge is returned. Pipes can carry both reads and writes or they can be used in pairs with reads on one and writes on the other.

Still referring to FIG. 11, the figure shows a pipe running from source 1101 to target 1102. The source sends request packets to the target, which returns responses. Since the link carries multiple pipes, hardware is required at each end to rout packets to the correct endpoints. That hardware is shown as the pipe router circuits 1103 and 1104 on either side of the link. The router routs packets to the appropriate end point according to the pipe ID. FIG. 11 illustrates an exemplary pipe running from processor module (PM) to interface module (IM); an interface module to processor module pipe could look identical.

Figure 12:
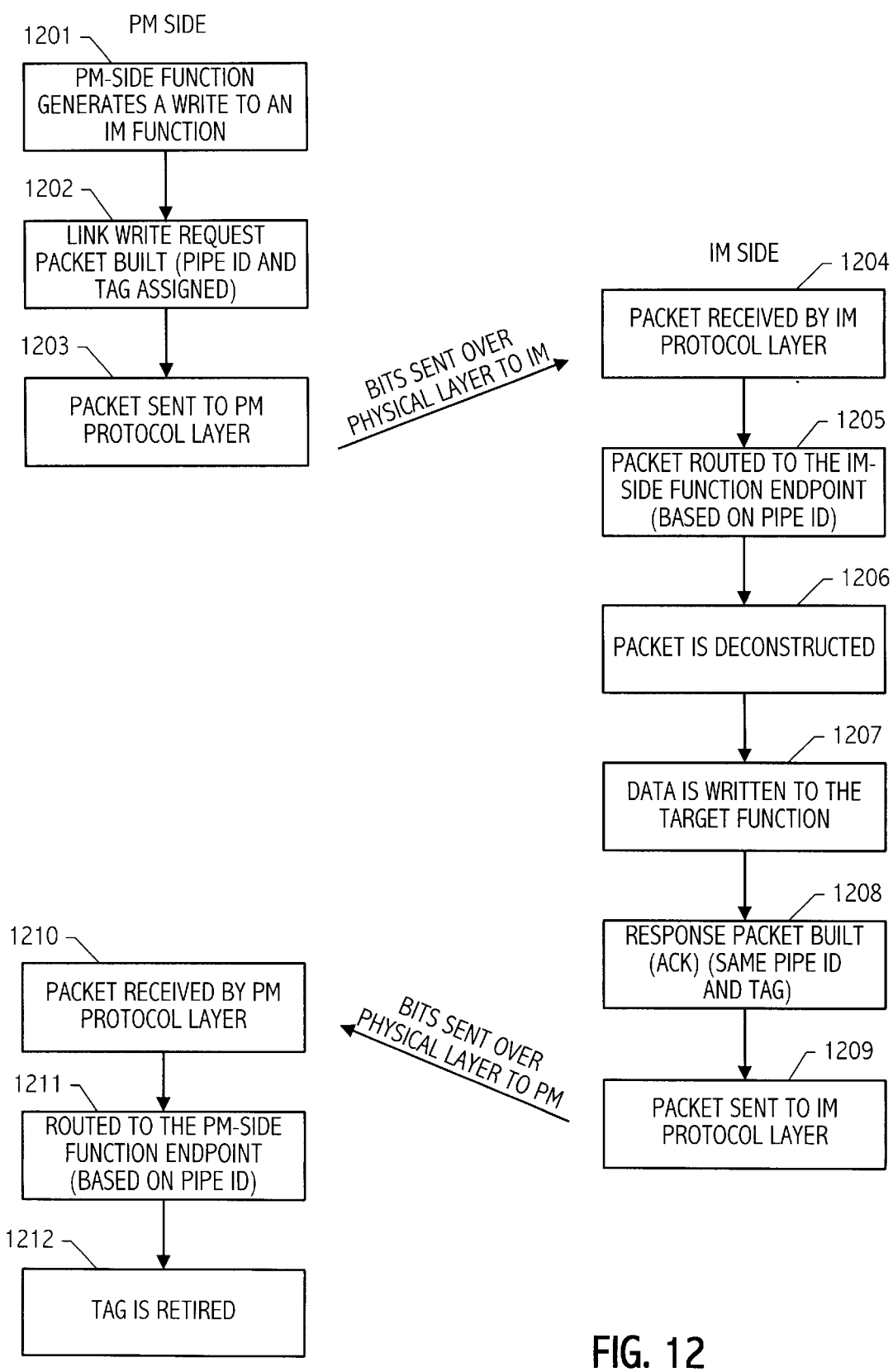
FIG. 12 illustrates a flow diagram of a write transaction across the link.

Referring to FIG. 12, the flow diagram shows how one processor module function communicates with one interface module function via the link (the interface module function could be a 1394 host controller, for example). Note how the transaction flows from source to target (processor module to interface module), while packets flow in both directions. The processor module side function generates a write to an interface module function (1201). The link write packet is built in (1202) with the appropriate pipe ID and tag. The packet is sent to the processor module protocol layer in 1203 and the packet is transported to the interface module side of the link via the physical layer. The interface module side receives the packet in 1204. The packet is routed to the interface module-side function end point based on the pipe ID in 1205. The packet is deconstructed, and the data is written to the target function. Once the write is completed successfully, the response packet is built in 1208, sent to the interface module protocol layer in 1209, transported over the physical layer to the processor module. The ACK is received by the processor module protocol layer in 1210 and routed to the processor module-side function end point based on the pipe ID. The pipe hardware retires any tag associated with the response packet.

Distributors connect a single pipe to multiple functions. When a single source function is connected to multiple target functions, some splitting function is required to route each transaction to the proper end point. That can be handled on either the source or the target end of the link. There are benefits and costs of each approach.

Figure 13:
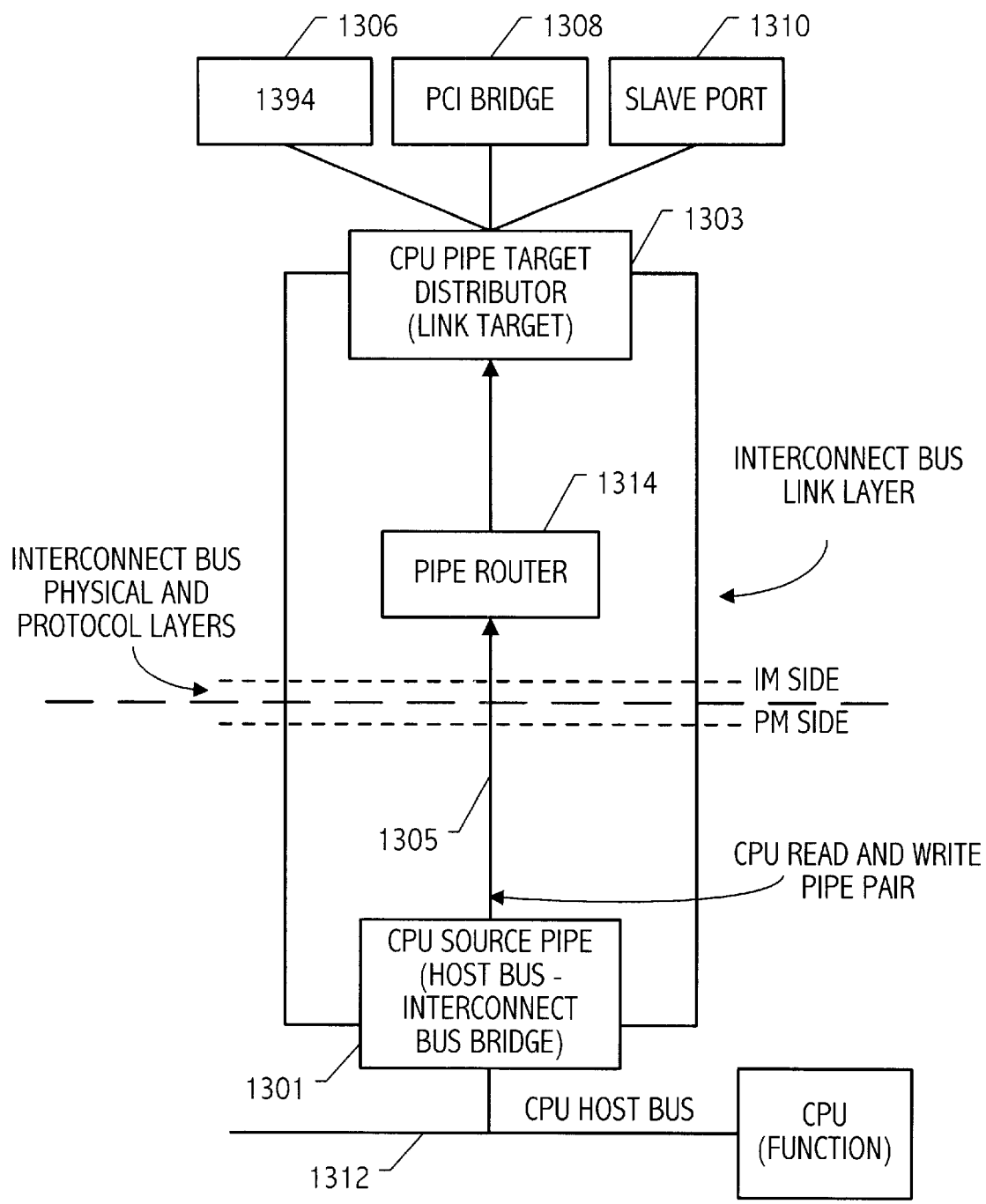
FIG. 13 illustrates a target distributor pipe configuration.

The target distributor, as the name implies, performs the splitting function at the target end. Referring to FIG. 13, the source 1301 couples to the target 1303 via a single pipe 1305 (or a read/write pipe pair). At the target end, the pipe terminates at a routing function 1303 that distributes transactions to the appropriate function 1306, 1308 and 1310. In the illustrated example, the functions coupled to the target includes a 1394 host controller 1306, PCI bridge 1308 and slave port 1310. Generally, the distribution of transactions between target functions is based on the physical address (contained in the 40 bit address field of the packet). Distribution could also be made based on the content of the data field.

Target distributors may appear in two places in a typical personal computer system utilizing the invention(s) described herein: 1) the termination of the CPU pipe within the interface module (this is the mechanism for the CPU to access all of the interface module-side functions over a single pipe); and 2) distribution of memory accesses between two processor module-side memory spaces (e.g., main memory and advanced graphics port (AGP) memory). In both of these cases the target distributor routs accesses based on address.

Assume, for example, that the CPU in the processor module couples to all of the interface module functions (e.g., the 1394 host controller 1306, USB host controller (not shown), PCI bridge 1308, slave port bridge 1310. At the processor module side of the link, the source-side pipe hardware couples the CPU Host Bus to the link. That pipe hardware is part of the host bus—link bridge 1301 which provides a translation function between the CPU host bus 1312 and the link. CPU reads and writes to addresses residing on the far side of the link, i.e. on the processor module side, are "claimed" by the source-side pipe hardware. This "claiming" is based on an address-mapping table established at configuration time and operates in a manner analogous to how the PCI host bridge works in traditional north bridge integrated circuits in current personal computer systems. Once the transaction is determined to fall within the address-mapping (i.e. the transaction is directed to the far end of the link), a read request or write command packet is generated and sent over the link to the interface module. The packet has the pipe's unique pipe ID number. Remember that the source and target ends of the pipe have the same pipe ID number. Thus, the ID serves as both the source and destination address for the transaction. At the interface module side, the packet is routed by pipe router 1314 to the CPU pipe target distributor 1303 based on the pipe ID number field in the packet header. If a read request or write command packet is generated and sent over the link to the interface module but the transaction is not claimed by the interface module side, an error condition exists and the processor is notified via an interrupt (e.g., a non maskable interrupt (MI).

In certain embodiments, the functions behind the distributor do not know anything about the link protocol. In the case of a read request, the distributor determines which of the various functions is being accessed based on a memory map table (established at configuration time) and performs a read to that function. The mechanism used to perform this read to the functions is typically independent of the link. For example the mechanism may be implemented as a point to point connection between the function and the distributor, or as a bus with multiple functions. The function returns the data to the distributor, which builds a read response packet. The response packet is sent over the link to the processor module. The processor module side of the link uses the pipe ID number to route the packet to the host bus-link bridge. From there, the data is presented to the CPU.

In pipe structure illustrated in FIG. 13, note that the processor module-side incoming packet router is omitted for clarity. The processor module-side incoming packet router logic routes the read response packet to the host bus—link bridge based on the pipe ID number.

A source function can issue subsequent reads before the data from the first read is returned. That "pipelining" requires a mechanism to uniquely identify the two halves of each transaction (read request/ read response, and write command/ write acknowledge). The transaction identifier, as previously discussed, may be the tag which is assigned by the source.

Figure 14:
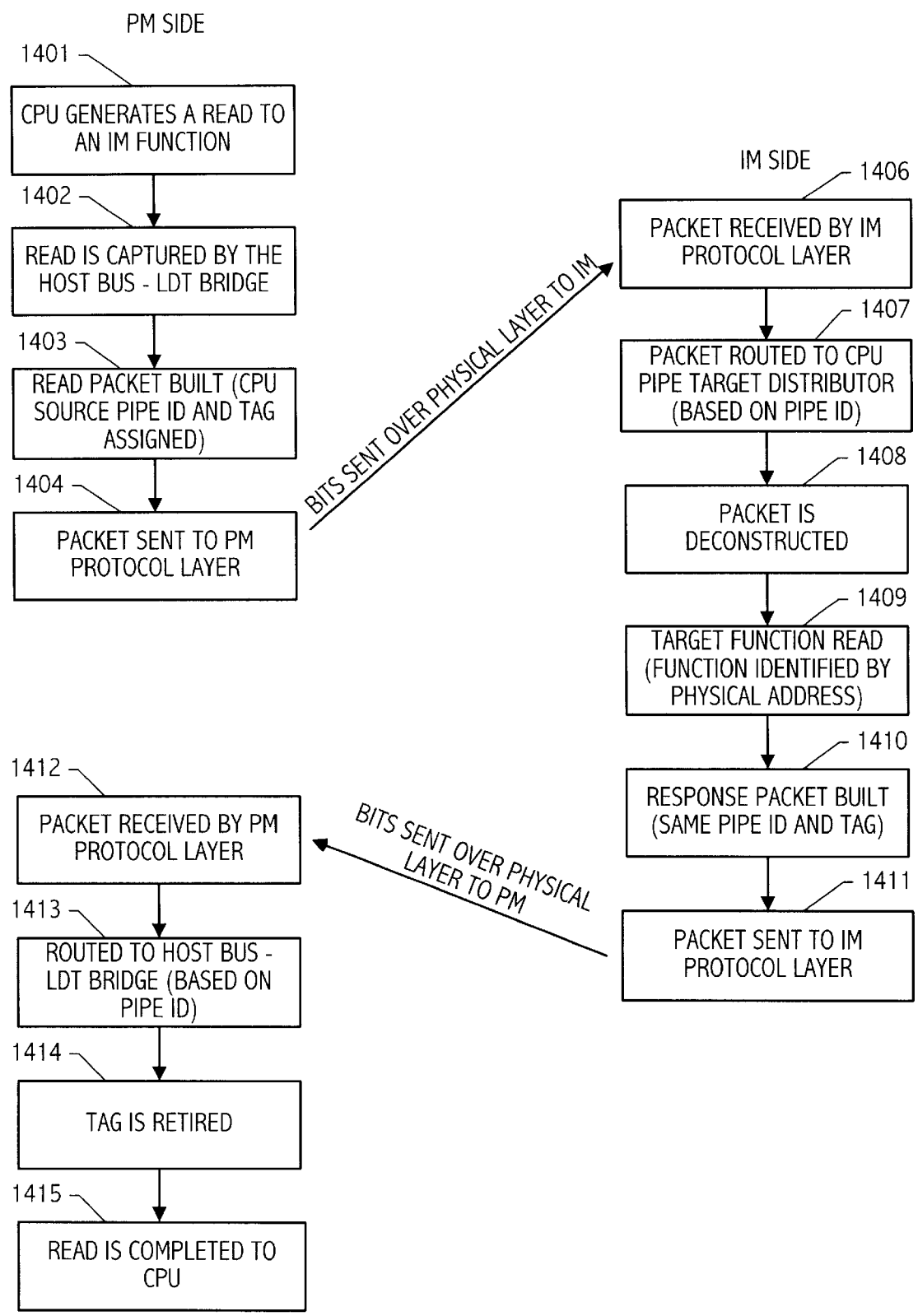
FIG. 14 illustrates a flow diagram of a read transactions across the link.

Referring to FIG. 14, the flow diagram shows how one processor module function (the CPU in this case) communicates with one interface module function via the link (the interface module function could be the 1394 host controller, for example). Note again how the transaction flows from source to target (PM to IM), while packets flow in both directions. The CPU generates a read to an interface module function (1401). The read is captured by the host bus-link bridge (1402) which uses a mapping function to determine that the address of the read is in the address space allocated to the interface module. The pipe hardware in the host bus-link bridge builds the read packet and assigns the pipe ID and the tag in 1403. The packet is sent by the link layer to the protocol layer (1404) and the packets bits are sent over the physical layer to the interface module side. In 1406 interface module protocol layer receives the packets and routs the packet to the CPU pipe target distributor based on the Pipe ID. The packet is deconstructed in 1408 and the target function identified by the physical address in the packet is read in 1409. Once the function has completed the read operation, the response packet is built in 1410 with the same pipe ID and tag and the response is sent to the interface module protocol layer in 1411. The physical layers transports the bits to the processor module side where the packet is received by processor module protocol layer. The packet is routed to the Host Bus-link bridge, based on the Pipe ID. The tag is retired in 1414 and the read is completed to the CPU in 1415. Note that in embodiments not allowing out of order transactions on the processor module CPU pipe, the tag field would not be used.

Target-side distribution utilizes a single pipe and thus has the advantage of requiring only one set of pipe hardware. One aspect of target distribution is that different ordering rules are hard to apply to streams of transactions aimed at separate target-side functions. For example, it may be difficult to support in order execution for one function and out of order execution for other functions in a single set of pipe hardware. Also, transactions for one target function can clog the pipeline, blocking transactions aimed at another function. Note however, that for an exemplary CPU pipe neither blocking or different rules are issues, since the CPU can control what transactions are occurring on the pipe and any domination by one function is presumably intentional by the CPU. Further, if the CPU does only in order transactions, different ordering rules are irrelevant. Care should be taken within the target distributor to insure that correct ordering is maintained.

Figure 15:
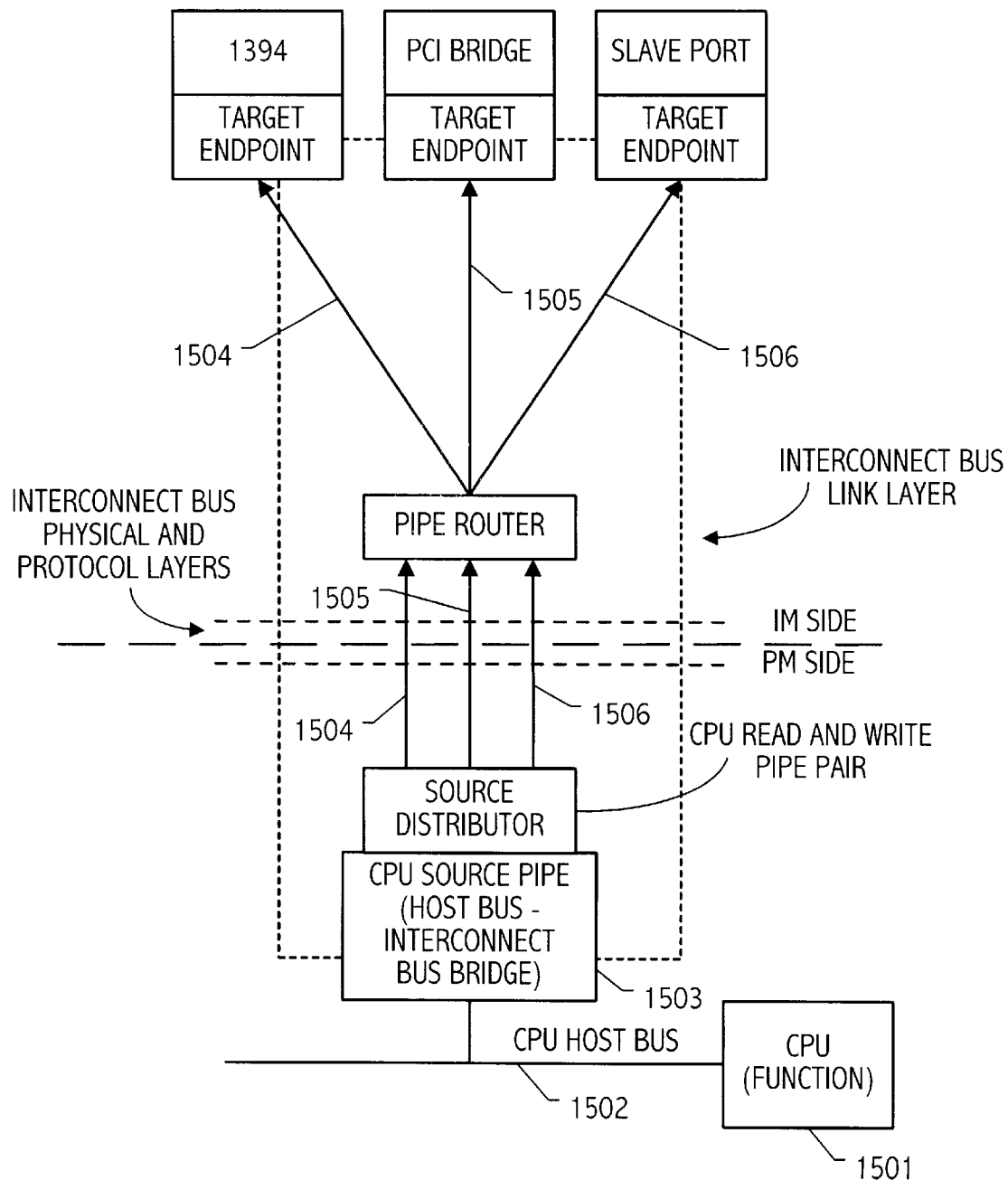
FIG. 15 illustrates a source distributor pipe configuration.

An alternative to target-side distribution is to split the stream on the source side. Referring to FIG. 15, a source distributor implementation of the CPU to processor module pipe structure is illustrated. The function on the processor module, (CPU 1501) communicates with the CPU source pipe (host bus-link bridge) 1503 over CPU host bus 1502. The source distributor function results in multiple pipes 1504, 1505 and 1506. A separate pipe is required to connect the single source to each of the several target-side functions. In essence, the address routing operation to determine the function destination for the read or write described in association with the "Target Distributor" above, moves to the source side. The address router now sits between the source function and the link pipe hardware. When a transaction occurs, it is mapped to the link and then based on the particular address, to a particular pipe. The pipe in turn is associated with a particular function. In the target distributor, the addressing function was performed by the distributor who received all the transactions for the processor module target and routed them to a particular function according to the 40 bit address internal to the packet.

The costs and benefits of source distribution are just the opposite of those for target distribution. The benefits of source distribution are that different ordering rules are easy to apply to streams of transactions aimed at separate target-side functions. Also, transactions for one target function cannot clog the pipeline, blocking transactions aimed at another function. The cost is that because multiple pipes are involved, multiple sets of pipe hardware should be provided.

The opposite of the one-to-many problem is the many-to-one case, i.e. concentration. Like distribution, concentration can be implemented either on the target or the source side of the link.

Figure 16:
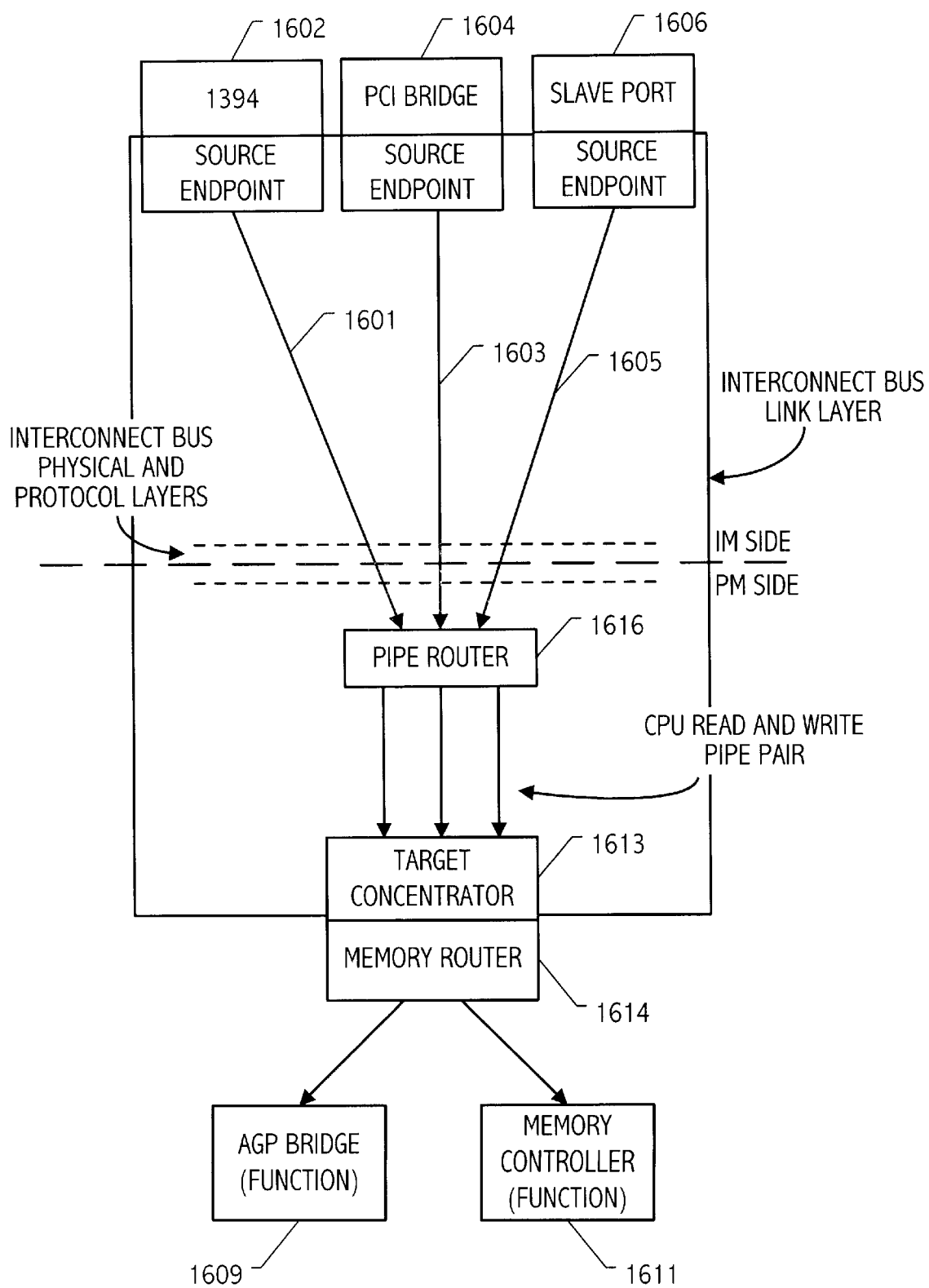
FIG. 16 illustrates a target concentrator pipe configuration.

In its simplest implementation, a target concentrator has multiple pipes from multiple functions coupling to a single target function through a target concentrator (see FIG. 10). In essence, the target concentrator is a single piece of hardware that terminates multiple pipes. A slight variant on that case is shown in FIG. 16, in which three separate pipes, 1601, 1603, 1605 from separate source functions 1394 Host Controller 1602, PCI bridge 1604 and Slave Port 1606, respectively, are coupled to two target functions, advanced graphics port (AGP) bridge 1609 and memory controller 1611. The pipes converge and are terminated by the concentrator 1613. There is an address routing mechanism that distributes transactions to the two memory functions. In the illustrated target concentrator, memory router 1614 lies behind the link termination point, and thus, it is not link-specific. Strictly speaking therefore, the memory router 1614 is the target function making the implementation shown in FIG. 16 the same as the target concentrator implementation shown in FIG. 10. However, the termination of the interconnect pipes could also have been placed in router 1614, making router 1614 the link pipe end point. The memory router 1614 should not be confused with pipe router 1616 which routs packets from the interface module to, e.g., either target concentrator 1613 or the CPU source pipe (not shown).

Note that, in FIG. 16, the target concentrator serves as the pipe end point. As such it builds the response packets. If the end point is located in the router, the response packet is built there. Note also that the response packet is directed to the originating function via a pipe router block, which is not shown.

Figure 17:
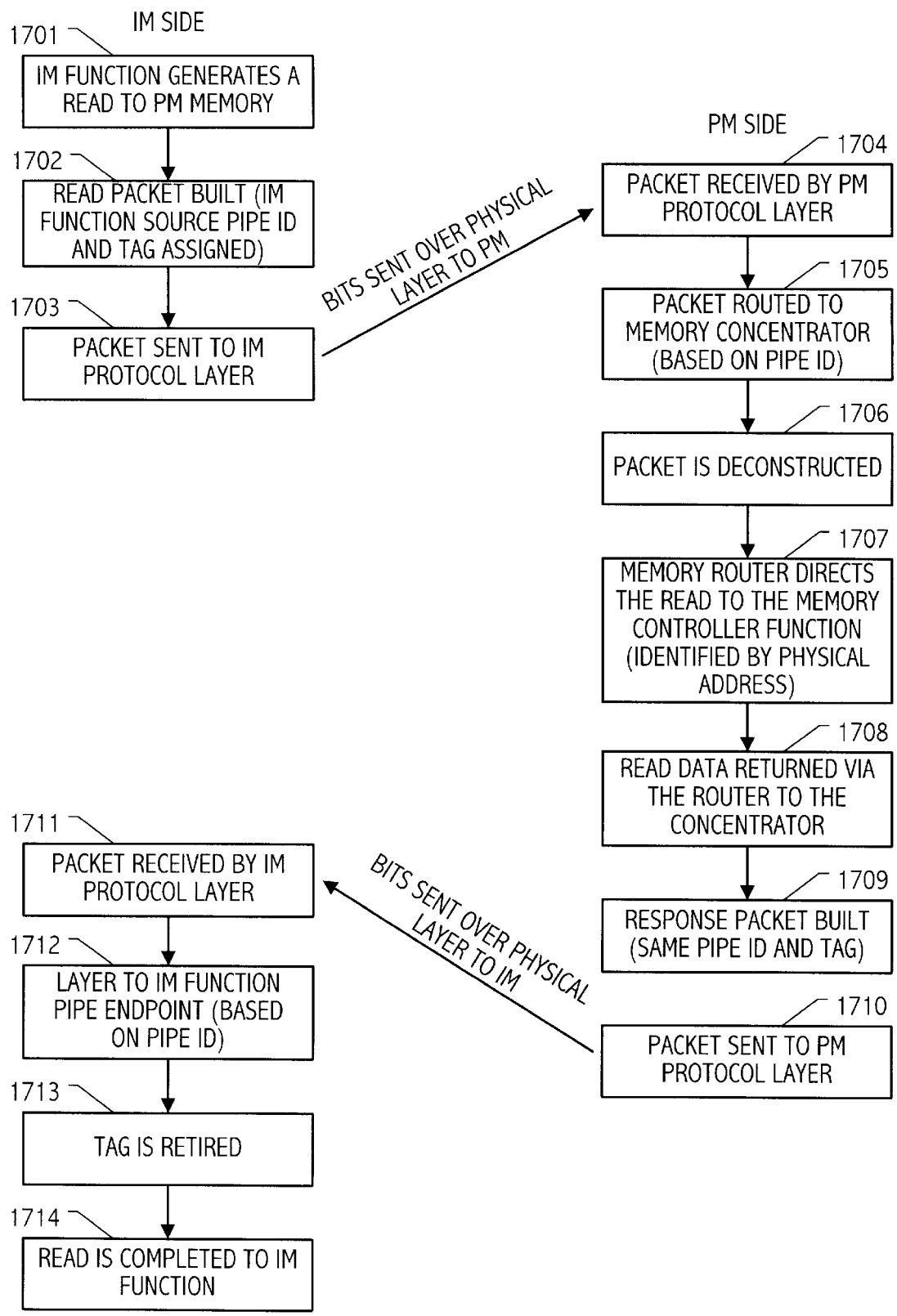
FIG. 17 illustrates a flow diagram of an interface module read transaction to memory.

Referring to FIG. 17, the flow diagram illustrates an interface module function read transaction to memory (through the processor module). Again, the transaction flows from source to target (interface module to processor module), while packets flow in both directions. The interface module function generates a read to an interface module function (1701). The interface module source builds the read packet and assigns the pipe ID and the tag in 1702. The link layer sends the packets to the protocol layer (1703) which sends the packets bits over the physical layer to the processor module side. In 1704 the processor module protocol layer receives the packets and routs the packets to the memory concentrator based on the pipe ID. The packet is deconstructed in 1706. The memory router directs the read to the memory controller function (as opposed to the AGP) based on the physical address field (1707). The memory controller reads from main memory and returns the read data via the router to the concentrator in 1708. The response packet is built in 1709 with the same pipe ID and tag and the response is sent to the interface module protocol layer in 1710. The physical layer transports the bits to the interface module side where the interface module protocol layer receives the packet in 1711. The packet is routed to the interface module function pipe endpoint based on the pipe ID. The tag is retired in 1713 and the read is completed to the interface module function in 1714.

Target concentration provides the ability to separately order transactions from separate functions. Thus, with multiple, pipes, there can be independent ordering of transactions on individual pipes. Ordering is not enforced between pipes. In addition target concentration prevents blocking of one transaction stream by another and also provides the ability to provide priority information to the memory controller. Regarding priority information, if the streams from the interface module-side functions were combined on the source side of the link into a single pipe, the source of each transaction would not be visible to the memory controller. Thus, the memory controller would have less information on which to arbitrate between competing demands for memory bandwidth. Note that when individual pipes are used, some pipes can be isochronous and some asynchronous.

An alternative to separate pipes resulting from target concentration is to combine the streams from multiple functions at the source side. That concentration is done before the streams reach the link. One example of a source concentrator is a PCI-link bridge in which multiple devices on the PCI bus are concentrated into a single bridge function coupled to the link over a single pipe. Here, the bridge is responsible for access and bandwidth allocation and PCI constructs are used for configuration. Source concentrators may be useful in situations in which a processor module can support four pipe targets into the memory controller and the interface module needs to supply five pipes. In that case, two of the sources can be combined into one pipe on the source side (interface module side) so that only four pipes are supplied to the memory controller.

Target concentration requires additional pipe hardware as compared to source concentration because there is pipe hardware on each side of the link. The benefit of source concentration is the elimination of that extra pipe hardware. However source concentration does result in: 1) the source concentrator may not have knowledge of the current state of link bandwidth allocation; 2) it is very difficult to combine two isochronous streams into a single stream; 3) the target side does not receive quality of service information on each of the original streams.

SUBORDINATE LINKS

Figure 18:
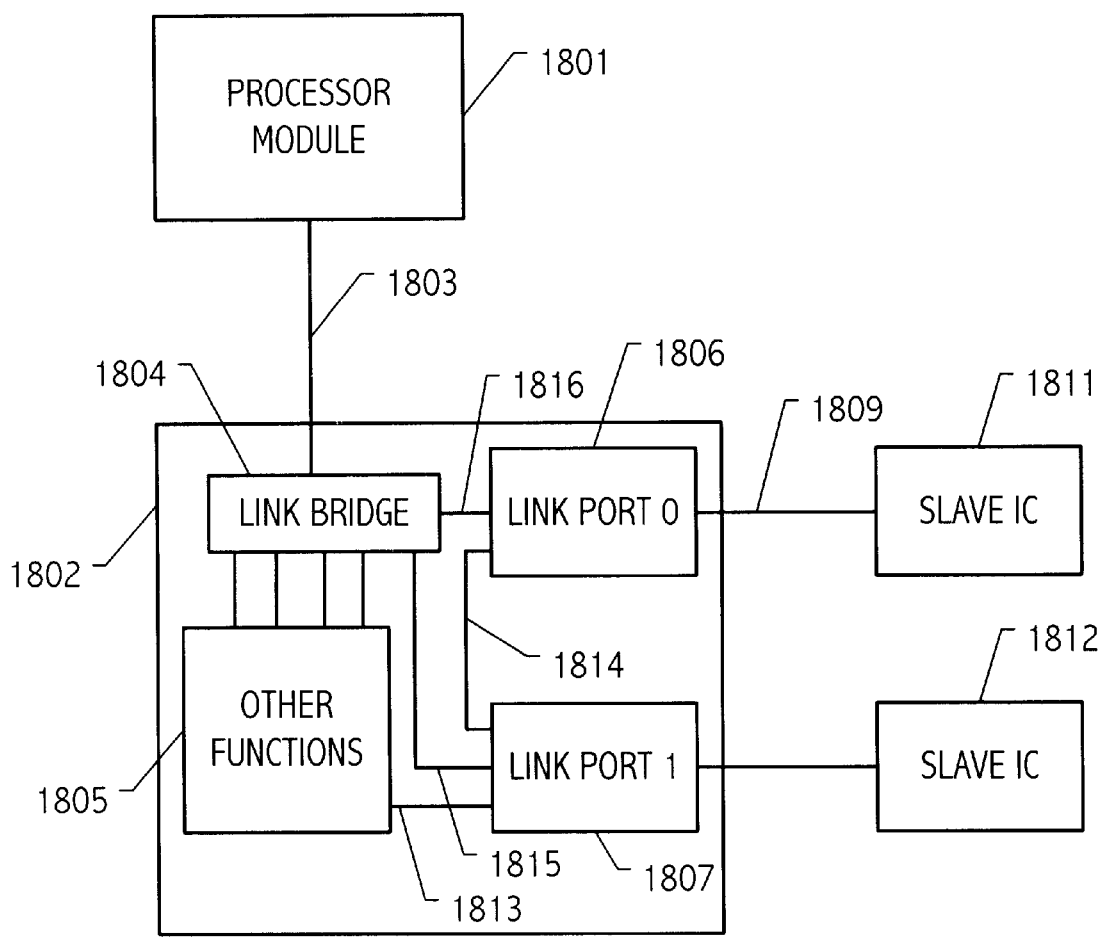
FIG. 18 illustrates the use of subordinate links in a computer system.

The link structure described herein allows for subordinate links. For example, link-based systems can have integrated circuits (ICs) that connect to another integrated circuit such as the interface module, via one or more subordinate links. Such links may be similar to the exemplary PM-IM link shown in e.g., FIG. 4. FIG. 18 illustrates a system having subordinate links. Processor module 1801 is coupled to interface module 1802 via link 1803. Link bridge 1804 provides a link interface as well as a bridge to other functions (e.g. a 1394 host controller) 1805. In addition, link bridge 1804 is coupled to link port 1806 and link port 1807, which provide separate links 1809 and 1810 to slave integrated circuits 1811 and 1812, respectively.

The link port is structurally similar to the processor module-interface module link structure. The link port contains a physical layer, a protocol layer, and a link layer (including function/link interfaces). Isochronous and asynchronous priority modes are supported. The link port acts as a link-link bridge rather than a host bus-link bridge as in the processor module. As a result, the link port handles link layer pipes on both sides of the bridge, creating the possibility of pass-through operations described below.

Transactions on the primary link 1803 physically operate on a point-to-point basis, i.e., they span a single hop between the processor module and the interface module. Similarly, transactions on the subordinate links operate on a point-to-point basis. For example, when slave integrated circuit 1811, wishes to connect to another function, either within the interface module, on another subordinate link or within the processor module, the connection physically takes two hops. However, from a logical standpoint the system can be configured so that it takes only a single hop from the slave integrated circuit directly to/from the other function. At the physical and protocol layers, the subordinate link operates point-to-point between the two integrated circuits. But, if the link port function 1806 performs no processing on the packets, an extended pipe may be established end-to-end with the link port function operating transparently in the middle. Such a pipe appears logically as if the pipe extends from, e.g., the processor module 1801 to slave IC 1811 across multiple links. Given the appropriate configuration (or if hardwired), pipe ID numbers and transaction tags may be maintained across the subordinate link. Thus, a pipe on subordinate link 1809 may have the same pipe ID as a pipe on primary link 1803 and be treated as a pass through pipe. Link bridge 1804 and link port 1806 need to be configured or hardwired so that the bridge and port know that the particular pipe ID is a pass through pipe and transactions on that pipe may be routed according to pipe ID and handled transparently by the bridge and the port. Because the transactions are handled transparently, such information as flow control, out of order tag information, address and data information and all response packets are handled at either end of the extended logical pipe. The physical stops in the middle do not need to process such information.

In addition to a passthrough mode in which the transactions are handled transparently, a lookup table could also be used to correspond a pipe on the primary link to a pipe on the secondary link. For example, pipe five on the primary link could be converted on the secondary link to pipe six according to a lookup table. The pipe ID would be changed to be transmitted on the new pipe but all the remaining information including any tags used would remain the same. Such a remapping of pipes could be used as a fault tolerant feature, so that if one portion of a passthrough pipe failed, another pipe could be used to take its place.

Alternatively, rather than routing transactions based on pipe ID, transactions may be routed as if the link port and link bridge appeared as regular functions to each other. Thus, the link port may appear to the link bridge as just another device on a backside bus. Thus, for example, a transaction initiated on processor module 1801 may be routed to link port 1807 based on the address contained in the packet (where the link bridge includes a target distributor). The transaction on the primary link is terminated and the data and address portion of the packet is supplied to the downstream port. In such a configuration, the connection 1815 between link bridge 1804 and link port 1807 includes a connection (e.g. a bus) other than a pipe structure. A new link transaction is then built and transmitted across subordinate link to slave IC 1812.

The fact that there may exist a connection between the link bridge and a link port (or two link ports) that is not pipe-based does not preclude pipe-based communication as well. Thus, primary links and subordinate links may be coupled using either or both pipe routing and address routing where pipe routing is based on pipe ID and address routing is based on the address contained in the packet. Address routing is also used to imply that the transaction on one pipe is being terminated and a new link transaction has to be initiated on the next link independent of the prior transaction. Pipe routing implies that the transaction across the next link is not independent of the previous link transaction. Certain transactions carried over e.g., link 1803 and subordinate link 1810 may be address routed, while other transactions may be pipe routed.

There are several circumstances in which non-passthrough operations may not be desirable in certain systems under certain circumstances. In an exemplary system shown in FIG. 19, such circumstances may include the connection to the CPU target pipe distributor, as well as direct connections to functions internal to the interface module. In that exemplary system, since CPU transactions terminate at the distributor 1907, reads and writes across a subordinate link are handled as new transactions. That means that the link port provides an asynchronous source pipe looking out across the subordinate link towards the attached integrated circuit to carry CPU read and write transactions. The link port has link-layer hardware that receives reads and write responses from the CPU Pipe target distributor and generates corresponding transactions on the subordinate link. Those transactions will have their own pipe IDs and tag numbers.

Functions that are internal to the interface module also may provide unique circumstances. Functions located within the interface module can connect to subordinate links just as they can connect to the processor module-interface module link. Since those functions and the link port are in the same integrated circuit, the interconnection may be hardwired via function-link interface hardware (i.e., the link port is configured with the necessary pipes at design time).

For a link port structure, there can be generic port structures intended to communicate with a range of devices. In addition there can be dedicated port structures specifically implemented to communicate with a specific function or device. The dedicated port can have any configuration of pipes. It is used where the designer of the interface module intends for the port to connect to a specific type of external integrated circuit. The generic port is designed to connect a range of external integrated circuits, where the interface module designer does not know in advance what functions will be connected to the port.

Figure 19:
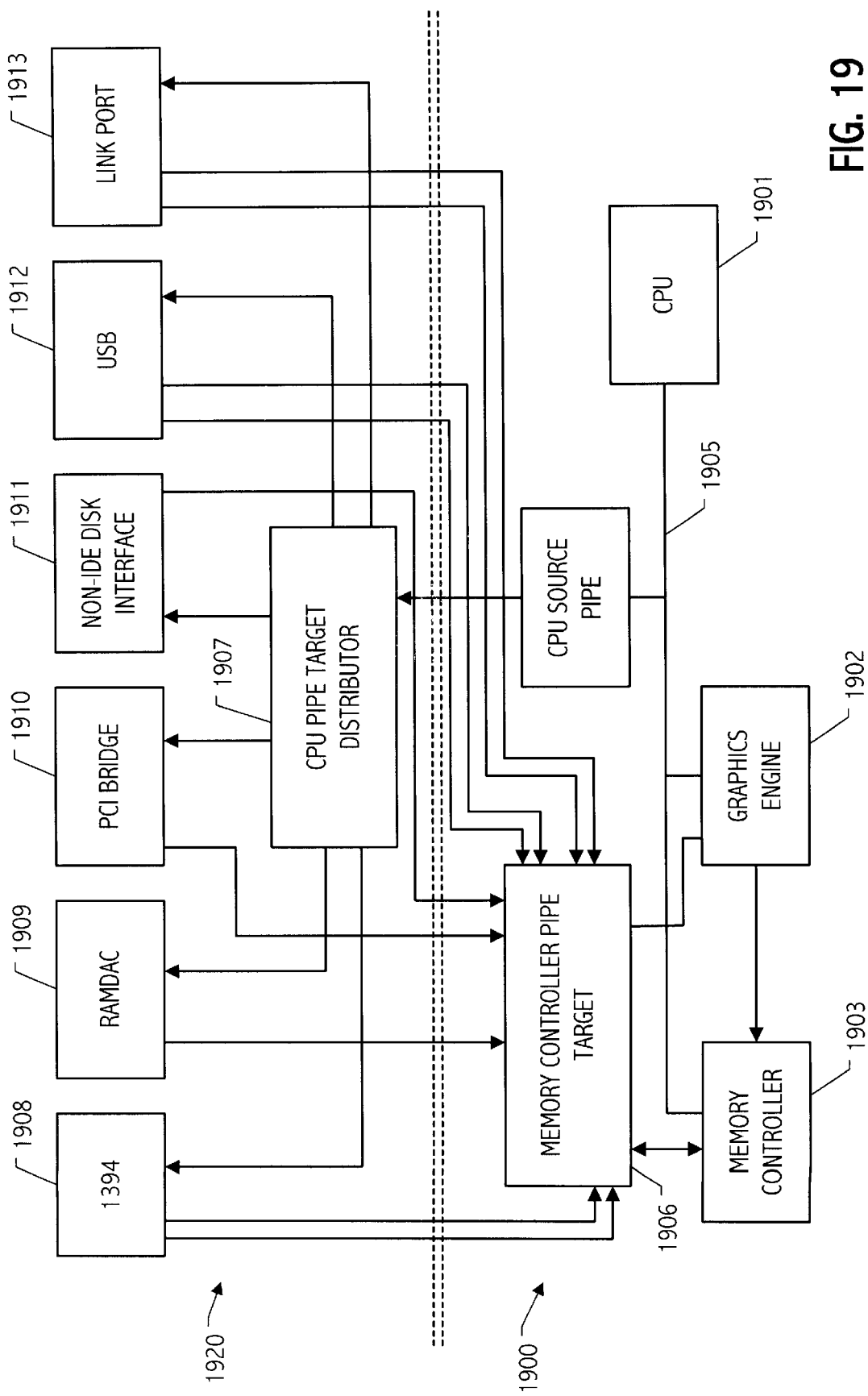
FIG. 19 illustrates a pipe structure and associated functions of a typical computer system.

For the exemplary system of FIG. 19, the pipe structure looking from link port 1913 towards the processor module supports one asynchronous source pipe connecting to main memory, one isochronous source pipe connecting to main memory, one target port from the CPU Pipe Target Distributor. In addition, one or more asynchronous or isochronous source or target pipes connecting to non-CPU, non-memory processor module functions, such as graphics, may be implemented.

Referring again to FIG. 18, wires 1813 connects link port 1807 with other functions 1805 within the interface module. Such connections may be address routed, pipe routed or both. Hardwired connection 1814 may connect link port 1806 and link port 1807. Note that connection 1814 may also provide pipe and/or address routing. Pipes operating on connections 1813 and 1814 may be considered as internal pipes and port-to-port pipes, respectively.

The pipe structure looking from the link port towards internal interface module functions may optionally support one or more internal asynchronous or isochronous source or target pipe pairs and one or more port-to-port asynchronous or isochronous source or target pipe pairs.

Interchangeability is a goal for future chipsets in personal computer systems. Typically, the functions contained in the processor module are common among all processor modules (graphics not withstanding), while interface modules generally exist in greater variety. That implies that the interface module knows what to expect from the processor module, not so for the processor module. This suggests that the processor module should be general purpose in its structure.

In one architecture implementing an embodiment of the invention described herein, the processor module side of the link is physically and architecturally different from the interface module side. One goal is to minimize the impact of the differences on the link structure. The main differences stem from the fact that the processor module has the CPU and memory controller, and the interface module has the I/O functions (although graphics can look like both a processor module and an interface module type of function). In general, the processor module functions look like the center of a star connected via pipes to individual endpoints within the interface module. That is, the CPU talks to all of the functions in the interface module and many interface module functions talk to memory in the processor module.

The exemplary processor module typically has two characteristics: 1) the CPU can directly access the registers of the resident functions such as the memory controller; and 2) all processor modules have a CPU and a memory controller with well defined interfaces (pipe types). The processor module has a CPU host bus to link bridge function containing an asynchronous source pipe which is terminated in the interface module by the CPU pipe target distributor. The processor module also has the memory controller target concentrator that contains the target endpoints terminating both isochronous and asynchronous pipes from the interface module.

Referring again to FIG. 19, a typical computer system pipe structure is shown. The processor module 1900 includes CPU 1901 coupled via host bus 1905 to graphics engine 1902 and memory controller 1903. The implementation of the host bus-link bridge incorporated in CPU source pipe 1904 is design specific since it necessarily depends on the processor used as the CPU which drives the host bus. In one x86 environment the bridge maps I/O transactions to the appropriate memory space (e.g., to FE 0000 FFFF–FE 0000 0000). In addition the processor module host bus-link bridge supports configuration space decode for configuring the bridge itself. The CPU source pipe connects to the CPU pipe target distributor 1907 which in turn is coupled to various exemplary functions such as 1394 host controller 1908, RAMDAC 1909, PCI bridge 1910, non-IDE disk interface 1911, USB host controller 1912 and link port 1913. Note that the CPU source pipe (with the source on the processor module), in one implementation, does not support out of order transactions.

The exemplary system also provides a memory controller pipe target 1906 on processor module 1900. Pipes going to the memory controller target concentrator should support out of order transactions at the processor module side. It may be optional on a pipe by pipe basis at the interface module side.

The specific function interfaces from the CPU source pipe to the host bus 1905, e.g., are application and implementation specific and depend upon, e.g., the type of CPU used. The arbitration policy is also implementation specific except for support of isochronous and asynchronous priority modes. The protocol layer hardware provides a flag indicating that the link is either in asynchronous priority mode or isochronous priority mode. The protocol layer hardware also provides frame boundary timing information to the arbiter.

PROTOCOL LAYER TRANSMIT AND RECEIVE CIRCUITS

The link and pipe structure described herein has common logic in the protocol layer that is shared among pipes as well as logic that is dedicated to each pipe. The protocol transmit and receive circuits typically are common among all the pipes using a particular link. The use of concentrators and distributors also effects what circuits are shared among pipes. For purposes of the examples discussed herein, assume that data is transmitted from the output pins at a rate of one word every 1.25 ns (at 800 MHz). As noted the width of the word is variable but for purposes of discussion, assume also that the width of the word is one byte (8 data bits) to simplify the description of the invention.

Figure 20:
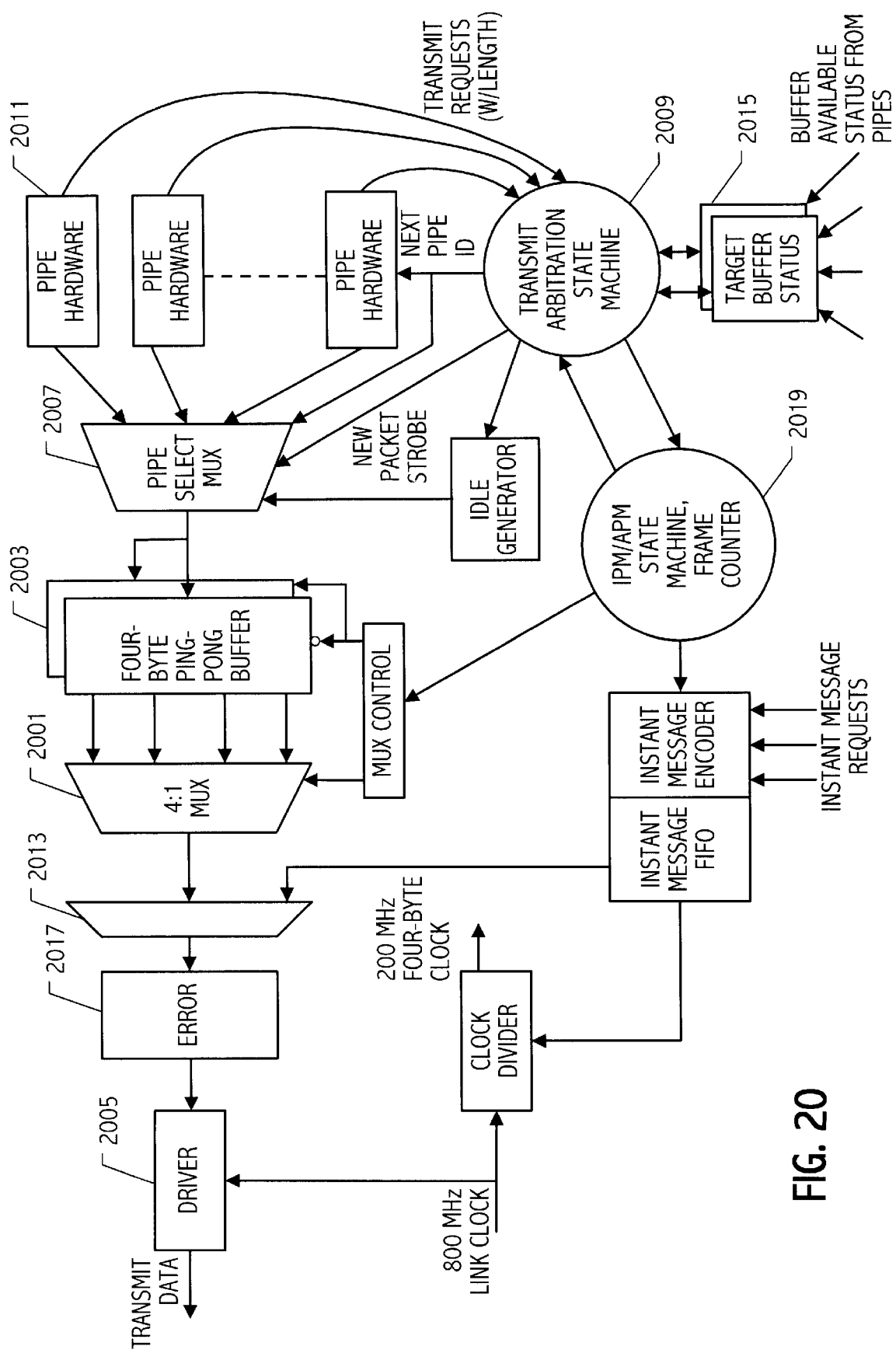
FIG. 20 illustrates one implementation of the protocol layer transmit circuit.

Referring to FIG. 20, the protocol layer transmit logic is shown. Internally, most of the link logic runs at a slower rate than the link itself, e.g., on a 5 ns (200 MHz) clock when data is transmitted at an 800 MHz (each edge of the clock). The transition between the 5 ns domain to the 1.25 ns domain is handled by the time contraction logic. Essentially, the transition is provided by 4:1 multiplexer 2001 which is fed by a pair of four-byte buffers 2003. The multiplexer cycles through the four positions at 800 MHz. The buffer pair operates in ping-pong fashion. The first four byte buffer is provided to driver 2005 through 4:1 multiplexer 2001 during a first 5 ns (1.25 ns per byte) while the second buffer is being loaded at 200 MHz with the next four bytes.

The ping-pong buffers are fed by an N-way pipe select multiplexer 2007 which is controlled by the transmit arbitration state machine 2009. The pipe select multiplexer 2007 reads, or "pulls," the data from the pipe hardware shown at 2011.

Each block of pipe hardware contains several queues (typically five): (1) Write Data (2) Write Command (3) Read Command (4) Read Data (5) Idle/buffer status. Whenever a pipe needs to transmit a packet (or an idle/buffer status message), it generates a request to transmit arbitration state machine 2009. The request is a logical OR of the requests from each of that pipe's queues. The request contains a seven-bit length field that informs the arbiter how many bytes are to be transmitted. The arbiter generates a "next pipe" strobe at least one 200 MHz clock cycle prior to servicing that pipe (this is the "grant" indication to the pipe hardware). Exactly one 200 MHz clock cycle prior to starting a new packet, the arbiter generates a new packet strobe to the pipe select multiplexer 2007, indicating that the next four-byte block should be pulled from the pipe indicated by the next pipe number.

Note that the 200 MHz clock can contain jitter introduced by the insertion of instant messages. Instant messages essentially stretch the 200 MHz clock. That is done by dropping one or more 1.25 ns clock cycles—since the 200 MHz clock is derived by dividing by four (counting clock edges), the cycle is effectively lengthened. Instant messages are provided to driver 2005 through multiplexer 2013. Instant messages can be inserted into the transmit stream at any time. In addition to frame boundary and isochronous priority mode/asynchronous priority mode transition messages, instant messages are used for system commands such as change of power state. Additionally, instant messages are used for transmitting the state change of various legacy signals like FERR.

It is up to each pipe's hardware to determine which of its various queues should be serviced next. A pipe can only present one request to the transmit arbitration state machine at a time.

The transmitter operates in isochronous priority mode (IPM) or asynchronous priority mode (APM), as determined by the IPM/APM state machine 2019. That state machine serves as the frame counter. In one implementation, frames are 1600 bit times (800-MHz data rate not 400, 200-MHz clocks because of the instant message jitter). The isochronous priority mode/asynchronous priority mode state machine maintains counts of the frame time, number of isochronous bytes required to be sent (maximum plus a pad), and the number of isochronous bytes actually sent. An IPM/APM synchronous priority mode indication is provided to the transmit arbitration state machine which needs to select between isochronous and asynchronous requests. Isochronous priority mode/asynchronous priority mode transitions and frame boundaries cause instant messages to be transmitted.

When no pipe has any data or command packets to transmit and no buffer status to send, the transmitter generates idle packets. Typically, idle packets on the bus are values that float high that may represent logical 0's, to avoid any unnecessary current drain.

Data is transmitted using the internal 800 MHz clock, which is forwarded to the receiver along with the data.

As previously described, flow control is required on all source pipes. The target end of a pipe transmitter does not need to consider flow control for response packets because the target can assume that the source side would not have initiated a transaction if it lacked free buffers to receive the response. Flow control may be centralized in the transmit arbitration state machine 2009 to avoid the need to allocate tokens to the various source pipes that could share a common buffer pool at the target end, e.g., at the memory controller. If a common buffer pool is shared at the target side, the tokens representing free buffers are allocated among the connecting source pipes. The distribution of these tokens is problematic because it is a task done a priori, and borrowing unused tokens from other pipes is complicated. One solution is to centralize the free buffer allocation at the arbiter. The impact is that the arbiter should be smart enough to allocate buffers based on the latency requirements of the various pipes, which, of course, it can do because it already allocates bandwidth between the various pipes.

If an isochronous pipe has an active request to transmit that cannot be serviced because of a lack of buffer space at the target end, it will eventually force a transition to isochronous priority mode. When this happens, the target side will grant priority to flushing its buffers, thus freeing up space.

The target buffer status block 2015 includes a set of counters indicating the number of free buffers at the target end (the source cannot initiate a transaction if the target does not have buffer space available). When the link is initialized, the counters start at zero. The target sends idle packets indicating that it has free buffers. Every time such an indication is received, the respective counter is incremented by one. Every time a transaction is sent by the source, the counters are decremented. The decode of the buffer status is actually done at the pipe hardware where the received packets are deconstructed. The indications to increment the buffer status counters is passed back to the protocol layer transmit hardware block.

One set of counters is required for each set of buffers on the target side. If error control is handled on a byte-by-byte basis, the error correcting code (ECC) syndrome bit(s) may be added just prior to transmission in error block 2017

Not allowing split four-byte blocks may be advantageous in that it provides simpler implementation. That means that no four-byte block can contain data from multiple data or command packets. A four-byte block can contain both all or part of a data or command packet and all or part of an idle packet. Thus, if a pipe has only three bytes left to transmit, the fourth byte will be transmitted as part of an idle packet.

Figure 21:
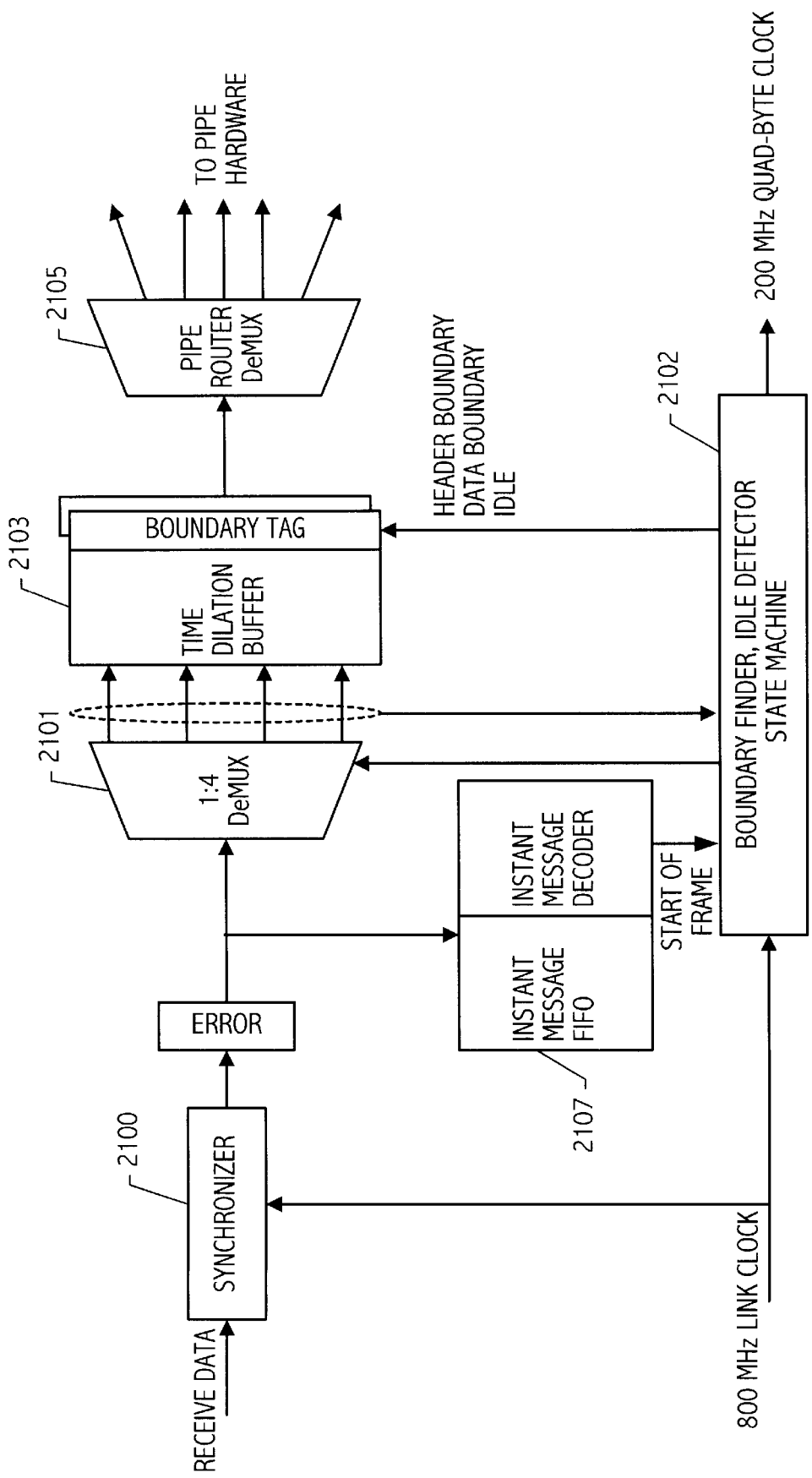
FIG. 21 illustrates one implementation of the protocol layer receive circuit.

Referring now to FIG. 21, the link receiver is shown. Again assume that data is received from the input pins at a rate of one word every 1.25 ns (at 800 MHz) (a "word" being whatever width the link is configured at). For this discussion, the width is fixed at 8 data bits (plus any error detection). The received data is synchronized with an internal 800 MHz clock by the Synchronizer block 2100. When error detection is handled on a byte-by-byte basis, the detection logic is located at the end of the synchronization block. Other error detection schemes can also be utilized, e.g., cyclic redundancy checks (CRC), in addition to or in place of byte basis error detection.

It is beneficial to reduce the clock rate to a manageable speed as early as possible. That is handled by the time dilation logic which includes 1-to-4 demultiplexer 2101, the boundary. finder 2102, the mask/alignment logic, and a pair of buffers, referred to herein as the time dilation buffer 2103. The time dilation logic builds four-byte blocks of data every 5 ns.

If the transmitter restriction described above precluding a four-byte block from including part of multiple data or command packets is not applied, the link transmits data in packets with no particular byte alignment. As a result, data from two packets can be present in one of the four-byte blocks. That is a problem because the blocks will be routed into various queues on a packet-by-packet basis. To handle the situation when data from multiple packets is contained in an incoming four-byte block, incoming four-byte blocks are replicated and stored in two buffers. Only two buffers are required in the illustrated embodiment since there can never be parts of more than two packets in any one four-byte block since the shortest packet is three bytes. If a packet can be shorter, then additional buffers would be required. The data does not need to be stored in two separate physical buffers, but the associated tags, described below, do need separate buffers.

State machine 2102 finds the boundary between packets and detects idle conditions. Associated with that state machine is the clock divider that reduces the 800 MHz clock to 200 MHz. The boundary finder generates output strobes identifying the first byte of a packet header, the first byte of a data field, and link idle. The boundary finder starts at the beginning of the frame (known condition) and inspects the packet type field to identify the length of the header. If the packet has a data field, the finder looks at the size field to determine where the packet ends. The boundary finder also provides the control signals that step the 1-to-4 demultiplexer through its four-byte cycle.

The Mask/Alignment logic builds two-bit tags associated with each byte of a four-byte block. These tags identify the beginning of the header and data fields and idle (i.e., the associated byte is not part of a packet), as shown below:

| Bits | Indication |
|---|---|
| 0 0 | Idle |
| 0 1 | Mid Packet |
| 1 0 | Start of Header |
| 1 1 | Start of Data |

Each four-byte block and tags are sent to the Pipe Router logic 2105 every 5 ns. The router is a programmable demultiplexer that routes packets to their associated pipe hardware.

Each pipe hardware block will typically contain four receive queues, one each for commands, responses, read data and write data. Assuming that the first three bits of the Packet Type field identify the destination queue, the first byte of the packet identifies both the pipe and the queue within the pipe (the first byte of a packet has 5 bits of pipe ID and the first 3 bits of the packet type field). If the first three bits of the packet type field does not uniquely identify the queue, then the complete routing information will span two bytes, which could be located in separate four-byte blocks. In that event, a double buffer will be required.

In a four-byte block that contains portions of two packets, the entire block is routed to both pipes (the tag fields will be different). That means that the tag fields associated with each byte in the block can be determined at 800 MHz. Thus if two bytes belong to pipe M and two bytes belong to pipe N, then Pipe M receives the four bytes and the tag fields indicating the first two bytes are valid (e.g. mid packet) and the second two bytes marked invalid (e.g. idle). Pipe N receives the four bytes with the tag field marked as invalid for the first two bytes (e.g. idle) and valid for the next two bytes (e.g., start of header, mid packet). Note again that all four bytes are sent to both pipes. That allows the routing logic to continue to operate at 200 MHz.

If back-to-back packets belong to the same pipe, the transmitter should insure that they are block-aligned. Inserting an intervening idle packet (at least three-bytes long) can prevent that situation.

Instant messages are logically out-of-band and can happen anytime (even in the middle of a packet). Instant messages are extracted from the data stream based on the state of the CMD pin and stored in a FIFO queue 2107. The width of the FIFO is equal to the maximum length of instant message (e.g., one byte). The depth of the FIFO is preferably at least seven in the illustrated embodiment to allow alignment with the 5 ns clock.

LINK LAYER PIPE LOGIC

Figure 22:
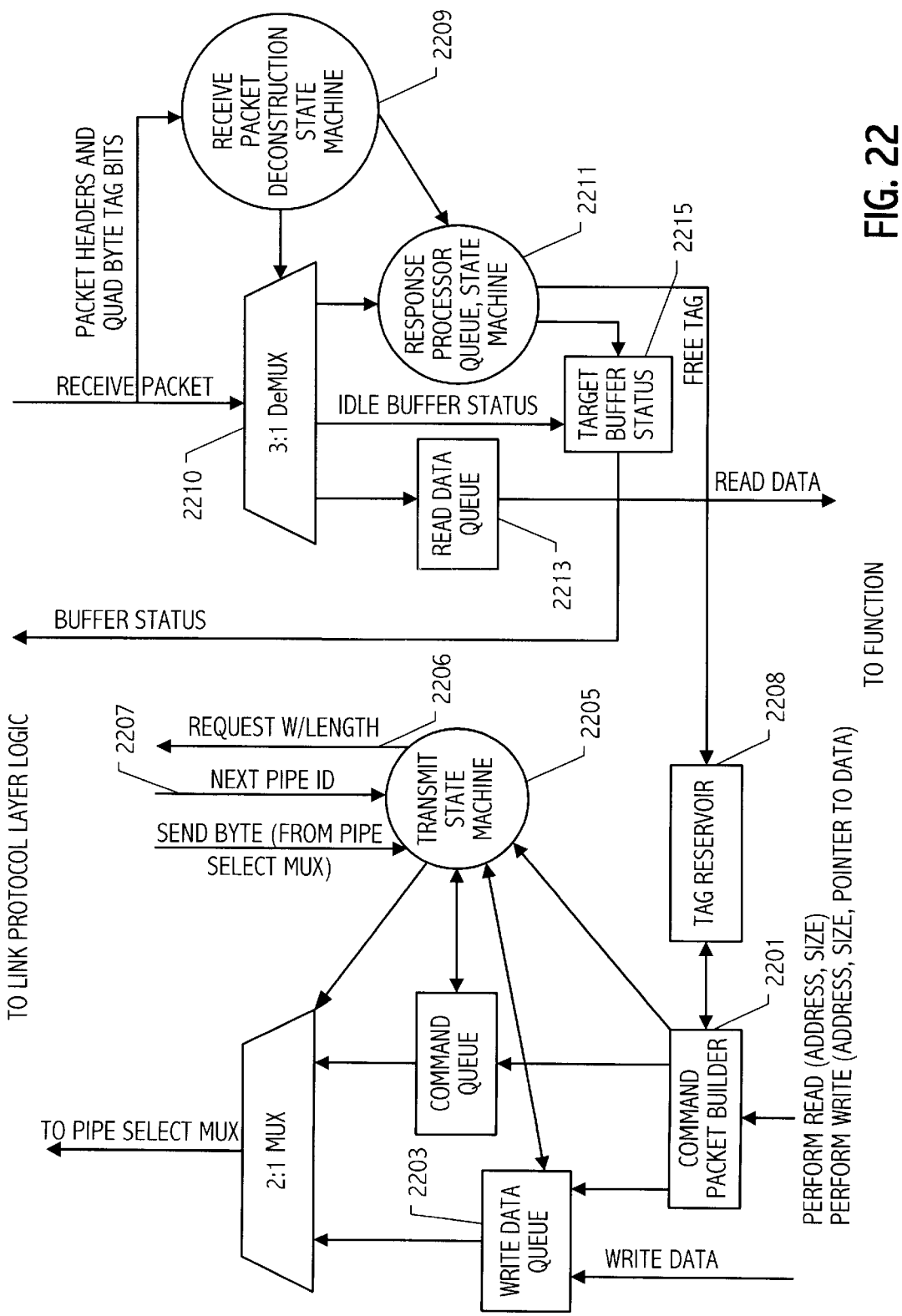
FIG. 22 illustrates an exemplary pipe source circuit structure.

The protocol layer transmit and receive logic is common to all pipes coupled to the link. In addition each pipe has its own logic which is separate from the other pipes. Referring to FIG. 22, an exemplary source pipe structure is shown. Remember that the source side of a pipe originates transactions by sending out commands and ends them by receiving responses.

Functions residing behind the link request the pipe logic to send read or write commands (including fence and flush). The pipe logic has a number of responsibilities. Those include constructing the command packet which includes assigning a tag if used. The source pipe also verifies the availability of necessary target side buffers using the buffer available field sent from the target pipes. The source pipe requests service from the packet transmit arbitration state machine (2009 in FIG. 20). The source pipe delivers the packet to the pipe select multiplexer 2007 (in the illustrated embodiment, the multiplexer reads the pipe logic). The source pipe receives the response packet from the pipe router demultiplexer 2105 and retires the transaction (freeing the tag number, if used). If the command sent by the source was a read command, the source sends read data to the function.

Pipes may be designed that do not support out of order transactions in which case tag length configuration should be programmed to zero. Pipes may be designed that do not support multiple outstanding transactions. That can be accomplished simply by not issuing out of order transactions. Read and/or write data buffers can be either in the link pipe logic, or in the function—this is handled by the function interface.

Referring to FIG. 22, the source pipe structure includes the command packet builder 2201 which receives a request from the function to perform a read or write across the link.

The read request includes the read address and size information. Note that a read all request does not require size information. The command packet builder constructs the necessary header, including requesting a free tag (if out of order transactions are being used). In the case of writes, a pointer is required to the write buffer location containing the address and data fields. Note that the write buffer may or may not be located within the pipe logic (it could reside in the function).

In response to a request from the command builder 2201, the transmit state machine 2205 sends a request 2206 to the protocol layer transmit arbitrator which includes the total number of bytes to be sent. When the protocol layer transmit arbitrator is ready to grant the next link transaction to this pipe, it generates a "next pipe ID" 2207 indication to this pipe.

Transmit state machine 2205 sends requests to transmit to the protocol layer arbiter without regard for the availability of free buffers on the target side. The protocol layer arbiter does not grant the request until buffers are available.

For pipes that allow out of order transactions, tags are required that uniquely identify the transaction. Responses sent back to the source use the same tag as the original command. Tags are maintained in tag reservoir 2208.

The source pipe also receives information from the protocol layer transmit and receive logic. When a packet is received from the protocol layer (pipe router demultiplexer), it is deconstructed into various queues based on the packet type and the quad-byte tag field in receive packet deconstruction state machine 2209. That state machine can be combined with the response processor, but is described separately here. The data from the protocol layer is received into a 3:1 demulitplexer 2210. The quad-byte tag field delineates the start of the packet header and data field, as well as bytes in the quad word that are not part of this packet. The first byte of the packet header contains the 5-bit pipe ID field and the most significant 3-bits of the packet type field. From the packet type field, the target queue can be determined.

The Response Processor State Machine (and Queue) 2211 processes responses as responses are received from the target. Read data is matched with the correct command (for out of order operation) and stored in read data queue 2213, tags are retired and are returned to the tag reservoir 2208 for additional use and write failures are reported (NAK). Additionally, incoming packets can contain update information concerning the status of target side buffers which is stored in target buffer status 2215. That information may be used to increment counters in the Target Buffer Status logic located in the protocol layer.

Figure 23:
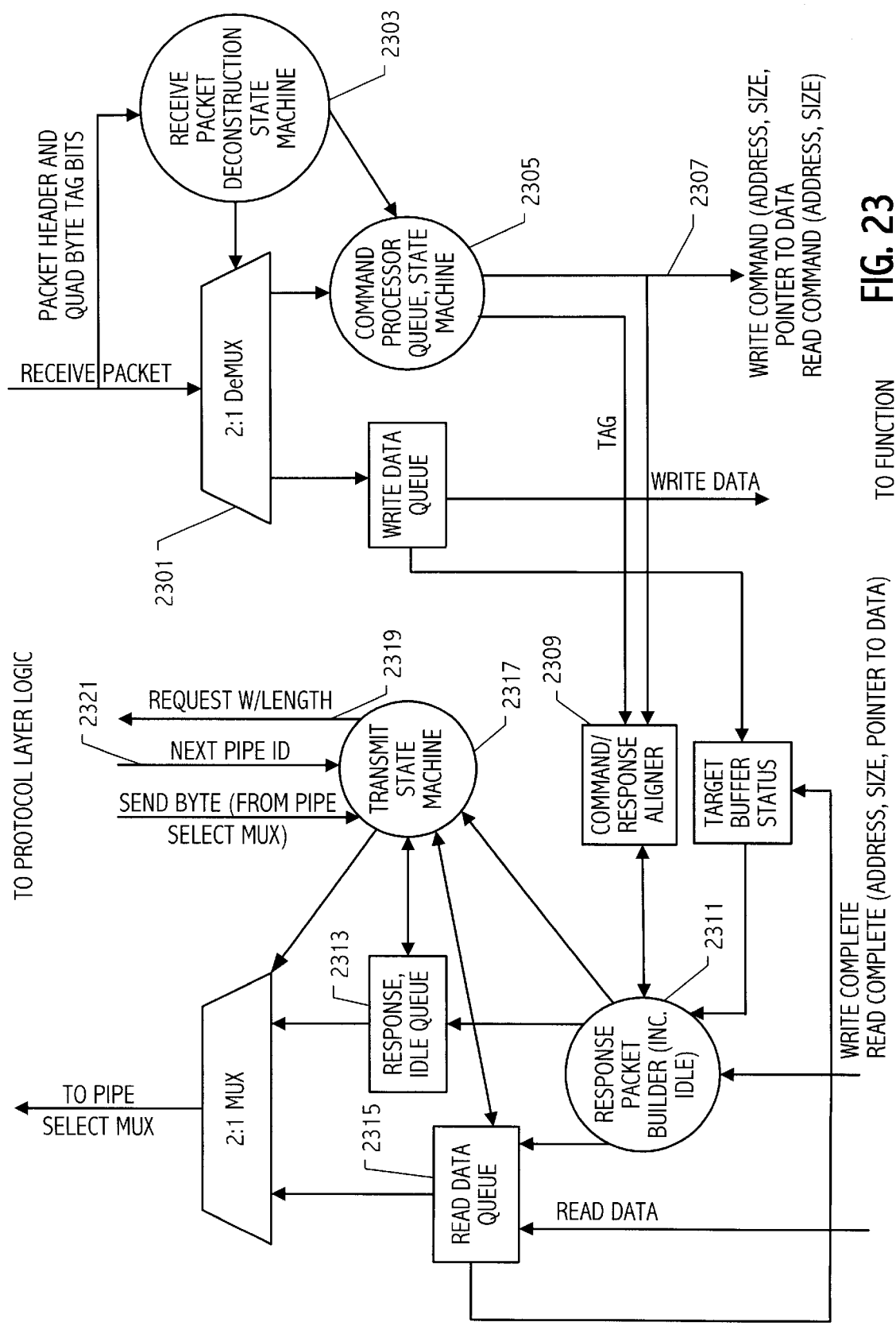
FIG. 23 illustrates an exemplary non-concentrated pipe target circuit structure.

The other side of the pipe is the target side which also resides in the link layer. In general, targets are either concentrators (multi-point-to-point) or simple endpoints (the target side of a point-to-point pipe). FIG. 23 illustrates the non-concentrated target, which is the simplest. The target side of a pipe responds to commands sent from the source side by sending back appropriate responses. Additionally, the target is responsible for sending buffer status information, indicating the availability of target side buffers, to the source side for flow control.

Packets are received from the protocol receive logic in 2:1 demultiplexer 2301. The Receive Packet Deconstruction State Machine 2303 receives the packet header and quad byte tag bits. That state machine can be combined with the command processor, but is described separately here. When a packet is received from the protocol layer (specifically the pipe router demultiplexer), it is deconstructed into various queues based on the packet type and the quad-byte tag field. The quad-byte tag field delineates the start of the packet header and data field, and indicates those bytes in the quad word that are not part of this packet. The first byte of the packet header contains the 5-bit pipe ID field and the most significant 3-bits of the packet type field. From the packet type field, the target queue can be determined.

The command processor (and queue) state machine 2305 receives and processes commands from the target. For example, a read all command is decoded here. Read and write commands are decoded and read and write requests 2307 are sent to the function along with the address, size, and, in the case of writes, a pointer to the write data buffer. Read all commands do not need to send the size. The command type and tag are also sent to the command/response aligner block 2309.

When the read or write completes at the function level, including read all commands, command aligner 2309 matches the read data or write acknowledge with the appropriate tag for use by the response packet builder 2311. Note that if out of order execution is not allowed, the function returns the response in order, and no tag logic is required.

For pipes that support read all commands, a count of the read data may be provided by the function along with the read data.

The Response Packet Builder 2311 constructs response packets. For writes, an acknowledge packet is built using the pipe ID, tag, and any buffer status that needs to be updated. For reads, a packet is constructed using the returned data, size, address, tag pipe ID, and buffer status. The response packet is stored in the response queue 2313. For reads, a pointer provides a link to the read data located in the read data queue 2315.

In response to a request from the response builder (or, the presence of a response in the response queue), transmit state machine 2317 sends a request 2319 to the protocol layer transmit arbitrator. When the protocol layer transmit arbitrator is ready to grant the next link transaction to this pipe, it generates a 'next pipe ID" indication 2321 to this pipe. The request 2319 specifies the total number of bytes to be sent.

Pipes may be designed that do not support out of order transactions in which case the tag length configuration should be programmed to zero. Pipes may be designed that do not support multiple outstanding transactions. That capability can be provided simply by not issuing multiple outstanding transactions. Note that Read and/or Write data buffers can be either in the pipe logic, or in the function. Read-all transactions and non-addressed transactions are optional.

Figure 24:
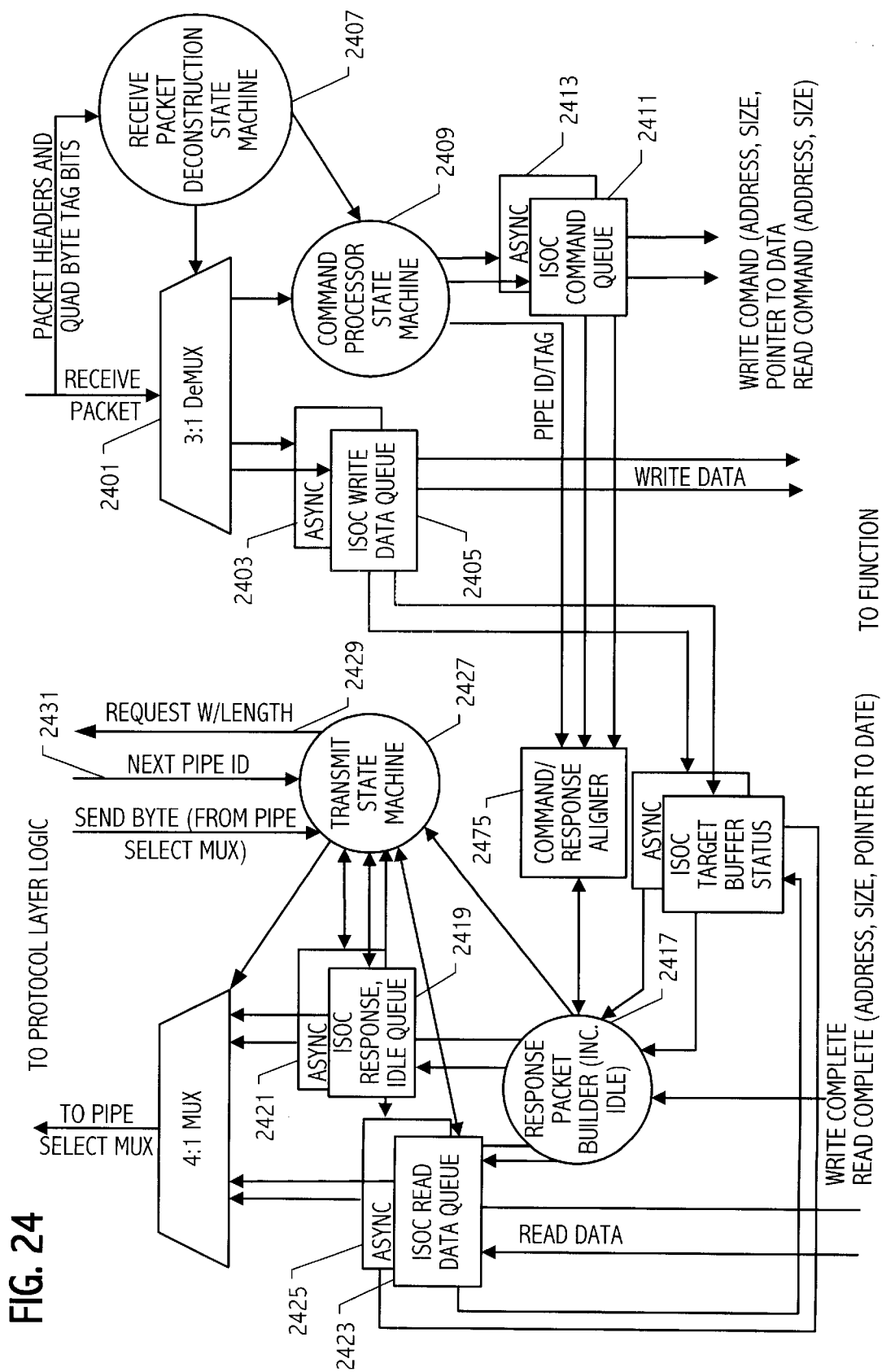
FIG. 24 illustrates an exemplary concentrated pipe target circuit structure.

Referring to FIG. 24, a concentrated target pipe is shown. A concentrated target pipe is used in cases like the memory controller, where multiple pipes converge on a single function. The goal is to preserve the logical view of separate pipes while physically sharing as much logic as possible.

The pipe router (2105 in FIG. 21) in the protocol layer receiver logic needs to recognize that packets for all pipes being concentrated should be sent to the same receive demultiplexer 2401. There needs to be separate receive queues for asynchronous and isochronous data 2403 and 2405 respectively. Physically, the queues can share a single RAM structure, but they are allocated and accounted for separately. Asynchronous transactions have complete priority unless isochrony is in danger of breaking. The service strategy for the receive queues has two triggers: (1) as long as the level in the isochronous queue is below a threshold, e.g., the queue is less than 90% full, asynchronous transactions have unconditional priority, unless (2) the link enters isochronous priority mode, in which case the isochronous queue is flushed.

The isochronous queue trigger threshold can be set at design time (e.g., queue full or only one slot left). The threshold can also be programmable based on the isochronous load specified in the pipe configuration registers, or it can be dynamic based on the number of times that the triggers get pulled. Isochronous traffic is typically very much less than the memory bandwidth, and statistically there are sufficient holes in the asynchronous load for the isochronous queue to be serviced at a sufficient rate. Given those assumptions, the triggers should rarely be pulled, but they provide the necessary guarantee of isochrony. If the isochronous queue reaches the threshold without there being isochronous priority mode, e.g., when a large isochronous load is present (such as RAMDAC traffic), the memory access arbitrator that controls unloading of the queues needs to adjust its policy to grant bandwidth to the isochronous queue on a regular basis (i.e., it should be included in any round-robin that services the asynchronous queues).

Buffer status is sent back for both isochronous and asynchronous pipe queues. Because there are multiple pipes, the lowest respective pipe ID number for both the isochronous and asynchronous queue may be used.

Much of the logic is similar to the point to point target. The receive packet deconstruction state machine 2407 can be combined with the command processor, but is described separately here. When a packet is received from the protocol layer (pipe router demultiplexer 2105), it is deconstructed into various queues based on the packet type and the quad-byte tag field. The first byte of the packet header contains the 5-bit pipe ID field and the most significant 3-bits of the packet type filed. From the pipe ID and packet type fields, the target queue can be determined. The pipe ID provides the information to separate isochronous streams from asynchronous streams.

The command processor (and queue) state machine 2409 processes commands as they are received from the target. Read and write requests are sent to the function along with the address, size, and, in the case of writes, a pointer to the write data buffer from the isochronous and asynchronous command queues 2411 and 2413. The pipe ID, command type, and tags are also sent to the command/response aligner block 2415. The pipe ID, when combined with the tag, provides a unique identifier.

When the read or write completes at the function level, the command aligner 2415 matches the read data or write acknowledge with the appropriate pipe ID and tag for use by the response packet builder 2417. Note that if out of order execution is not allowed, the function returns the response in order, and no tag logic is required.

The response packet builder 2417 constructs response packets. For writes, it builds an acknowledge packet using the pipe ID, tag, and any buffer status that needs to be updated. For reads, the response packet builder 2417 constructs a packet using the returned data, size, address, tag, pipe ID, and buffer status. The response packet builder 2417 stores the response packet in the appropriate isochronous or asynchronous response queue 2419 and 2421, respectively. For reads, a pointer provides a link to the read data located in the read data queues 2423 and 2425.

In response to a request from the response builder (or, the presence of a response in the response queues), the transmit state machine 2427 sends a request 2429 to the protocol layer transmit arbitrator. The request specifies the total number of bytes to be sent. When the protocol layer transmit arbitrator is ready to grant the next link transaction to this pipe, it generates a "next pipe ID" indication 2431 to this pipe.

As in the case with a point to point target, pipes may be designed that do not support out of order transactions (tag length configuration should be programmed to zero). Pipes may be designed that do not support multiple outstanding transactions (simply don't issue them). Read and/or write data buffers can be either in the link pipe logic, or in the function—this is handled by the function interface.

Note that for concentrators neither read-all transactions nor non-addressed transactions are supported in the illustrated embodiment to simplify the design.

In the computer system described herein that utilizes the link, the single logical pipe (an asynchronous pipe allowing pipelining, but not out-of-order transactions) that connects the CPU to the functions within the interface module provides an exemplary utilization of a pipe target distributor. That pipe target distributor (CPU pipe target distributor) is the interface module-side endpoint for this CPU pipe. Reads, writes, and special cycles are originated by the CPU, carried across the link via the CPU pipe (pipe ID 0), and distributed to the correct function by the distributor. The distributor operates as an address router, where the routing table is established at configuration time.

Figure 25:
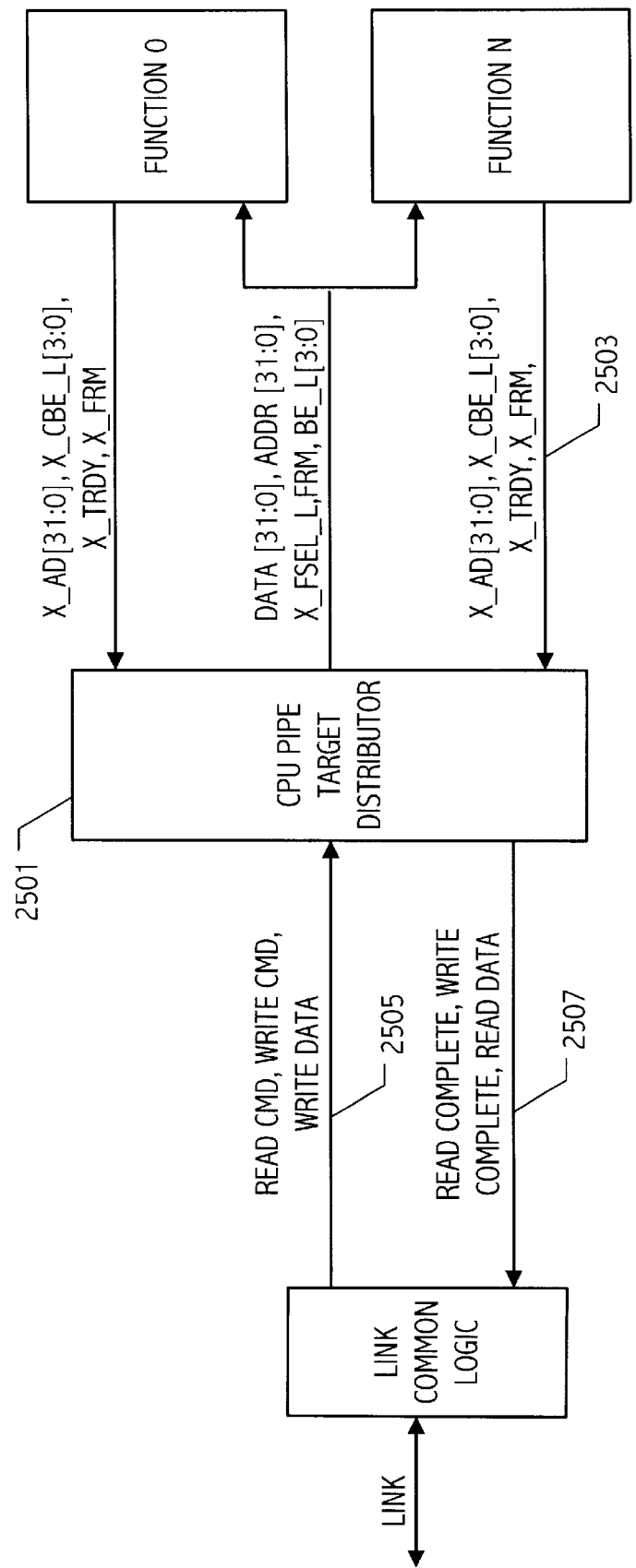
FIG. 25 shows a block diagram of a target distributor and its connections to common logic and to functions.

Referring to FIG. 25, the "front side" of the distributor 2501 connects to standard link common logic described previously. The "backside" connects to the various functions, such as the 1394, PCI bridge, and IDE controller, via a bus structure 2503. The distributor connects directly to a dedicated instantiation of the standard transmit and receive logic (FIGS. 20 and 21). Each function contains a table entry specifying the beginning and end of that function's address range. It is possible that a function has multiple ranges. Each function is responsible for specifying its address range needs in its configuration space. In a personal computer implementation, the ACPI initialization code can program the address router table based on the function's requirements. The common pipe logic provides read commands, write commands (including special cycles), and write data 2505 to the pipe target distributor 2501. Going the other way, read and write complete indications plus read data 2507 goes from the pipe target distributor to the common pipe logic.

Figure 26:
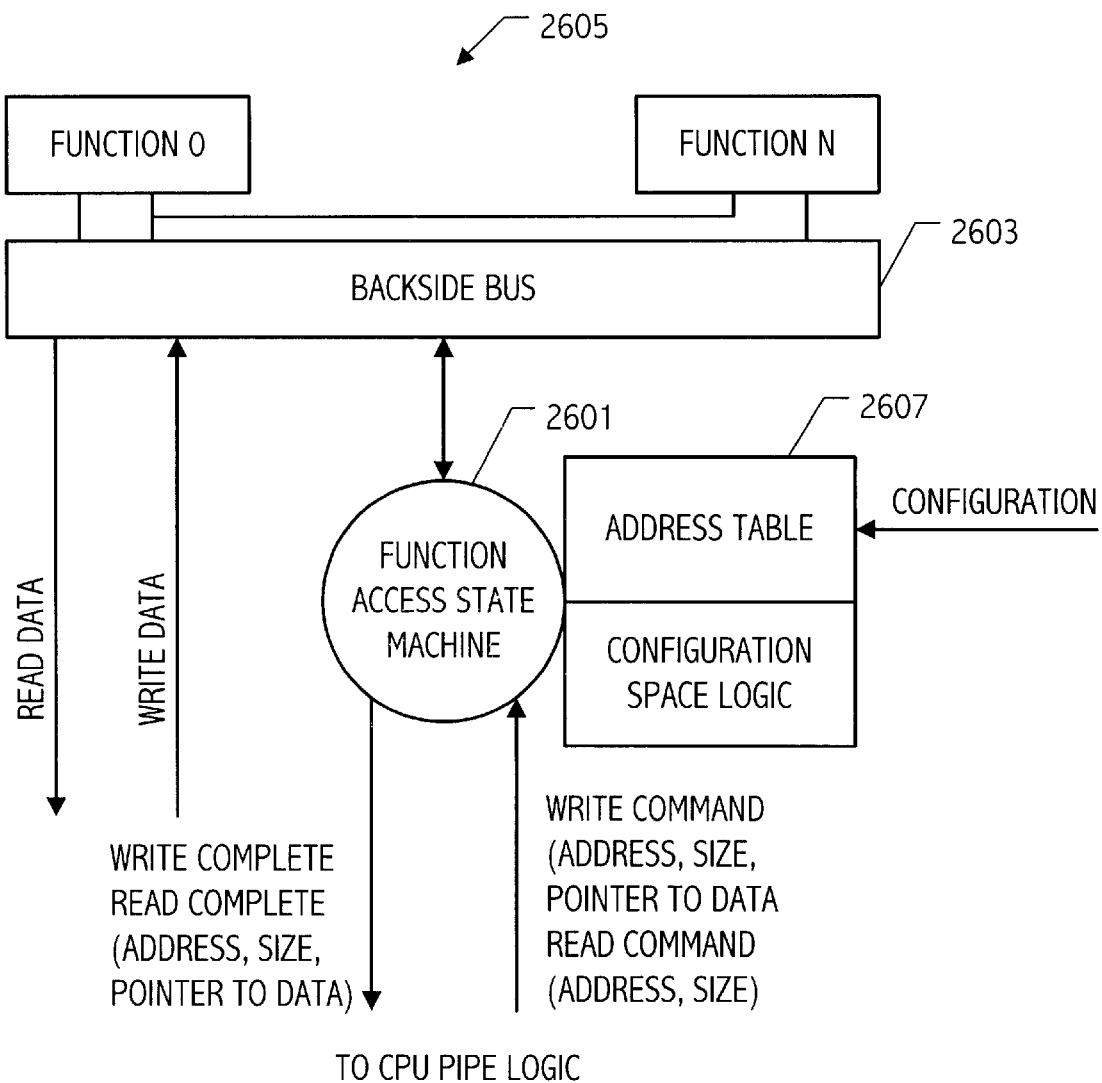
FIG. 26 illustrates additional logic used in the target concentrator to map accesses to appropriate functions.

Referring to FIG. 26, when commands are received by the pipe logic, they are decoded and passed to the function access state machine 2601 where they generate accesses on the backside bus 2603 which connects the pipe logic to the functions 2605. The function access state machine functions as an address router that inspects the physical address field in the link packet and determines to which function the transaction should be sent. Once the command is received, the function access state machine accesses address table 2607 to determine the target function, and generate the backside bus cycle. The address table 2607 maps the address embedded in the packet received over the link to the target function. The address table can be configured at configuration time and is associated with the configuration space logic. The function access state machine 2601 passes the response received over the backside bus to the pipe logic (in the same order as the command was received). Writes are responded to as soon as they reach the distributor.

The exemplary CPU pipe is pipelined, but strongly ordered. Back-to-back transactions to the same function should complete in order. Reads and writes to separate functions can be overlapped, but read responses are presented back to the pipe logic in order.

Functions can hold off returning read data on the backside bus using a holdoff signal indicating that the device is not ready to respond. Multiple transactions can be presented to the PCI bridge, which will queue writes and enforce serialization.

Figure 22A:
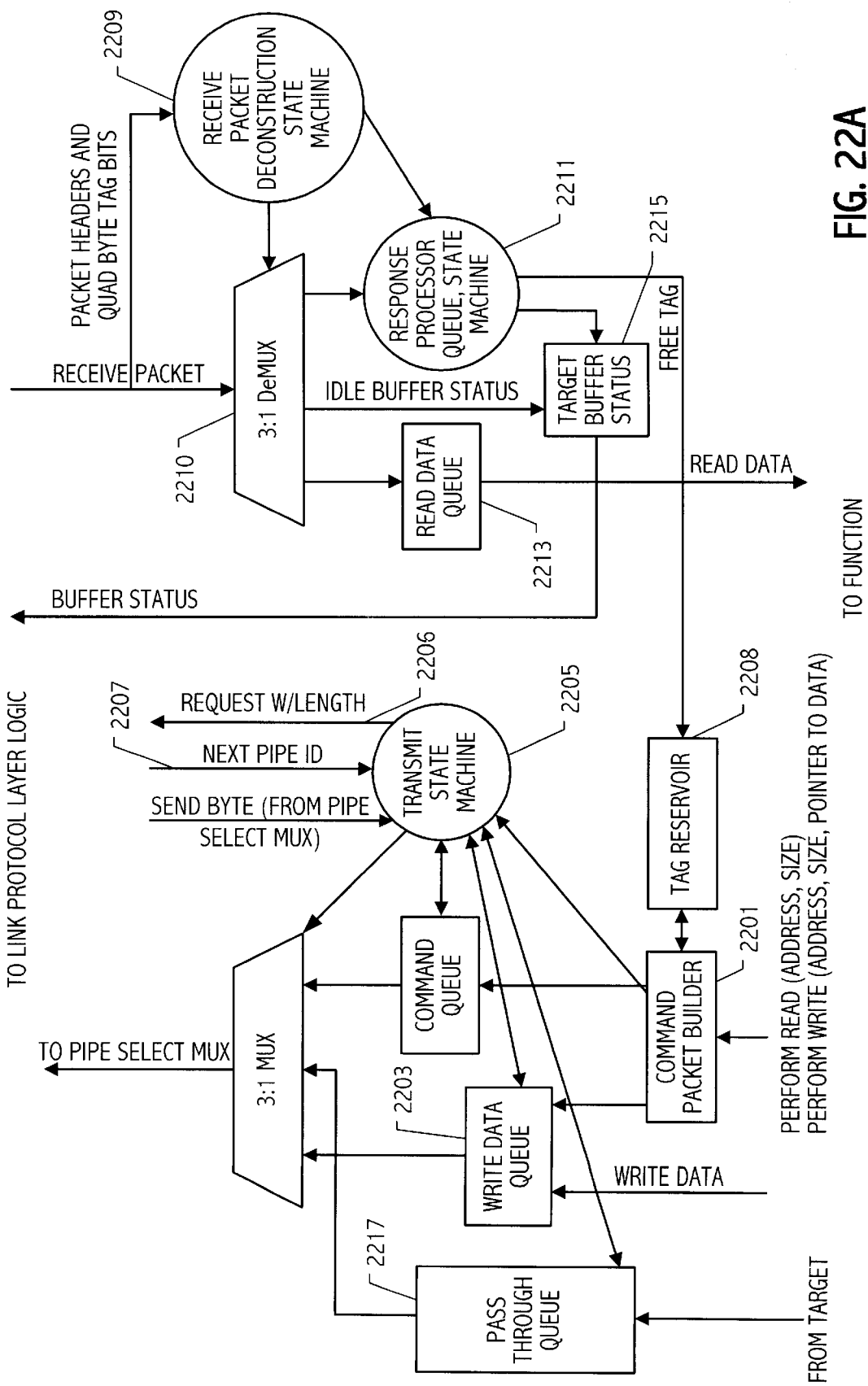
FIG. 22A illustrates a pipe source circuit structure that includes a pass through queue.

Referring again to FIG. 18, the structure of an exemplary link port 1806 can now be described with greater specificity. The link port interface to link 1809 includes transmit and receive circuits such as those illustrated in FIGS. 20 and 21, as well as appropriate source and target circuits such as shown in FIGS. 22 and 24 or described elsewhere herein. For connections between link port 1806 and link bridge 1804, the port and bridge may be connected as functions as illustrated in FIGS. 25 and 26. Additionally, or alternatively, the port and bridge may be connected to provide a passthrough mode of operation. In one embodiment, the port and bridge are connected by a 32 bit wide data path, (either bidirectional or a data path in each direction). Assuming an internal 200 MHz clock rate, a byte would still have an effective transistor rate be transferred at 800 MHz. The packet is transferred into a separate pass through queue acting as a holding buffer in the subordinate link pipe source. Thus, referring to FIG. 22A, passthrough data is provided to passthrough queue 2217 from the primary link target. The pass through data may be provided directly from the pipe router demultiplexer 2105 (see FIG. 21) or from a buffer (not shown) in the primary link target. Note that the pass through queue 2217 needs to have flow control to ensure that the buffer does not fill. Because flow control is normally on the receive side and the pass through queue is in the source side, the flow control coming back from the subordinate target may be modified to include the status of pass through queue 2217 which is simply an intermediate holding buffer. In addition, moving packets out of the pass through queue may be prioritized and the queue made sufficiently deep to avoid overfilling the intermediate buffer.

Figure 23A:
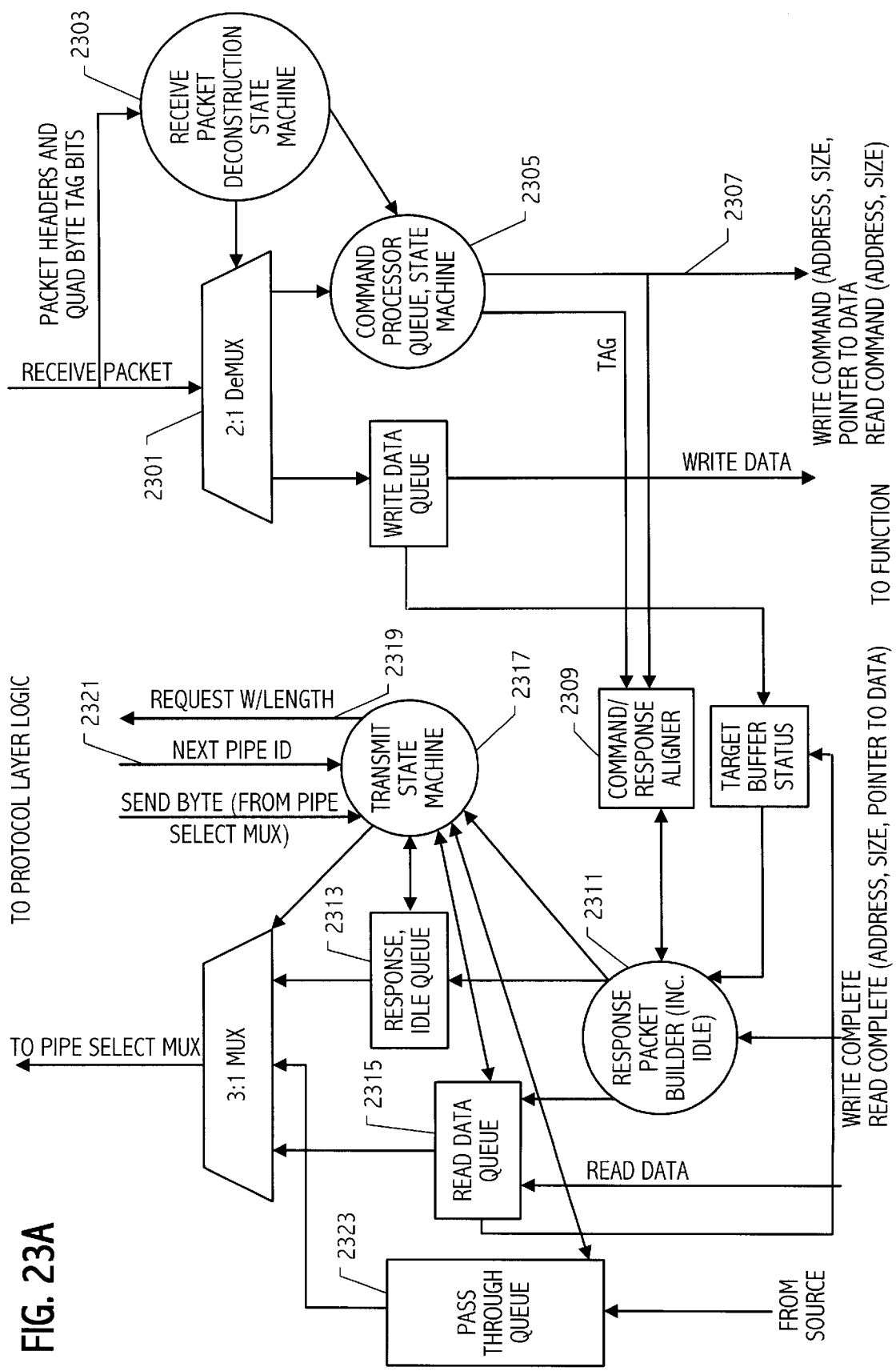
FIG. 23A illustrates a pipe target circuit structure that includes a pass through queue.

When the subordinate target provides the response packet to the subordinate source, the subordinate source provides the response packet to the primary target pass through queue 2323 (FIG. 23A). Again the packet may be transmitted directly to pass through queue 2323 from the receive circuit or from a location in the target circuit. The response packet in pass through queue is then transmitted to the primary source to complete the transaction. Flow control considerations also apply to the intermediate buffer in the primary link target circuit. Note that the pass through queues may be coupled directly to the pipe select multiplexer 2007 (see FIG. 20).

Primary-subordinate transactions work in the same manner when the source is on the subordinate link and the ultimate target is on the primary link.

If necessary, boundary tags provided in the receiver circuit may accompany each 32 byte data making the width 36 bits. Alternatively, pass through packets may be byte aligned.

For port to port pipes such as those shown in FIG. 18, the pipe connections may be made between ports using the 32 bit wide portion of the transmit and receive circuits. That is, the 800 MHz portions, time dilation and synchronization are not necessary for pipe to pipe connections between ports on the same integrated circuit running at 200 MHz. Those pipe to pipe connections may be used for pass through operations or may be used in terminate and resend approaches in which transactions are initiated again on the pipe to pipe connection. Again, depending on such factors as whether there is a need to have boundary finder logic for packets, the boundary tags may be supplied with the four byte data. Alternatively, new boundary logic may be used to determine the boundaries between packets, idle, headers and data.

CONFIGURATION

In order to operate the link, various parameters need to be initialized for correct operation. In one embodiment, the special cycle mechanism can be used to transport appropriate configuration information to the various control registers requiring the information.

In those implementations desiring to maintain compatibility with existing personal computer systems, present configuration approaches, particularly those associated with the PCI bus, should be accommodated. PC system configuration has evolved from nailed down resources, jumpers, and DOS drivers to plug and play, to PCI plug and play, to ACPI-supported system configuration management. One configuration approach for link hardware is to make the space appear to the operating system as if it is for a PCI bridge or function and then to add the link-specific standard registers to the same logical space. Using such a configuration approach, each link bridge and link function includes operating system (OS)-visible configuration space defined by the PCI specification as well as link standard registers that are not necessarily visible to the operating system. The link standard registers may be configured by Basic Input/Output System (BIOS) or a link configuration driver running under the operating system.

A special cycle mechanism may be used for sending system management messages on the link. The CPU pipe is used to carry special cycle messages. At the distributor, the special cycle is passed over the backside bus to the PCI bridge in implementations have a PCI bridge. If any link ports exist on the interface module, the special cycle should also be sent out over the subordinate link.

The link-host bus bridge in the processor module converts I/O accesses to the configuration space into memory cycles to predetermined address space (which may be programmable). The distributor identifies accesses to this space and decodes the address in order to correctly route the configuration cycle.

In one embodiment of the invention, the standard PCI configuration addressing structure may be used for link systems, with the exception that the MSB of the Device # field (bit 15) is redefined to be the link space select bit. Accesses with bit 15 cleared operate normally, targeting the standard 256-byte configuration blocks. Accesses with bit 15 set address an additional 256-byte block which is used for configuring the link related aspects of functions residing directly on a link. In effect, functions now have two 256-byte configuration blocks instead of one.

In an exemplary embodiment, transactions to configuration space are passed on to the correct function based on the address as follows:

| 31 | 30–24 | 23–16 | 15 | 14–11 | 10–8 | 7–2 | 1–0 |
|---|---|---|---|---|---|---|---|
| 1-Enable Config | Rsrvd | Bus # | High Speed Space | Device # | Function # | Register # | 00 |

If bit 31=0, the distributor passes the access as an I/O transaction.

Bits (23:16) define the bus. The link-level bus (including the backside bus created by the distributor) is defined as Bus 1.

Bits (15:11) define the device. The interface module is device 0. Bits (10–8) define the function. In one implementation: the link hardware is function 0 (including the distributor); the PCI bridge is function 1; the IDE controller is function 2; and the 1394 controller is function 3.

Referring again to FIGS. 25 and 26, the backside bus 2603 connects the distributor to the various functions inside the interface module that reside at the link level. For example, these could include the PCI bridge, IDE controller, 1934 controller, and a link port. The backside bus may be an internal PCI bus or another appropriate multidrop bus. If an internal PCI bus is used, there are modifications to a typical PCI bus structure due to use of the link that are advantageous. The modifications to how such an internal PCI interface may otherwise work are that traffic that used to go on a PCI bus having functions operating as PCI masters or targets now have (1) PCI target and master functions split, with target transactions originating from the CPU pipe target distributor and master transactions going out over dedicated link pipes; (2) target transactions do not need to be broadcast to all functions and then "claimed" by addressed function. The CPU pipe target distributor operates as a centralized address decoder, routing transactions directly to the addressed function. The impact of (1) is that function master operations talk directly to pipes that are separate from the distributor. The impact of (2) is that the distributor can perform a centralized decode and generate function select strobes.

The processor module converts the two I/O accesses that are used to create PCI configuration space into a single memory access over the link (which corresponds to PCI configuration mechanism #1 as is known in the art). The PCI mechanism creates a 32-bit address port at I/O address 0CF8h–0CFBh, and a 32 bit data port at I/O addresses 0CFCh–0CFFh. Configuration accesses over link are memory mapped. They are differentiated from other memory accesses by their address space. When there is a 32-bit I/O write to address 'h0CF8, this value is stored within the processor module as the CONFIG_ADDRESS. As described in section 3.2.2.3.2 of the Peripheral Component Interconnect (PCI) Specification (PCI Local Bus Specification Rev. 2.2), which specification is incorporated herein by reference, bit(31) of CONFIG_ADDRESS is the enable for CONFIG_DATA at 'h0CFC and bits(23:0) represent the configuration address. When there is an enabled I/O access to address 'h0CFC, then the link memory cycle is initiated to a memory mapped address, e.g., 'hFE_01xx_xxxx, in one implementation, where the bits(23:2) are specified by bits(23:2) of CONFIG_ADDRESS and bits(1:0) are 'b01 (to specify a type 1 configuration cycle).

The software definition of CONFIG_ADDRESS is shown below for reference.

| 31 | 30–24 | 23–16 | 15–11 | 10–8 | 7–2 | 1–0 |
|---|---|---|---|---|---|---|
| Enable Bit | Reserved | Bus Number | Device Number | Function Number | Register Number | 00 |

In link systems, configuration accesses are routed to either a link bridge, a link integrated device, a PCI bridge, or a PCI device based on the values in the "Bus Number," "Device Number," and "Function Number" fields of CONFIG_ADDRESS.

There are standard configuration registers associated with link bridges and link functions. Link bridges are the control logic on each side of a link. Link functions are interfaces that are directly connected to a link within an integrated circuit. Standard registers are the same in all link platforms. Typically, the standard registers are configured by BIOS before control is passed to the operating system (OS).

There are two defined link header types that are associated with link logic. Link function headers are associated with link functions and link bridge headers are associated with link logic forming the physical, protocol and link layers of a particular link. The link headers share a 256-byte configuration space with a standard type 0 or type 1 PCI header. Link bridge headers are split in that the configuration space is split between one side of the link and the other side of the link. Link headers may utilize the PCI-defined "Capabilities List" to specify their location within the top 192 bytes of a 256-byte configuration space.

Figure 27:
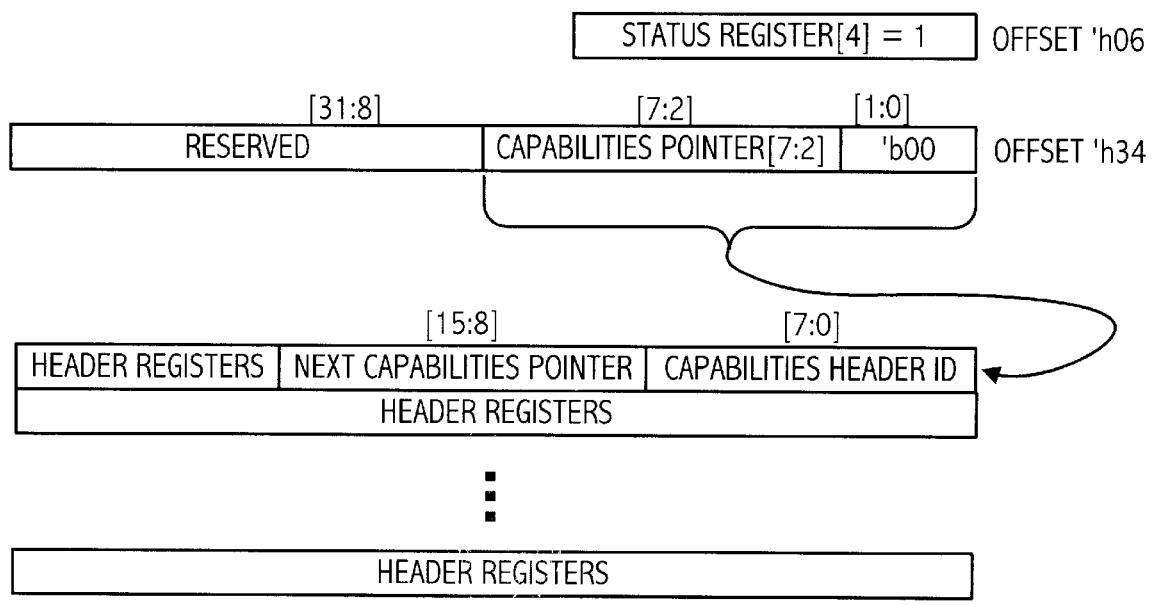
FIG. 27 illustrates the software structure for the capabilities pointer.

Referring to FIG. 27, the software structure for the capabilities pointer is illustrated. The Capabilities List is the same in both type 0 and type 1 PCI headers. If the read-only, hard-wired bit(4) of the status register (offset 'h06) is high, then the byte at offset 34 is specified to be the "Capability Pointer." The Capabilities Pointer points to the (DWORD-aligned) starting address of various headers including a link function header and link bridge header.

The link default bridge is a special link bridge. That bridge differs from other bridges in that it contains the default interface for all unclaimed cycles. For example, all cycles generated by the CPU that do not go to memory or to graphics will be sent to the link default bridge in most systems. The configuration space for a link default bridge uses the type 0 PCI-defined header, which is typically used for functions rather than bridges in PCI systems. A type 1 header is not needed because the address space for the link is subtractively decoded. Correspondingly, the PCI default bridge uses a type 0 PCI header in legacy systems and link systems.

The two PCI header types and the two link header types are concatenated in all combinations for following bridges and functions:

| Bridge or function | PCI header | Link header |
|---|---|---|
| Generic link bridge (except link default bridge) | Type 1 | Bridge |
| PCI bridge (except a PCI default bridge) connected to a link | Type 1 | Function |
| link default bridge (for unclaimed cycles) | Type 0 | Bridge |
| Functions (including the PCI default bridge) that connect to a link bridge within an IC | Type 0 | Function |

Referring to FIG. 28, the block diagram illustrates the basic configuration structure and register addressing strategy of a typical system. Blocks 2801, 2803, 2805 and 2807 represent integrated circuits. The remaining blocks illustrate PCI and link headers included for the function/bridge, identifying whether the header is a PCI-type 0 or PCI-type 1 header, and whether the header is a link function or a link bridge header, along with bus number, device number and function number. Thus, for example, link bridge 2809, which is the default link bridge, is configured using a PCI-Type 0 header, a link bridge header, and is identified as bus 0, device 0 and function 0.

Using the PCI configuration address structure provides up to 256 buses (8 bits), up to sixteen devices per bus (4 bits) and up to 8 functions per device (3 bits). Other configuration address structures are of course possible especially if compatibility with the PCI is not required.

Figure 28B:
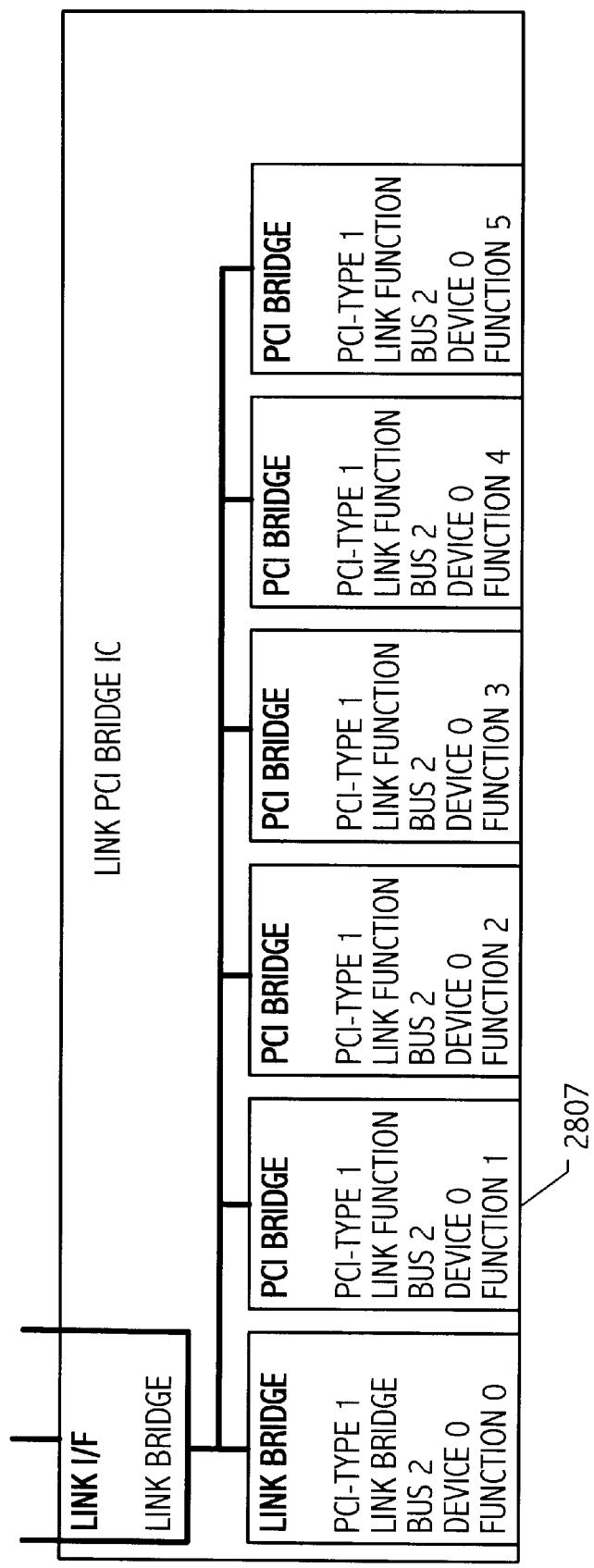

FIGS. 28A and 28B illustrate that both sides of a link are part of the same link bridge, e.g. link bridge 2809 includes configuration information relevant to both sides of the link connecting processor module 2801 and interface module 2805. That is, the control circuits, such as the common logic described previously, on both sides of a link utilize or provide information contained in the address space of the link bridge. Thus, both sides of the link share the same 256-byte configuration space that is specified by bus, device, and function number. The default link and PCI headers are on bus 0 in the illustrated embodiment. Link bridge headers are added to the PCI header for all links such as link bridge 2809 and link bridge 2813. Link function headers are added to any functions directly connected to links within an IC (including the PCI bridges). Thus, e.g., IDE controller 2815 and 1394 host controller 2817 and default PCI Bus 2811 have link function headers. Functions connected to an internal PCI bridge do not require link function headers.

The PCI type 1 (bridge) header is shown in FIG. 29. When the PCI type 1 header is combined with a link function header for a PCI bridge, the PCI type 1 register definitions are as specified for a PCI-to-PCI bridge in the PCI specification.

When the PCI type 1 header is combined with an link bridge header for a link, some of the PCI type 1 registers definitions may be modified as follows (all others are as defined in the PCI-to-PCI bridge specification).

The command register is modified as follows:
   Bits(0)—I/O Space Enable: Same as PCI
   Bits(1)—Memory Space Enable: Same as PCI
   Bits(2)—Bus Master Enable: Same as PCI
   Bits(15:3)—Reserved: always returns 0
The status register is modified as follows:
   Bits(4)—High to indicate a link capabilities pointer
   Bits(15:5,3:0)—Reserved: always returns 0
   Cache Line Size, Latency Timer—Reserved: always returns 0
   Secondary Latency Timer—Reserved: always returns 0
   Secondary Status—Reserved: always returns 0(all bits)
   Interrupt Pin—Reserved: always returns 0
Bridge Control Register—Modified as follows:
   Bits(15:7,5:0)—Reserved: always returns 0
   Bit 6—Secondary Bus Reset: same as PCI The PCI type 0 (function) header is shown in FIG. 30. When the PCI type 0 header is combined with a link function header for a PCI default bridge, the PCI type 0 register definitions are the standard PCI register definitions. When the PCI type 0 header is combined with a link bridge header for a link or an link function, some of the PCI type 0 register definitions may be modified as follows (all others are as defined in the PCI specification).
Command Register—Modified as follows:
   Bits(0)—I/O Space Enable: Same as PCI
   Bits(1)—Memory Space Enable: Same as PCI
   Bits(2)—Bus Master Enable: Same as PCI
   Bits(15:3)—Reserved: always returns 0
Status resister—Modified as follows:
   Bits(4)—High to indicate an link capabilities pointer
   Bits(15:5,3:0)—Reserved: always returns 0
   Cache Line Size, Latency Timer—Reserved: always returns 0
   Max Lat, Min Gnt—Reserved: always returns 0

FIG. 31 illustrates the link registers used for link normal bridges (which use PCI type 1 configuration space) as well as link default bridges (which use PCI type 0 configuration space). The link registers are divided into two similar blocks of registers. The first block of registers are physically located on the upstream side of the link (closer to the CPU) and the second block are physically located on the downstream side of the link. The base offset, N, is specified by the capabilities pointer at offset 'h34in PCI standard configuration space. FIG. 31 shows the offsets from the base offset N.

Each of the link bridge registers are described in turn. The Next Capabilities Pointer, at offset 'h01; is a read-write register that defaults to 'h00. That register is a pointer to the next header as defined in section 6.7 of the PCI specification Rev. 2.2.

The Capabilities Header ID, identifies the header as a link bridge header. It is a read only register.

The upstream and downstream Asynchronous 256-Byte counters, which default to 'h0000_0000, track the amount of asynchronous traffic occurring on the link. Thus, the upstream counter increments for every 256 bytes of asynchronous traffic transmitted by the transmit controller on the upstream side and similarly for the downstream counter. The asynchronous traffic includes all headers associated with asynchronous transfers as well as the data. Writes to any byte of these registers clears all 32 bits. The 256-Byte counters may be used to determine how much asynchronous traffic has occurred on the link over a particular time period. The counters may be free running so the time period may be based on a counter provided elsewhere in the computer system. The traffic information may be used to analyze system performance.

The upstream and downstream Isochronous 256-Byte counters, which defaults to 'h0000_0000, track the amount of isochronous traffic occurring on the link. Thus, the upstream counter increments for every 256 bytes of isochronous traffic transferred out of the transmit controller on the upstream side and similarly for the downstream counter. The byte count includes all headers associated with isochronous transfers as well as the data. Writes to any byte of these registers clears all 32 bits. The 256-Byte counters may be used to determine how much isochronous traffic has occurred on the link over a particular time period. The counters may be free running so the time period may be based on a counter provided elsewhere in the computer system. The traffic information may be used to analyze system performance.

The upstream and downstream Isochronous Priority Mode Frame counters, which default to 'h0000_0000, increment with every frame in which isochronous priority mode is used. Writes to any byte of this register clears all 32 bits. That information may be used to analyze system performance.

The upstream and downstream Max Detected Isochronous Byte Count, which default to'h0000, contain a count of the maximum number of isochronous bytes transferred during previous frames. During each frame, a counter (on the upstream and downstream side) counts the number of bytes of isochronous traffic (including headers and data) transferred out during the frame. If the value counted at the end of the frame exceeds the value currently in this register, then this register is updated with the higher number. Thus, this field shows the maximum number of isochronous bytes transferred during a frame. That can be used by software to help determine an appropriate value for the Isochronous Byte Counter Reload register. Writes to any byte of these registers clears the 16 bit register.

The upstream and downstream Isochronous Byte Counter Reload registers are read-write registers that default to 'h0800. This field specifies the reload value placed into the isochronous byte counter at the beginning of each frame, thereby specifying the portion of each frame guaranteed for isochronous data.

The upstream and downstream Elapsed Frame Counter Reload registers are read-write registers that default to a specific value that indicates the length of the frame, e.g., 'h07CF. This field specifies the reload value placed into the elapsed frame counter at the beginning of each frame. The value placed into this register depends on the Clock Frequency register and the frame length. The following equation can be used to determine this value:

Elapsed Frame Counter Reload=(frame length*(Clock Frequency))−1;

The upstream and downstream Max Clock Frequency registers are read-only and specify the maximum clock frequency at which the link hardware can operate. The value in this register field (times 100 megahertz) represents the maximum frequency of the CLK signal out of the transmit controller. For example, an integrated circuit that can operate with a maximum clock frequency of 400 megahertz (800 megahertz data transfer rate) would set this field to 'h04. Thus, link systems using an 8-bit max clock frequency register can support CLK frequencies from 100 megahertz to 25.5 gigahertz (transfer rates from 200 megahertz to 51.0 gigahertz).

The upstream and downstream Clock Frequency registers are read-write registers and specify the clock frequency at which the transmit controller and the CLK signal out of the transmit controller on the upstream and downstream side, respectively, is operating. The value in this register (times 100 megahertz) represents the maximum clock frequency. In order to configure the system appropriately, BIOS places the lesser of the two Max Clock Frequency fields (on either side of the link) into this field.

The upstream and downstream link Width registers actually each include four separate fields as follows:

| 31:28 | 27:24 | 23:20 | 19:16 |
|---|---|---|---|
| Receive Width | Receive Max Width | Transmit Width | Transmit Max Width |

The read-only Receive and Transmit "Max Width" fields specify the physical size of transmit and receive data busses for a side of the link. The corresponding Receive and Transmit read-write "Width" fields specify the number of pins used in the implemented platform. BIOS programs the "Width" field of the transmit controller on side A of the link to match the "Width" field of the receive controller on the side B of the link; these are programmed to be the lesser of the "Max Width" values on the two sides. BIOS also programs the "Width" field of the transmit controller on side B of the link to match the "Width" field of the receive controller on side A of the link in a similar fashion. In this way, ICs can implement different size data busses for the transmit and receive controllers and always be guaranteed that they will be able to connect to all other link ICs with different sizes. These fields are each decoded as bit width= $2^{field\ value}$. Thus, a value of 0 specifies a 1-bit bus; a value of 1 specifies a 2-bit bus, a value of 2 specifies a 4-bit bus; a value of 3 specifies a one-byte bus; a value of 4 specifies a 2-byte bus, and so forth.

The default values for the "Width" registers should always be the smallest bus width supported by the interface. All interfaces that are one byte wide or wider are required to support all widths down to one byte and to default to one byte wide. Interfaces that support widths of less than one byte are required to support all smaller widths down to a single bit wide and default to a single bit wide. For example, in a typical implementation, the link connecting the processor module and the interface module is=8/8 (transmit/receive width), the link to a graphics integrated circuit=8/8, and any subordinate links originating from the interface module are=1/1.

The link bridge control register (at offset 'h18–'h17 for the upstream side, 'h38–'h37 for the downstream side in the example shown) is read-write and includes the following fields:

| 15–4 | 3 | 2–0 |
|---|---|---|
| Reserved | AIBCR | DSDEV |

Bits(2:0) are the Downstream device number select (DSDEV). The bits are Read-write and default to 'h0. This field specifies the three MSBs of the PCI-defined device numbers (bits (15:13)) used in the configuration address of downstream functions. That is required to insure that downstream device numbers do not conflict with upstream device numbers over a link bridge. Functions on the downstream side of a bridge are assigned device numbers as {DSDEV, 0,0}+(device numbers). For up to four devices, this is accomplished by concatenating 0, 1, 2, or 3 to DSDEV. In the rare case where more than four devices are implemented within an integrated circuit (more than 32 functions), then an addition may be implemented in the hardware for the three MSBs. This field only exists on the downstream side of the link. On the upstream side of the link it is reserved.

Bit(3) is the automatic isochronous byte counter reload control (AIBCR). It is read-write and defaults to 'h0. If the bit=1, the isochronous byte counter reload register is automatically increased when a frame goes by in which the max detected isochronous byte count increases. That automatically corrects the isochronous byte counter reload value when isochronous bandwidth increases over the link. If the AIBCR bit=0, the isochronous byte counter reload register is software controlled.

In addition to link bridge configuration registers, configuration registers specific to link functions provide necessary configuration for link functions. The following registers are defined and used in all link functions that connect directly to a link. The base offset, N, is specified by the capabilities pointer at offset 'h34in PCI standard configuration space.

| Reserved | Next Capabilities Pointer | Capabilities Header ID | N+'h00 |
|---|---|---|---|
| Pipe 1 Specification | Pipe 0 Specification | | N+'h04 |
| Pipe 3 Specification | Pipe 2 Specification | | N+'h08 |
| Pipe 5 Specification | Pipe 4 Specification | | N+'h0C |
| Pipe 7 Specification | Pipe 6 Specification | | N+'h10 |
| Receive Isochronous Clocks | Transmit Isochronous Clocks | | N+'h14 |
| Reserved | | | N+'h18 |
| Reserved | | | N+'h1C |

The pipe specification registers are shown below. They provide information about the pipes which couple the function to the other end of the link. Each function can have up to 8 pipes (pipes 0–7). Each potential pipe is specified by 16 bits within these four DWORDs as follows

| 15:13 | 12 | 11:10 | 9:8 | 7:3 | 2:0 |
|---|---|---|---|---|---|
| Reserved | ISOLOCKEN | PRIORITY | PIPETYPE | PIPEID | TAG SIZE |

Bits(2:0) of the pipe specification register provide the pipe tag size field (TAGSIZE). It is a read-only field. The tag size field specifies the number of out-of-order transactions allowed in the source pipe's pipeline as previously discussed. The tag field for link packets is 5 bits wide in one implementation described herein, allowing for an up-to-32-transaction-deep out-of-order pipeline. Source pipes can be implemented that support the following depths:

| TAGSIZE | DEPTH |
|---|---|
| 0 | Pipe is not implemented; this specifies that there is no Pipe specified for this 16-bit configuration space. |
| 1 | No out-of-order pipelining; target accesses are handled In the order that they received. |
| 2 | 2-transaction out-of-order pipeline. |
| 3 | 4-transaction out-of-order pipeline. |
| 4 | 8-transaction out-of-order pipeline. |
| 5 | 16-transaction out-of-order pipeline. |
| 6 | 24-transaction out-of-order pipeline. |
| 7 | 32-transaction out-of-order pipeline. |

Specifying TAGSIZE='h1 (no pipelining) does not mean that multiple outstanding transactions are not allowed. It only requires that they should be handled in the other they are received. Thus, configuring a target function this way instructs the target to always execute transactions in the order they are received. Specifying any other pipe depth allows out of order execution by the target (for the pipe).

Bits(7:3) specify the Pipe ID number (PIPEID). It is a read-write field that defaults to 'b0. This field specifies the pipe ID field of the link packet headers. In one implementation, this field is hard wired for the CPU source pipes, all interface module source pipes, and all graphics chip source pipes. It is programmed by configuration software for all target pipes (except the target side of the CPU pipes). Note that the source and target ends of each pipe share the same number.

Bits(9:8) are read-only and specify the pipe type in the function as follows.

| Bits | Pipe Type |
|---|---|
| 0 0 | Asynchronous Source |
| 0 1 | Asynchronous Target |
| 1 0 | Isochronous Source |
| 1 1 | Isochronous Target |

Bits (11:10) (Priority) specify the priority level of the pipe relative to other pipes associated with the function. Configuration software uses the priority bits when connecting multiple pipes from a source to a target, e.g., three pipes connecting the interface module to the processor module memory concentrator. The bits are hard-wired. One value of the bits, e.g., 00 represents the lowest priority while 11 represents the highest priority.

Bit (12) (ISOLOCKEN) is the Isochronous Pipe Lock Bypass Enable bit. When set, transactions on isochronous pipes are unaffected by lock. When cleared (default) Lock prevents new transactions from being initiated. The lock bit is set by software.

In addition to the pipe specification registers, the Transmit Isochronous Clocks register, located at offset 'h15–'h14, specifies the maximum number of clocks in which isochronous packets are being sent out of the transmit controller for the function during the frame. That register is typically programmed by a driver. The maximum number includes clocks in which isochronous packet headers as well as data are sent.

In a similar fashion, the Receive Isochronous Clocks register, offset 'h17–'h16, specifies the maximum number of clocks in which isochronous packets are being sent to the receive controller for the function during a frame. That includes clocks in which isochronous packet headers as well as data are sent. The register is read-write and defaults to 'h0000.

For one implementation in an x86 personal computer architecture, pipe numbers may be assigned as follows:

The CPU source pipe is hardwired as pipe 0.

Source pipe numbers within the interface module are hardwired, starting with 1. Processor module targets and non-CPU sources are programmed by the Plug and Play configuration software. Interface module and Graphics targets other than the CPU Pipe Target Distributor are programmed by the Plug and Play configuration software.

When connecting multiple pipes to a common destination (e.g., multiple pipes feeding into the memory concentrator on the processor module), the highest priority source is connected to the highest priority target—the priorities do not need to match since they are only relative.

The CPU pipe target distributor is an interface module-side (or graphics) function that terminates the CPU source pipe. It is the target for reads and writes from the CPU over the link. It manages the associated queues and the tag structure. The distributor also serves as the home for the interface module (IM)-side of the host—link bridge function configuration block.

Transactions received from the CPU are distributed to the various IM-side functions based upon a table of base and limit address registers. The distributor supports transactions to memory, I/O, and configuration spaces, including the broadcast of special cycles (PCI special cycles are mapped into the configuration address structure). The distributor uses the address ranges programmed in the individual interface module headers or graphics function headers to perform the routing. Note, if graphics appears as a single function, the target distributor still exists, but it only distributes transactions to itself and the graphics function.

As previously described, the memory controller provides a concentration function where multiple source pipes from the IM converge on a single function (a separate concentrator is used on a graphics link). This is not a problem, since all that is happening is the management of tags and Pipe ID numbers (the Pipe ID number serves as the return address for the response packet). That said, the memory controller needs to know which pipes it connects to.

At boot time, most of the pipe sources and targets are not "wired up." The configuration process identifies the necessary interconnections and programs the registers in the processor module and interface module to establish the connections. The interface module link-layer function, which is technically part of the host-link bridge, contains an asynchronous target pipe that connects to the CPU. That pipe is pipe 0, in one implementation, and interface module functions connect to this pipe via the CPU Pipe target distributor which was discussed previously. All configuration registers may be accessed via this mechanism. System configuration software programs the Pipe Specification Registers with the pipe ID numbers.

Special cycles may be transmitted using the configuration mechanism, where the address is as follows:

Bus address=target bus
Device address=all ones
Function address=all ones
Register address=all zeros The link-Host bridge generates Special Cycle write transactions using the special cycle write command packet. The Special Cycle packet type indicates to the interface module-side link hardware that the packet should be processed immediately upon receipt, instead of allowing it to get buried in some queue.

CPU access to the configuration spaces of interface module-side functions is transparent, except that the distributor should terminate the link transactions. Basically, the distributor routes configurations reads and writes based on the configuration packet address field.

The description of the invention set forth herein is illustrative, and is not intended to limit the scope of the invention as set forth in the following claims. Variations and modifications of the embodiments disclosed herein, may be made based on the description set forth herein, without departing from the scope and spirit of the invention as set forth in the following claims.

What is claimed is:

1. A method of determining a condition in a computer system having a pipelined communication link on which multiple outstanding transactions occur, comprising:
   assigning one of a plurality of tags to each respective transaction to identify the transaction;
   detecting a no tags free condition, the no tags free condition indicating that all of the tags have been assigned to respective outstanding transactions; and
   determining when the no tags free condition has existed for a predetermined amount of time.

2. The method as recited in claim 1 further comprising maintaining a tag reservoir indicating which tags are available for use.

3. The method as recited in claim 2 wherein determining when the no tags free condition exists includes determining when the tag reservoir indicates that no tags are available for use.

4. The method as recited in claim 1 wherein determining when the no tags free condition has existed for the predetermined amount of time further comprises counting in a counter until the predetermined amount of time has been counted.

5. The method as recited in claim 1 wherein the predetermined amount of time is programmable.

6. The method as recited in claim 1 further comprising generating an interrupt condition when the no tags free condition has existed for the predetermined amount of time, thereby indicating an abnormal condition.

7. The method as recited in claim 1 wherein the tags are used to identify out of order transactions.

8. The method as recited in claim 1 wherein the computer interconnection bus includes multiple channels carrying transactions on a packet multiplexed basis and wherein determining when the no tags free condition has existed for the predetermined amount of time is performed on more than one channel.

9. The method as recited in claim 8 further comprising:
   when it is determined that the no tags free condition has existed for the predetermined amount of time, alerting the computer system to an error condition; and
   providing information indicating on which channel the error condition was detected.

10. A computer system comprising:
    a first and second integrated circuits connected via an interconnection bus allowing multiple outstanding transactions;
    means for assigning tags to transactions on the bus from a group of tags;
    means for detecting when all the tags in the group have been assigned to respective outstanding transactions thereby indicating a no tags free condition; and
    means for determining when the no tags free condition has existed for a predetermined amount of time, indicative of an abnormal operating condition.

11. The computer system as recited claim 10 wherein the interconnection bus includes a group of channels carrying transactions across the bus, each channel having a group of tags, each channel including means for detecting when all the tags in a respective group have been assigned to transactions on a respective channel, thereby indicating a no tags free condition exists on the respective channel.

12. The computer system as recited in claim 11 further comprising means for alerting a central processing unit in the computer system that the abnormal operating condition exists.

13. The computer system as recited in claim 11 wherein the group of channels are those channels on the bus allowing out of order transactions, the tags being assigned only to transactions on the bus on channels allowing out of order transactions.

14. An integrated circuit comprising:
    a first tag reservoir circuit for supplying tags, each of the supplied tags being associated with a transaction issued on a communication link, the reservoir circuit configured to mark a tag as unavailable when it has been issued to an outstanding transaction, and to mark a tag as available when a tag is retired upon completion of a transaction;
    a first detecting circuit coupled to the reservoir circuit responsive to assert a signal indicating a no tags free condition in the reservoir circuit and to deassert the signal when tags are available in the reservoir circuit; and
    a first counter circuit, responsive to the no tags free condition to count, the counter circuit providing an indication when the no tags free condition has existed for a predetermined time period.

15. The integrated circuit as recited claim 14 wherein the communication link includes a plurality of channels carrying transactions, the first tag reservoir circuit, the first detecting circuit and the first counter circuit associated with one of the channels, and each additional channel having associated a respective additional tag reservoir circuit, detecting circuit and counter circuit, each additional counter circuit providing an indication of a no tags free condition existing for a predetermined amount of time for a respective additional channel.

16. The integrated circuit as recited in claim 14 wherein the tags are associated out of order transactions.

17. The integrated circuit as recited in claim 15 further comprising an interrupt circuit coupled to receive the indications from the counter circuits and coupled to alert a CPU of the existence of the no tags free condition.

18. In a computer system having a pipelined communication link on which multiple outstanding transactions are identified by tags corresponding to the respective outstanding transactions, detecting when a no tags free condition exists.

19. The computer system as recited in claim 18 further comprising detecting when the no tags free condition has existed for a predetermined amount of time.

* * * * *